United States Patent [19]

Scott et al.

[11] Patent Number: 4,805,121

[45] Date of Patent: Feb. 14, 1989

[54] VISUAL TRAINING APPARATUS

[75] Inventors: John S. Scott, Melbourne; George R. Legters, Melbourne Beach, both of Fla.

[73] Assignee: dba Systems, Inc., Melbourne, Fla.

[21] Appl. No.: 868,061

[22] Filed: May 30, 1986

[51] Int. Cl.[4] .......................... G06F 3/153; H04N 7/18
[52] U.S. Cl. .................................... 364/522; 340/729; 358/109; 434/43; 434/44
[58] Field of Search ............... 364/521, 522, 525, 578; 340/729; 434/2, 43, 44; 358/103, 109

[56] References Cited

U.S. PATENT DOCUMENTS

| | | | |
|---|---|---|---|
| 3,233,508 | 2/1966 | Hemstreet | 434/44 |
| 3,611,590 | 10/1971 | Levy | 434/44 |
| 3,631,610 | 1/1972 | Cutler | 434/44 |
| 3,639,034 | 2/1972 | La Russa | 434/44 |
| 3,757,040 | 9/1973 | Bennett | 434/34 |
| 3,816,726 | 6/1974 | Sutherland | 382/41 |
| 3,889,107 | 6/1975 | Sutherland | 382/41 |
| 3,901,595 | 8/1975 | Helava | 356/2 |
| 3,943,344 | 3/1976 | Kidode | 364/525 |
| 3,973,243 | 8/1976 | Whiteside | 364/200 |
| 4,077,062 | 2/1978 | Nielsen | 364/521 |
| 4,123,794 | 10/1978 | Matsumoto | 364/132 |
| 4,263,726 | 4/1981 | Bolton | 434/43 |
| 4,276,029 | 6/1981 | Gilson et al. | 434/43 |
| 4,343,037 | 8/1982 | Bolton | 364/521 |
| 4,384,338 | 5/1983 | Bennett | 364/522 |
| 4,463,380 | 7/1984 | Hooks, Jr. | 358/104 X |
| 4,464,789 | 8/1984 | Sternberg | 382/48 |
| 4,467,437 | 8/1984 | Tsuruta | 382/43 |
| 4,489,389 | 12/1984 | Beckwith et al. | 364/522 |
| 4,490,719 | 12/1984 | Botwin | 342/64 |
| 4,490,848 | 12/1984 | Beall | 382/121 |
| 4,513,317 | 4/1985 | Rouff | 358/109 |
| 4,515,450 | 5/1985 | Arrazola | 353/5 |
| 4,545,765 | 10/1985 | Jarvis | 434/43 |
| 4,616,217 | 10/1986 | Nesbit et al. | 340/729 |
| 4,684,990 | 8/1987 | Oxley | 364/522 X |
| 4,692,880 | 9/1987 | Merz et al. | 364/521 |

FOREIGN PATENT DOCUMENTS 2047042 11/1980 United Kingdom .

OTHER PUBLICATIONS

Tucker: High Technology, Dec. 1984, "Visual Simulation Takes Flight", pp. 34–47.
Tucker: High Technology, Jun. 1985, "Making Simulated Flight Look Real".
Baxes: Robotics Age, Mar. 1985, "Vision and the Computer: An Overview Castle, Mar. 19, 1985 Computer Images to Aid Army", pp. 12–19.
DalSasso et al: Synthetic Enhancement of Defense Mapping Agency Data. IEEE 1984, National Aerospace and Electronics Conference, Dayton, May 1984, vol. 2, pp. 1057–1064.
Buck: Digital Map Products and the Avionics Requirement-Can DMA Meet the Challenge? IEEE 1984 National Aerospace and Electronics Conference, May 1984, vol. 1, pp. 76–81.

Primary Examiner—Felix D. Gruber
Attorney, Agent, or Firm—Hall, Myers & Rose

[57] ABSTRACT

A computer controlled visual display system utilizing a complex set of inputs to develop a video display of a preselected terrain. The computer program utilizes three dimensional topographical data in combination with an aerial photograph to generate a series of images, each slightly difference from the previous one in the series, which, when displayed in the proper order, give the impression of proceeding along a predetermined flight path over a preselected terrain. The display can be used to brief pilots prior to a mission in order to familiarize the pilot with the terrain over which the mission will be flown.

15 Claims, 74 Drawing Sheets

PHOFILE

READ Digitized Photo

Setup of direct access data base for pixel data. Each record contains LREC Bytes of IPIX by IPIX megapixels. The span of the data base is ISPAN by JSPAN. Read in digitized photograph image tape (IREC byte records).

Read pixels from tape of digitized pucture. Input tapes use 9140 by 9140 pixels per picture. Output is 8192 by 8192 pixels organized as a left-to-right, bottom-to-top sequence of 32 by 32 pixel blocks. 32-by-32 pixel block fits inside DTED cell. Output is high resolution pixel data base.

Constants:

```
        IPIX  = 32
        IOFF  = 474
        JOFF  = 474
       ISPAN  = 8192
       JSPAN  = 8192
        LREC  = 16384
        IREC  = 9140
       IBLKS  = ISPAN * JSPAN/512 = 131,072
```

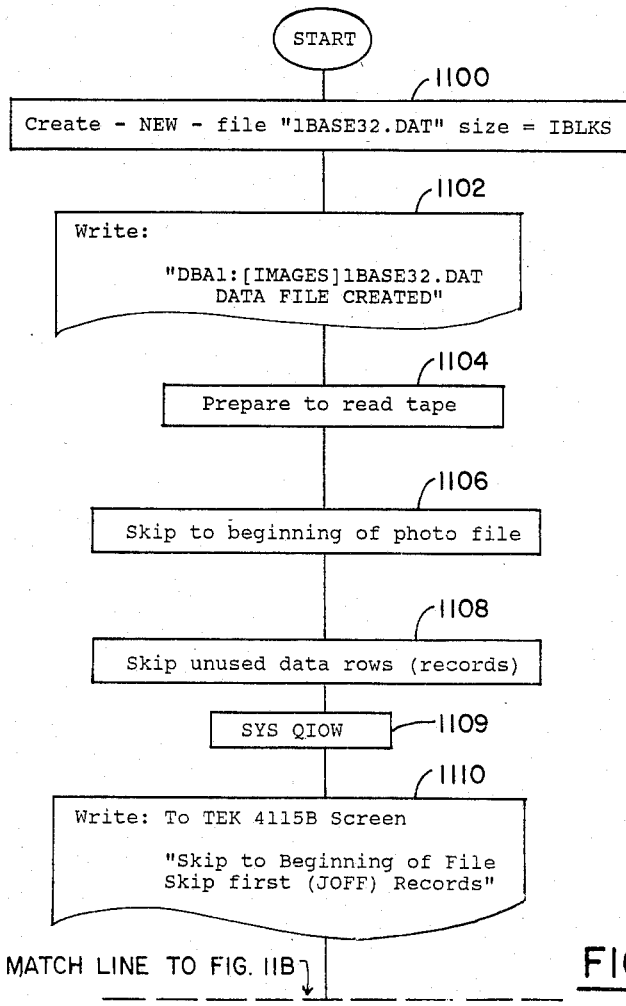

FIG. 11A

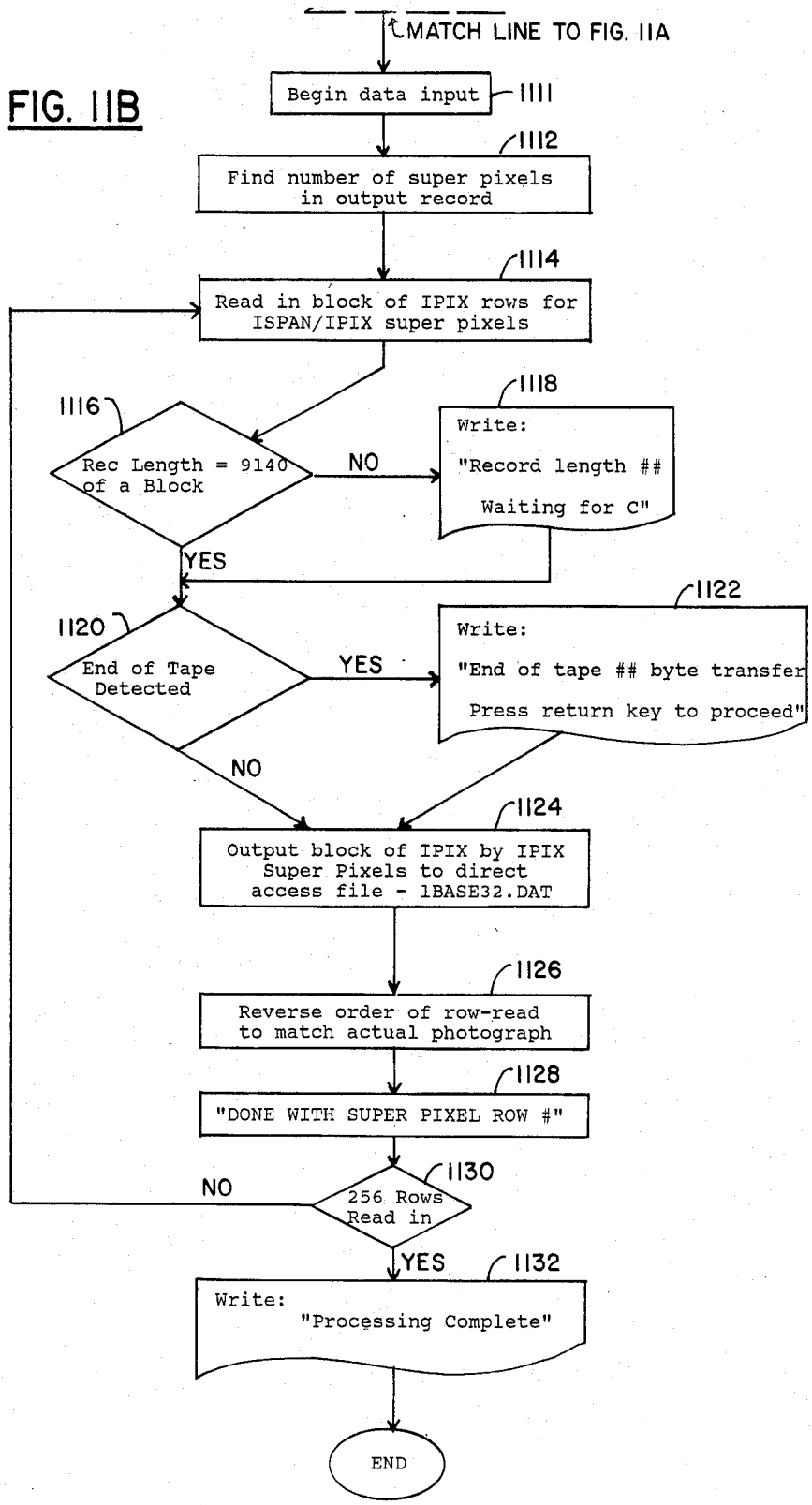

Program NEWFIT

FIG. 13A

CONSTANTS

```
NEXP    =      6
ISPAN   =   8192
JSPAN   =   8192
NBUFF   =  16384
IP      = 262144
MAXZOOM =     32    i.e.  [2** (NEXP - 1)]
MAXRECS =   4096          [(ISPAN * ISPAN)/NBUFF]
IXGRID  =    256          [ISPAN/MAXZOOM]
IYGRID  =    256          [JSPAN/MAXZOOM]
```

START

INITIALIZATION see above —1300

Call Subroutine SETUP —1302

1304
——— Subroutine SETUP ———

Setup for 4115B Terminal parameters for line display and dialog

Initialize Graphics Output Window

Initialize for MENU on side of SCENE

Define new graphics cursor using X or light line
ESC'RA' will set shade of graphics cursor 0 but not X or mode
Setup to use segments as blinking identifier text symbols Ensure proper orientation and size of graphic text symbols Enable GIN Rubberbanding 1306
```
SET:  NUMB_{1-6}  --     1,    4,   16,   64,  256, 1024
      INCB_{1-6}  --  4096, 1024,  256,   64,   16,    4
      IZOOM_{1-6} --     1,    2,    4,    8,   16,   32
```

— — — MATCH LINE TO FIG. 13B

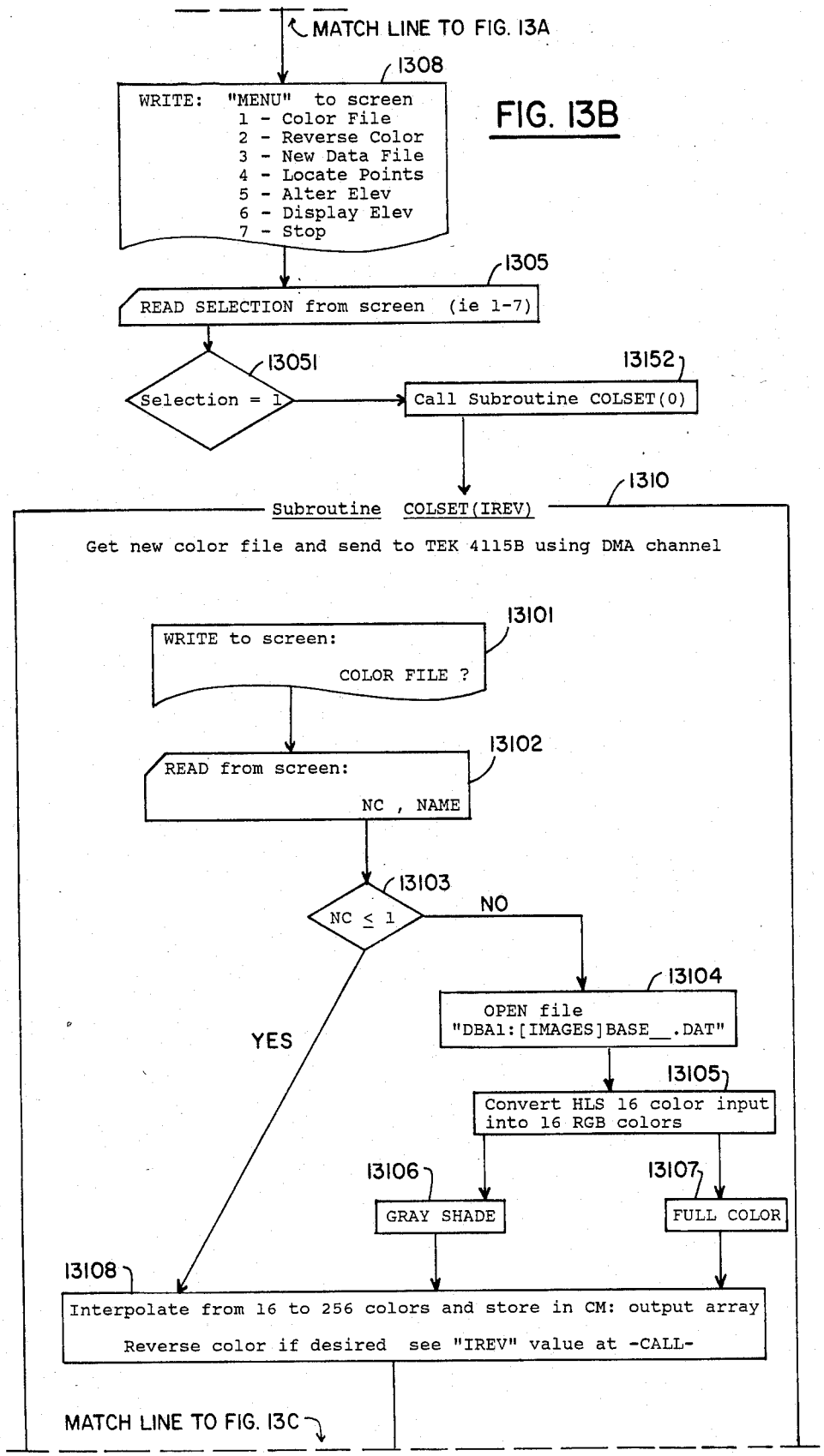

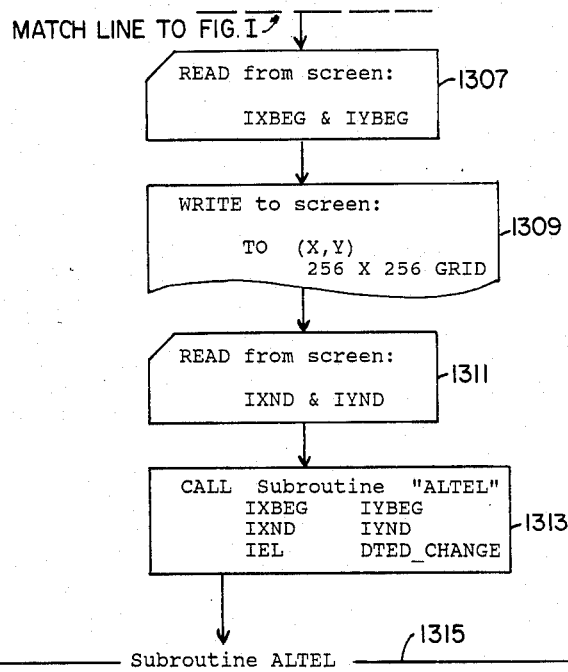
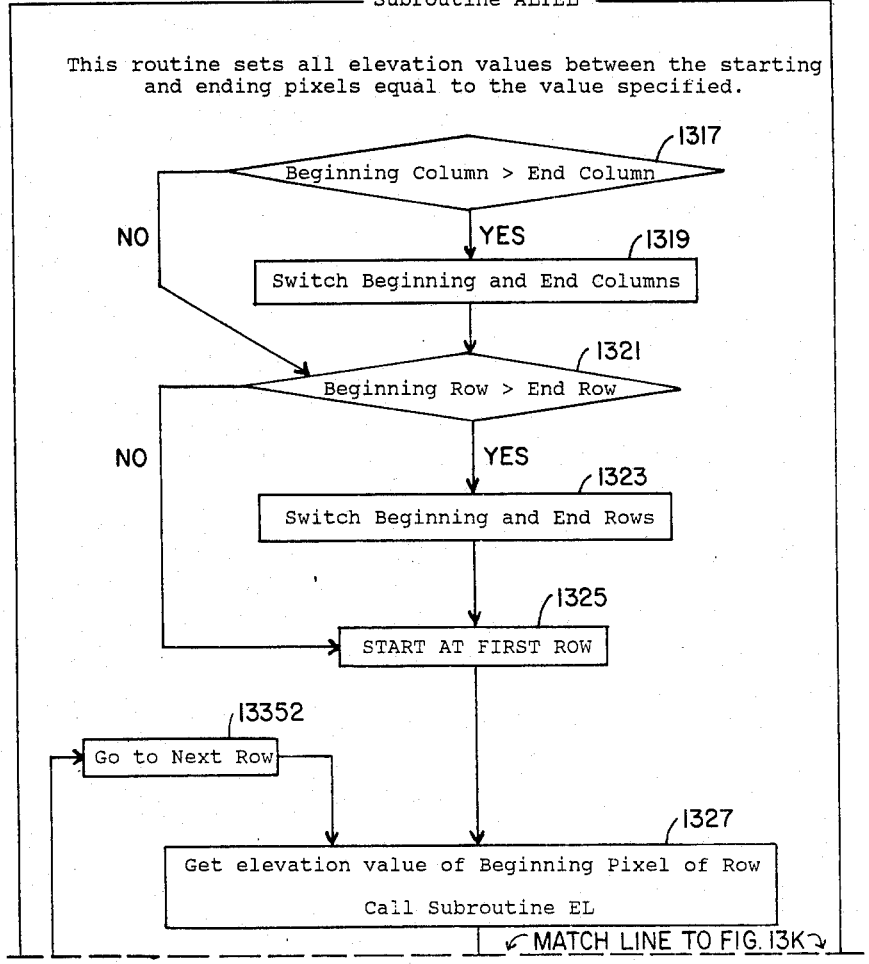
FIG. 13J

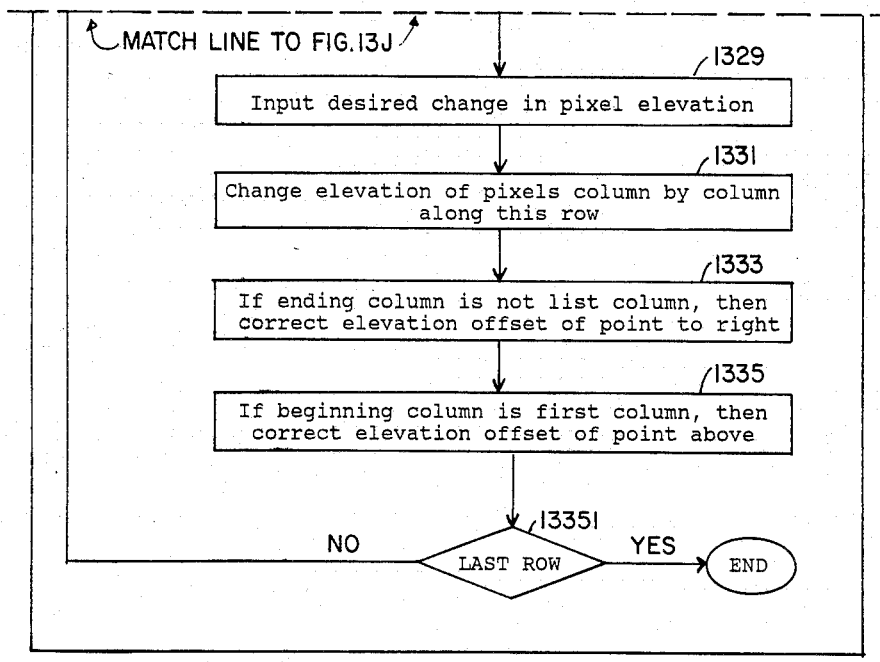
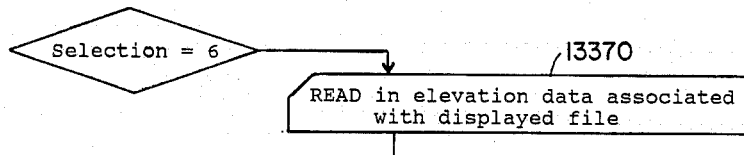
FIG. 13K
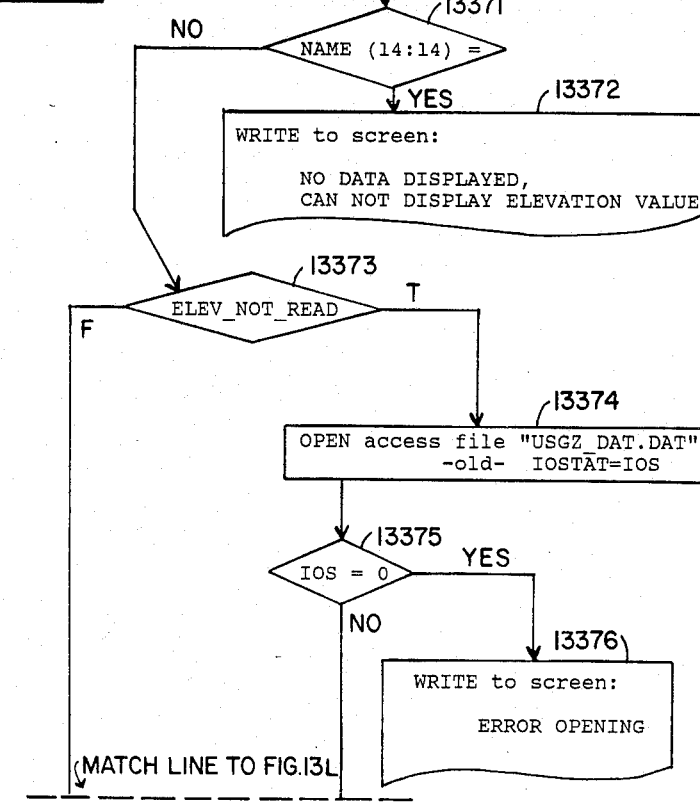

FIG. 14C

↳ MATCH LINE TO FIG. 14B

1431

WRITE: to screen and "USGTRAN.DAT"

Model (X,Y) and ERROR IN PIXEL COORDINATES

IX    IY    IX-JX    IY-JY

END

TDECODE

Tape Translate to DTED Matrix

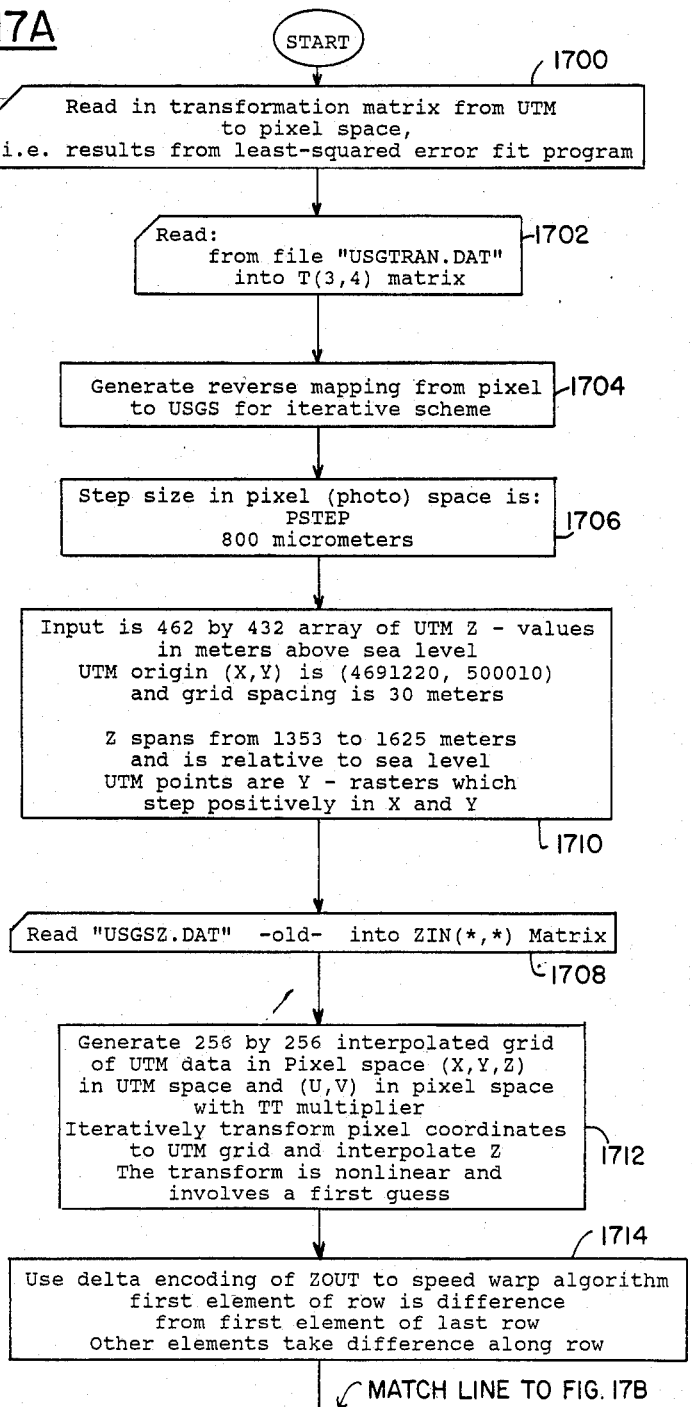

COEFMAT

Forward map version of polycoef using faster design matrix method
Polynomial coefficients are output for given trajectories
Link with polydted.OBJ "E"

SCENGEN

Generate Full warp scenes using parameters
from COEFMAT
to be used in interactive joystick
maneuver demonstratin MAN.FOR Control program for FULL-WARP Link with WARP.OBJ NXSMIN = -255
NXSMAX =  256      screen size
NYSMIN = -255
NYSMAX =  256
NBUFF  = (NXSMAX-NXSMIN+1) *3*2 = 3,072
OUT (-255:256)

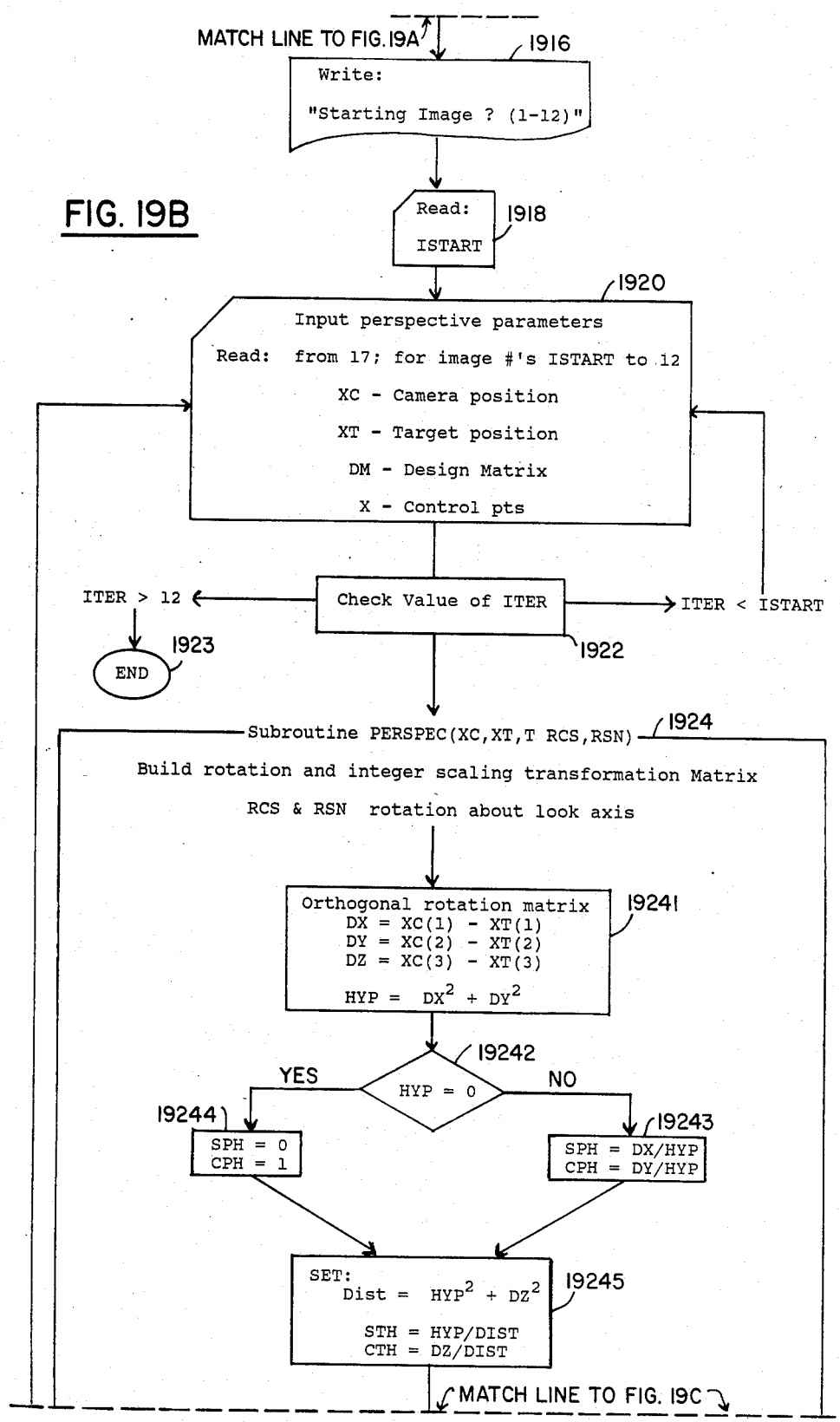

MAN

Concept of interactive joystick control of analog warp box.
Twelve scenes are switched as "flight" progresses.
The joystick is used to move off the nominal "flight" path
by altering the polynomial coefficients in Real Time.
Real Time interpolation between full warp scenes using analog warp box.

Use joystick to manuver camera (fixed target point)

Constants:

NX = 512
    NY = 512
    IBLK = 32768
    NBLKS = NX*NY/IBLK = 8
    JROWS = IBLK/NX    = 64
    NT = 12

FIG. 20A

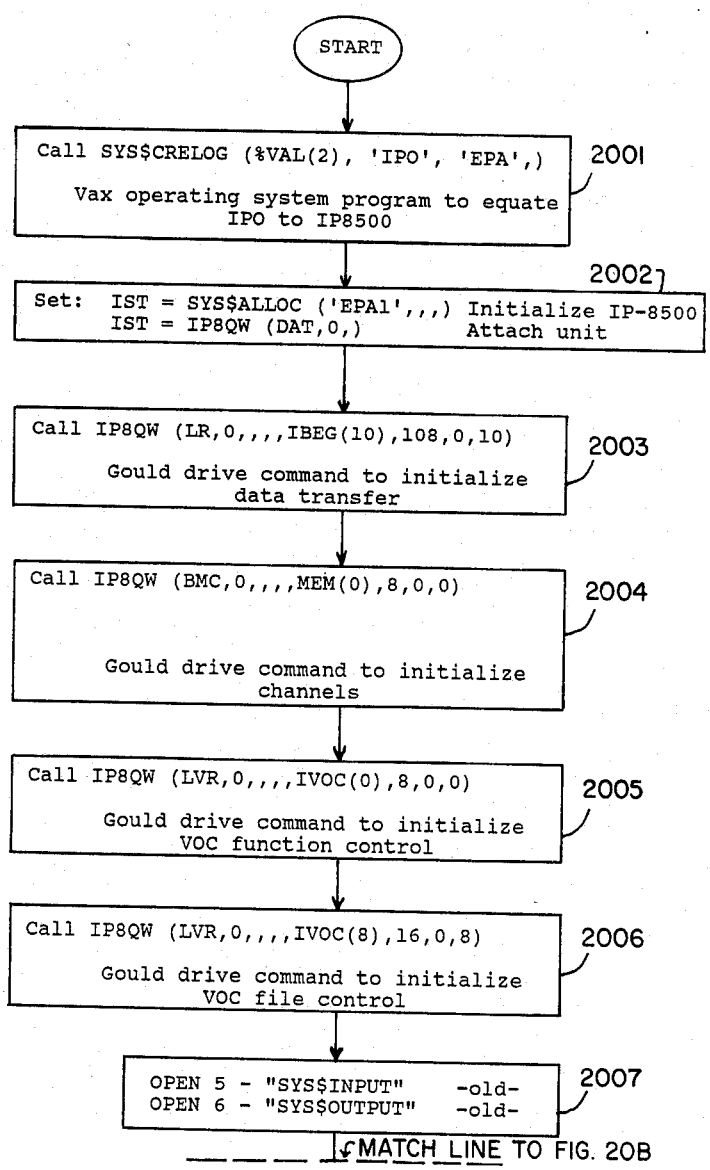

START

Call SYS$CRELOG (%VAL(2), 'IPO', 'EPA',)   2001
Vax operating system program to equate
IPO to IP8500

Set:  IST = SYS$ALLOC ('EPA1',,,) Initialize IP-8500   2002
      IST = IP8QW (DAT,0,)        Attach unit Call IP8QW (LR,0,,,,IBEG(10),108,0,10)   2003
Gould drive command to initialize
data transfer Call IP8QW (BMC,0,,,,MEM(0),8,0,0)   2004
Gould drive command to initialize
channels Call IP8QW (LVR,0,,,,IVOC(0),8,0,0)   2005
Gould drive command to initialize
VOC function control Call IP8QW (LVR,0,,,,IVOC(8),16,0,8)   2006
Gould drive command to initialize
VOC file control OPEN 5 - "SYS$INPUT"   -old-   2007
OPEN 6 - "SYS$OUTPUT"  -old-

MATCH LINE TO FIG. 20B

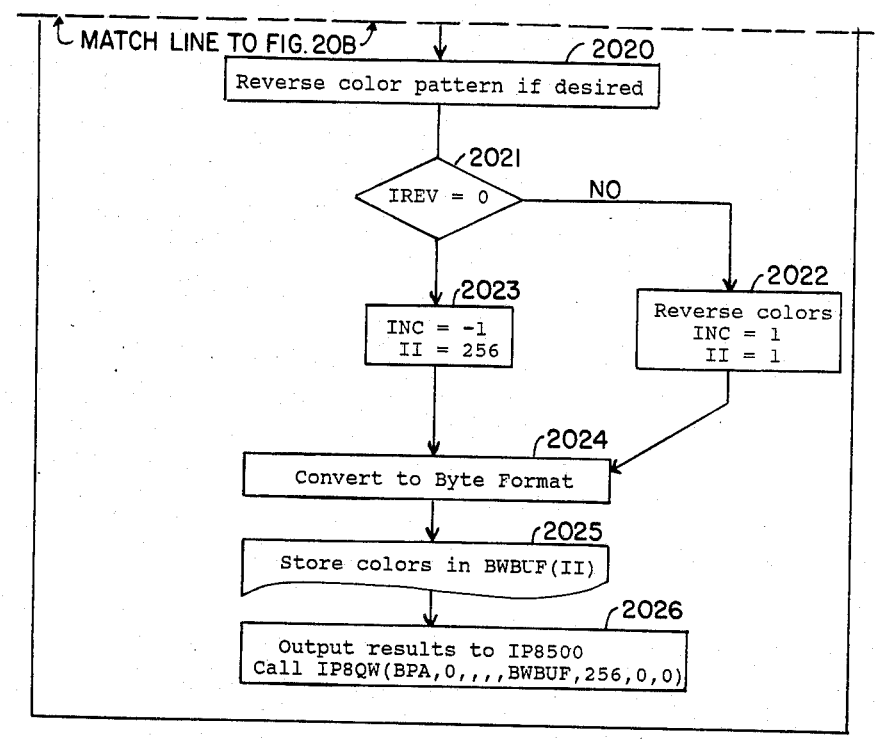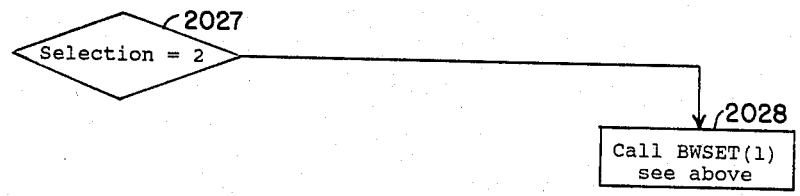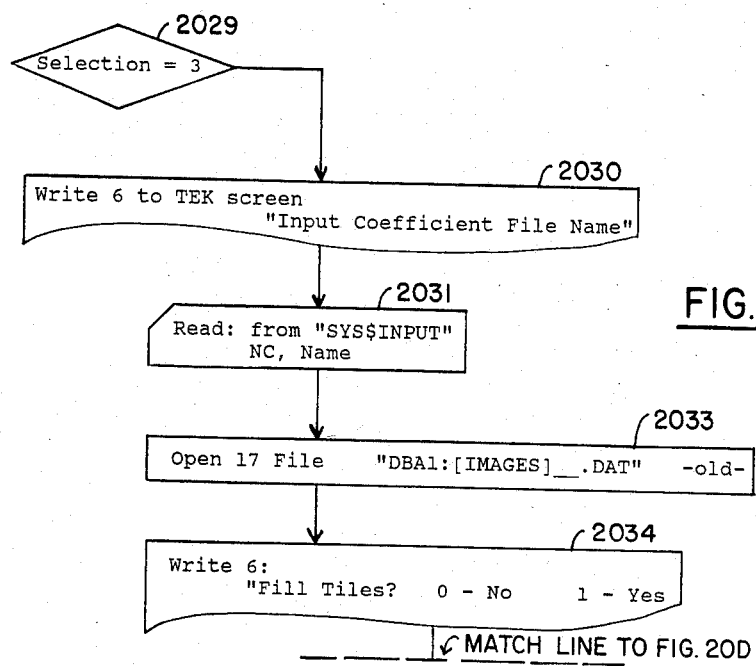
FIG. 20C

PAN

Pan through 12 images are Gould IP8500 memory tiles using joystick control interface registers 10-63.

Constants:

```
NX = 52
NY = 512
IBLK = 32768
NBLKS = NX*NY/IBLK = 8
JROWS = IBLK/NX

NTX = 6
NTY = 2
```

FIG. 21B
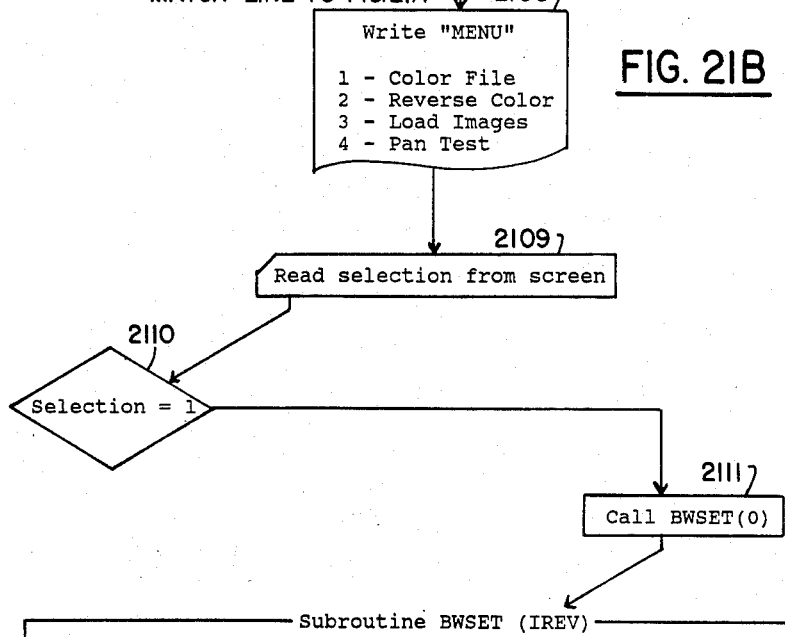
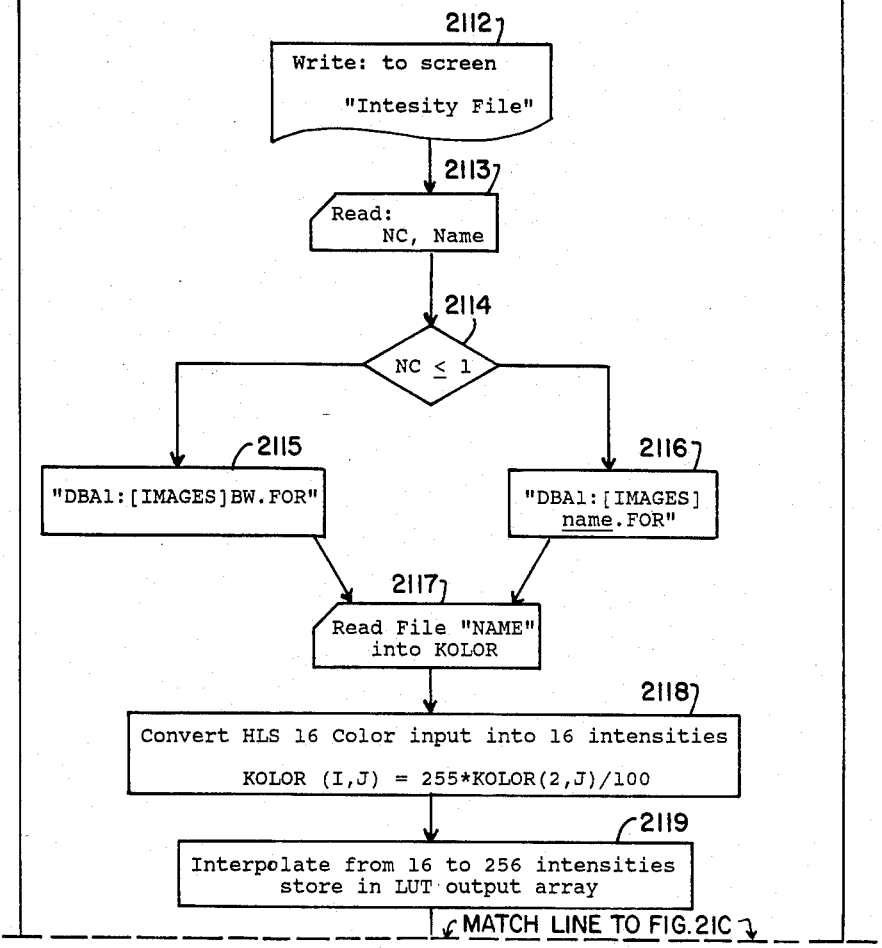

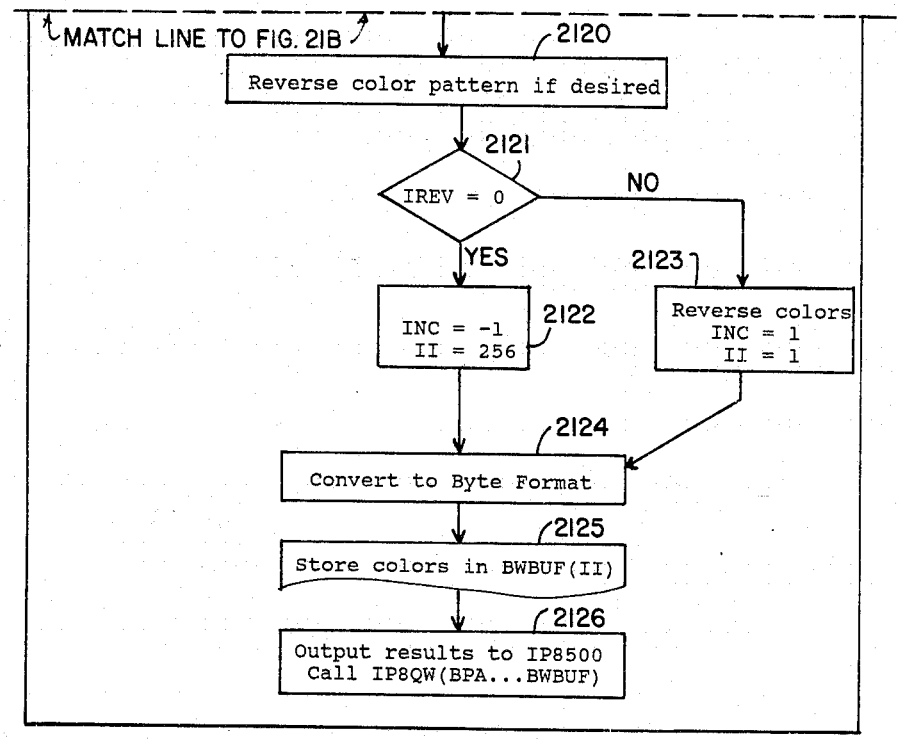
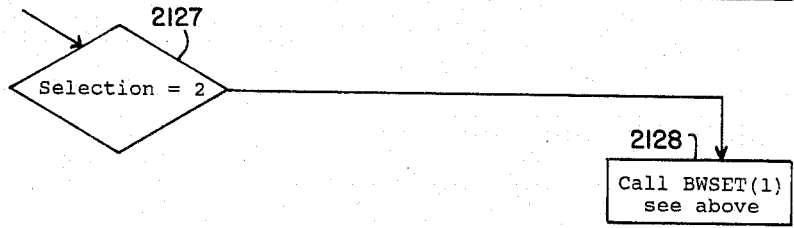
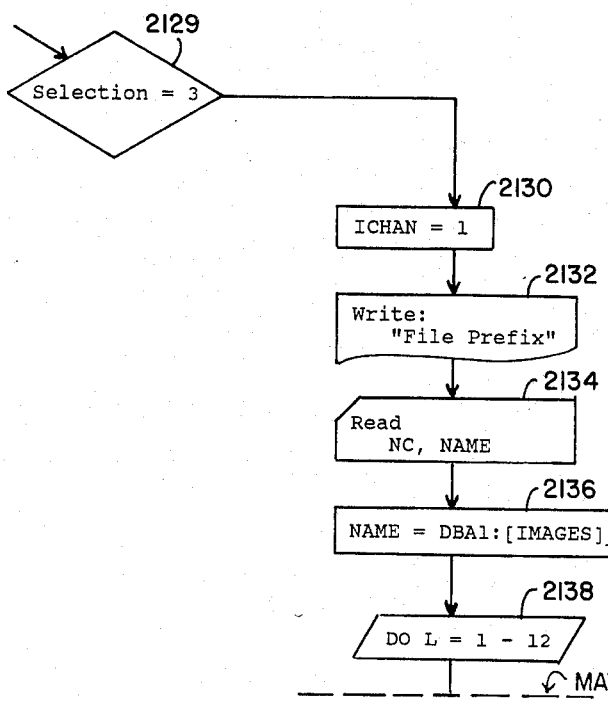
FIG. 21C

VISUAL TRAINING APPARATUS

REFERENCE TO MICROFICHE APPENDIX

A microfiche appendix of 15 microfiche and 344 total frames, containing computer program listings of the computer programs described in this application, has been submitted as part of this application and is incorporated herein by reference.

The present invention relates to a mission briefing system employing video display and more particularly to a method of combining digital terrain elevation data (DTED) and digital image data based on vertical photographs to provide a realistic video display of flight along a preselectable flight path over the selected terrain.

The article by Tucker, "Visual Simulation Takes Flight", *High Technology*, Dec. 1984, pages 34+, has a good overview of the current work in flight simulation and mission briefing. A first system discussed is Computer Generated Imagery (CGI) wherein a video image is developed wholly from a numerical model of real or imaginary terrain. No photographic or DTED information is employed. The display is stationary although cars, etc. may be made to move.

Another system discussed is one based on digitized topographic maps from which 3-axis coordinate grids are developed that represent the basic contours of the terrain; cars, roads, buildings, etc. are then filled in by the programmer.

In such a system the spatial relationships of various objects are represented in the data base. This information is used to continually reposition objects which are in the pilot's field of view.

Again, the display is stationary.

A second class of systems is image generation systems in which the display is updated approximately every 1/50 second. Multiple channels are employed, each generating a different part of the view which is then transferred to the active processor as required. The processor provides information necessary for projecting a three-dimensional coordinate model, and a display processor fills in hue, intensity, etc.

Scan line processing was, until recently, employed in most of these systems, but now some systems are employing area processing. Small areas are processed with detail in the foreground obscuring display of information in the background. Again, the selected areas (spans) are processed for shading, color blending, etc. Averaging is also employed.

Scene management is also employed in some CGI systems. Various levels of detail are recorded and selection is based on whether an area or region is located in the foreground or background. A gradual transition from one to the other may be employed to give the effect of approaching an object.

Additional CGI advances are discussed in the article but basically the systems still provide computer generated images of modest resolution, rather than high resolution displays.

A new approach at Honeywell is based on photographs recorded on video disks (CGSI). These digitized pictures are inserted into a CGI scene in real time. To represent a house, for instance, a photograph of the top and each side of the house is taken. These photos are then processed, as needed, to provide various correct perspective views of the house by "warping" the textures. An irregular object such as a tank requires hundreds of photos. As the observer moves over a terrain, a corresponding series of photographs is displayed on video. A real time system based on this approach has been developed by North American Philips by using super high speed video disks.

This latter approach can be combined with a computer-based terrain imagery system to provide greater realism.

Vought currently is photographing a gaming area while criss-crossing it. The images are scanned, processed and stored on video disks and are called up as the simulation viewer "flies" over the scene. The photos are stretched, warped, scanned, rotated, etc. to provide proper display, with the images being changed as dictated by a prediction algorithm.

Vought is now working on a system employing satellite pictures wherein a 3×6 mile scene is broken up into 600 pictures that are processed to insert 3-D detail. The images are then programmed for display in proper sequence.

Some current display systems provide a wide field of view wherein the technique is again used to provide high resolution views for near objects and low resolution views for far objects. Eye tracking systems are also used to provide an out-of-cockpit view that tracks the viewer's field of vision. Such systems employ projectors that display different fields of resolution as required to simulate the differences in definition between near and far objects.

Various U.S. patents, of course, also deal with these systems and other approaches. U.S. Pat. No. 3,233,508 employs movies, projections, and anamorphic optics to distort the images in two planes to provide the warping function. U.S. Pat. Nos. 3,631,610; 3,639,034 and 3,611,590 all disclose variations of visual systems which use optics in projection systems to distort, warp, expand or contract scenes.

In all of the above systems, either no real information is employed or if such is employed, most of the information is generated other than from real images. In one system photos are used, but not elevation data. In another, terrain data is used, but no photographs. Thus, in each such case at best half of the displayed information is real imagery.

BRIEF DESCRIPTION OF THE PRESENT INVENTION

In accordance with the method of the present invention, a video display of flight over a given area of terrain, to familiarize a pilot with the view of the terrain from the pilot's point of view, is provided. Although the following description talks in terms of flight, the principles set forth are equally applicable to movement over a given region whether it be by air, land, water or underwater craft.

The method, in its broad concept, employs Digital Terrain Elevation Data (DTED) from any available source; the Defense Mapping Agency and the U.S. Geological Survey (USGS) being two of the most readily available in this country. This information may also be derived from stereo photographs processed on a stereo comparator or from digitized stereo photos processed totally by computer using digital auto-correlation techniques. The USGS information is used in describing the present invention. The materials required comprise one tape; the digital terrain elevation data (hereinafter USGZ) tape to supply elevation data, and a quad sheet control points (hereinafter UTM) printout supplied with the USGZ tape, which specifies the grid location of important points in the area; cross-roads, bridges, a prominent hill, etc.

The present method also requires a photograph or other imagery taken from above to supply shading and object appearance. The photograph is digitized and stored, and pixel images of decreasing resolution are made and stored to provide changes in definition with distance from an observer. Prominent points (pixel arrays) in the photograph are aligned with their conjugate points on the quad sheet, allowing a mapping of USGZ data locations into camera coordinates. Specifically, the USGZ data is rotated into the plane of the video display; i.e., perpendicular to the line of sight of the pilot observer so that the video display is properly positioned relative to the observer. Thereafter, corresponding points in the imagery are aligned therewith so that a complete match of camera coordinates and elevation between the DTED and picture information (pixel data) is provided.

In a simulated fly-over, a ground point target is selected and a first perspective view is chosen as the fly-over field is entered. This first perspective (full warp image) is determined by a flight path chosen by an operator and the first picture is "warped" by computer generated polynomial coefficients to update the picture information, preferably at each video frame. The polynomial update does not produce perfect alignment especially at low observation angles and misregistration is progressive. To prevent serious misregistry the movement of a group of pixel control points which link the USGZ to full warp image points is tracked and when the control points become out of registry by a selected error factor, the information necessary for providing a new full warp image is generated and stored.

The above procedures occur in non-real time and, as indicated, generate and store the information necessary to produce a series of full warp images.

When it is desired to display the fly-over in real time, a first full warp image is displayed which is again, but this time visually, warped at each frame and tested against an error criteria. A new full warped image is displayed when another full warp image in the sequence is closer than the current one.

BRIEF DESCRIPTION OF THE DRAWINGS

FIGS. 11A and 11B illustrate the flow diagram for the program PHOFILE;

FIGS. 13A–13M illustrate the flow diagram for the program NEWFIT;

FIGS. 14A–14C illustrate the flow diagram for the program CAMPAR;

FIGS. 17A–17D illustrate the flow diagram for the program MAPZ.

FIGS. 19A–19D illustrate the flow diagram for the program SCENGEN.

FIGS. 20A–20J illustrate the flow diagram for the real-time program MAN.

FIGS. 21A–21E illustrate the flow diagram for the real-time program PAN.

DETAILED DESCRIPTION OF THE PREFERRED EXEMPLARY EMBODIMENT

Figure 1A:
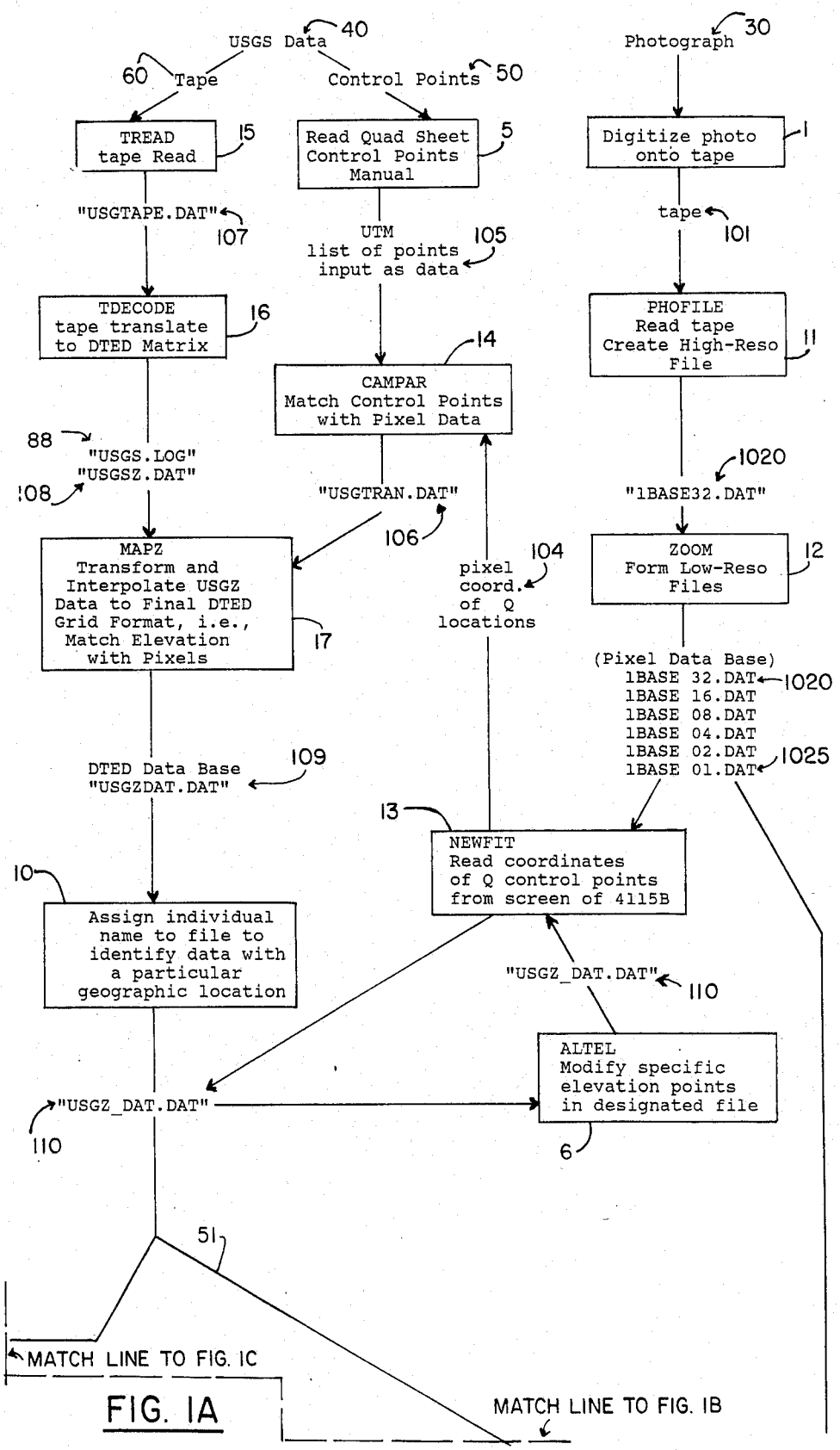
FIG. 1, composed of FIGS. 1A, 1B and 1C, is a block diagram of the method of the present invention.

Referring now specifically to FIG. 1 of the accompanying drawings, the method of the present invention is illustrated in block diagram format. Programs identified in the blocks perform most of the major steps of the method, other steps are performed by the operator. In the method, three sources are employed: First, a tape containing DTED information; second, a listing containing information on control points in UTM (universal transverse mercator) coordinates for the area encompassed within the DTED area, and third an aerial or satellite photograph taken perpendicular to the terrain. The quad sheet control points relate to readily identifiable landmarks in the area being surveyed and thus can be easily located in the photograph of the region to obtain their pixel coordinates. These control points correspond to specific locations in the USGS information so that once their pixel coordinates are obtained, the DTED data and pixel data can be properly aligned and correlated.

Now, describing the method in detail, the photograph 30 is digitized, step 1. One appropriate equipment for performing this function is the System C4500 Colormation Mark II manufactured by Optronics International Inc., Chelmsford, Mass. The digitized picture information 101 is processed, step 11, FIG. 1A, by program PHOFILE to create a high resolution storage file 1020 called 1BASE32.DAT. This file is then processed, step 12, FIG. 1A, by program ZOOM to form a plurality of six scenes of different resolutions 1020–1025, for subsequent use in the foreground, the background, and in intermediate positions to permit generation of a composite video display that closely follows the resolution as seen by the naked eye.

In the particular program described below, six different resolution fields, stored in files, are employed; the one of greatest resolution 1BASE32.DAT having each pixel represent a nominal 1 square meter of terrain and the lowest resolution 1BASE01.DAT having each pixel representing a 32 meter by 32 meter square area, i.e.

1024 square meters. Thus, the resolution array is 32, 16, 8, 4, 2 and 1 pixels per 32 meters squared. These six constitute the pixel data base.

The next step in the method (step 13) employs an operator interactive graphics program. The operator displays on the screen of a Tektronix 4115B graphics display device, for instance, or like equipment, the high resolution display 1BASE32.DAT of the entire terrain and selects those terrain features which he thinks may correspond to the control points provided by the quad sheet. This is usually a relatively simple task since obvious terrain locations are chosen. He determines the addresses of these features in pixel coordinates for use in step 14 of the method.

The USGS information 40 must also be processed for use in the present system. Contour charts are supplied by the USGS so that the specific features defining the control points 50 can be located. Control points are read from the printout in UTM coordinates, step 5, and are input into program CAMPAR in step 14 as a data set 105. Typically, there are nine control points per picture.

Step 14, performed by program CAMPAR and the operator, correlates the pixel coordinates 104 of the control points 50 with the UTM coordinates 105 of the control points 50 thereby aligning the pixel data and the USGS data to yield a corresponding overlap when the two are combined.

Figure 2:
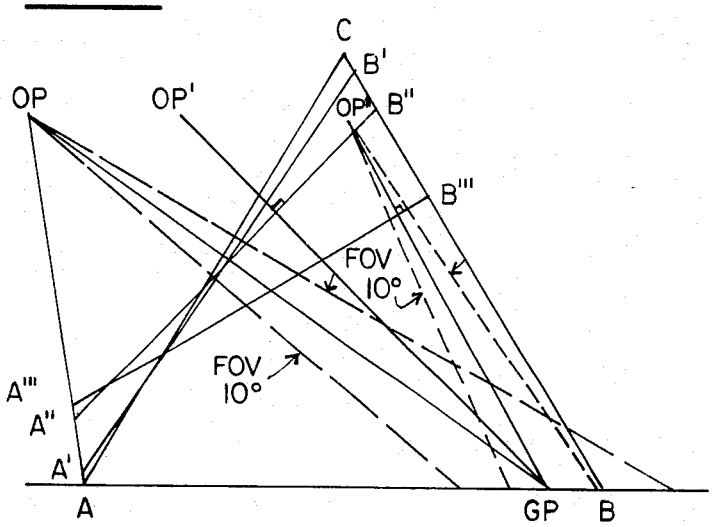
FIG. 2 is a diagram of the location of a camera used in photographing the terrain and of one position of an observer relative to that terrain.

The pixel coordinates assigned to the control points 50 initially relate to locations in the terrain and not in the plane of the video screen. For an explanation of the process required to convert terrain locations to video screen locations (step 14) reference is made to FIG. 2. The picture is initially taken vertically to cover a large area A-B. The target ground point is designated GP. The initial location of the pilot or observer is denoted as OP, for observation point. The line of sight to the observer is OP-GP and lies at an angle to the plane of the terrain. To properly display the picture on the video screen all points in the field of view, FOV, must be rotated about GP into a plane A'-B' perpendicular to the line of sight OP-GP. In the plane of the video screen, this rotation produces a perspective view. To provide appropriate display of different parts of the terrain initially, the control points are perspectively rotated as viewed from the camera viewing position; specifically, $U = X/W$ and $V = Y/W$ where U and V are elevation-weighted screen pixel locations; X and Y are unweighted screen pixel locations, and W is elevation data Z scale to the observation point OP; Z being the elevation data provided by the quad sheet. It should be noted that the elevation data thus incorporated into the U, V coordinates permits subsequent registration with the same points in the DTED.

The above process provides what is subsequently referred to as the camera model, the coordinates of which are designated $X_c$, $Y_c$ and $Z_c$, while X, Y and Z denote the USGS control point locations. The camera model (a matrix of coefficients) is the entire scene defined in screen coordinates and in alignment with the control points provided by the USGS quad sheet data. This data is recorded on the system disk for future use as file "USGTRAN.DAT" 106.

The other portion of the DTED; namely, the elevation values must be extracted from the USGS tape 60. The tape 60 is read by the VAX 11/780 using program TREAD (step 15). The raw information from the tape 60 is stored in file "USGTAPE.DAT" 107. The information on the tape as received, is already digitized, but must be processed to extract the DTED from other data on the tape that is not used in the present method.

The information in the form of file "USGTAPE.DAT" 107 is processed in step 16 by program TDECODE to separate the desired portions of the data. The elevation data is stored in file "USGSZ.DAT" 108. The other data is read into file "USGS.LOG" 88.

In the next step, step 17, the file containing the elevation data 108 and the file containing control points tagged with their pixel locations 106 are combined. A final DTED grid format is created and stored in a file named "USGZDAT.DAT" 109. The picture information, for purposes of this invention, is displayed by 8192 by 8192 pixels divided into an array of 256×256 DTED points, thus producing 255×255 DTED cells of 1024 pixels each. The method employs one elevation point per DTED cell. For storage purposes each DTED cell is stored as four points defining its boundaries, with each contained pixel when subsequently painted on the screen representing from one square meter to 1,024 square meters from foreground to background, all at one elevation.

In this step 17 of the program, the DTED information is transformed to pixel space so that the elevation, (Z), data corresponding to the control points on the quad sheet are aligned with the camera model control points. This process uses iterative interpolation producing convergence of the DTED locations to the pixel control points. The DTED data is stored as Z, sequentially from left to right with respect to the lowest left pixel on the screen. Specifically, in each row starting with the lowest row to be painted on the screen, the change in elevation is with respect to the left neighbor. In between rows, the left-most pixel elevation is recorded as the change from the left-most pixel of the row immediately below. Thus, accumulated errors are greatly reduced without having to record the Z data for each DTED cell, with a consequent saving of considerable storage space.

At the end of this process there has been produced 255×255 (65,025) cells each containing the elevation information in camera space of each such cell in Z form. Each cell has one elevation assigned thereto and in a final picture, as is described subsequently, 1024 (32×32) pixels define the space within each cell.

The temporary file "USGZDAT.DAT" is then renamed by the operators in step 10 to identify the file with a specific geographic location, e.g., S.W. Arizona.

In simulating the flight over a terrain in realtime, a first view of the target from the furthermost distance in the scene is to be generated, this view representing the starting scene for the mission briefing fly-over. This scene is modified (warped) as the observer moves over the terrain until the modifications produce sufficient distortion that an entirely new scene must be created and used as the basis for additional warping and so on. Each of the new scenes is hereinafter referred to as a full warp image. Each full warp image when displayed is rewarped every 30th of a second (every frame) to reposition the image to represent movement in the interval between video frames. Warping occurs in a warp box which is fed polynomial warping coefficients to cause the scene to change with each frame. The polynomial warping approach, however, is not totally accurate and after a time the display is no longer accurately aligned with the USGS control points and a new full warp image must be created. In order for the real-time program to know at what point to read in a new scene the same basic procedure as employed in non-real time is used.

The following steps utilized as subprograms of Program COEFMAT 18 or FILMPAR 39 in the process are employed to determine when new full images are required both in real time and non-real time. This determination is made by selecting from the pixel base 1020 an 8×8 array (64 points) 117 (FIG. 1B) of locations in the scene and selecting from this array nine generally equally spaced locations as bench marks for comparison with the DTED data 110 to determine the effects of the warping process. If any of these points fall on indistinguishable areas such as sky, new points are chosen in distinguishable regions.

Flight path and speed information, 114 from subprogram TRAJEC 23, the 8×8 point array 117, and the DTED data base 110 are employed to generate a series of warping coefficients that move the nine points through the scene by rotation about the ground point (GP) (see FIG. 2) from observation point OP to point OP'. When these nine locations are too far out of registry with the USGS data (as determined by Error Criteria 113), a new full warp image is generated and recorded in non-real time, and the next stored image in the sequence is displayed in real time. In non-real time, step 19, program SCENGEN, generates these scenes when instructed by and supplied with a polynomial coefficient matrix 112 from step 18 program COEFMAT or step 39, program FILMPAR. This process is continued for the entire fly-over, thus creating a series of full warp images to be used in real time for viewing by the pilot being briefed.

During full warp generation, the picture is, in effect, broken up into a series of regions of differing definition up to a maximum of six. The viewing screen is filled from the bottom up, DTED cell by DTED cell, row by row. To start, a first and then a second row of 256 evenly spaced "corner" pixels each is laid down at each left margin of a DTED cell commencing with the lowermost left corner of the screen and moving to the right edge thereof. This process produces 255 cells defined by a pixel at each of the four corners of each cell. Then each square of four dots (a DTED cell) is filled with up to 1024 pixels. All pixels represent the same elevation but the gray of each pixel (or color and intensity of a color picture) is the average of the gray of all pixels falling at a given picture location. In filling in (painting) each cell, painting commences at the lower left screen margin and the cells are filled (from left to right) until the first row of DTED cells is completely painted. A third row of 256 corner pixels is laid down and each cell between the second and third row of pixels, is filled. This process is continued until the screen is completely filled, using levels of definition at each location on the screen as determined by the distance from the observer.

Figure 3:
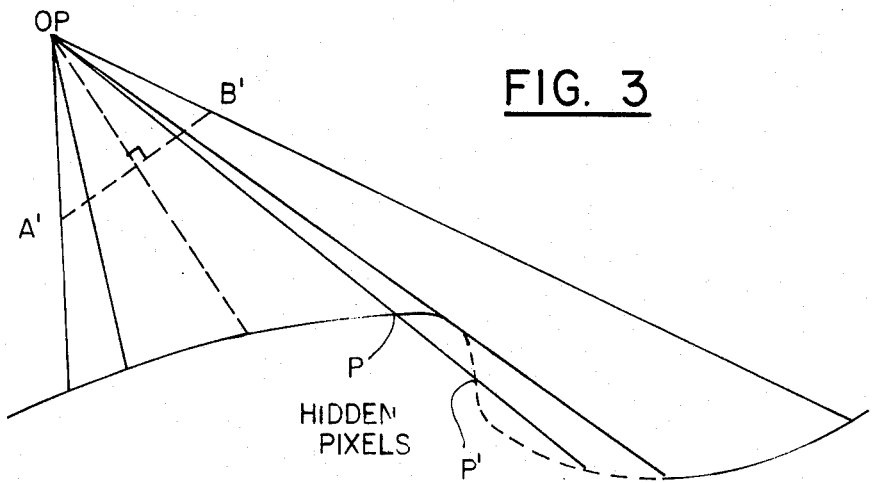
FIG. 3 is a diagram illustrating the effects of movement on the line of sight of the observer to the target.

It should be noted that during this process a determination as to which pixels to utilize, at a given location, must be made. Since the initial scene is taken vertically and then viewed on a slant (see FIG. 2), pixels will fall both in front of and behind a hill, for instance, when viewed along the line of sight of the observer. This situation is illustrated in FIG. 3 as points P and P', respectively. If two or more pixels of programmer-defined differing distances along the line of sight are found at the same location, the pixels nearest to the observer are used. If the two or more pixels fall within defined differing distances, they are averaged and the average painted at that location.

The non-real time part of the method has now been completed and the information to be used in the real time part of the method has been recorded and constitutes the pixel data bases, the DTED data base, the camera model, the full warp images and the trajectory. This material is now ready to be utilized by the various programs (PAN 21, MANDIS 41 OR MAN 20 necessary to produce the scenes from this information. The full warp images are displayed on screen 43 by the appropriate real-time program and warped as flight above the terrain progresses, until the distortion exceeds the error criteria and the next full warp scene in sequence is called up from memory and displayed on screen 43.

As to changes of the full warp pictures, warping coefficients are generated by a main computer and fed to a warp box to reposition the view with each frame until the error criteria is exceeded, at which time a new full warp picture is displayed.

In one particular system described below any twelve full warp scenes are stored, while in an alternative embodiment up to 800 DTED full warp scenes are stored, the increased storage being provided by a real time magnetic disk. In the program to be described below, the basic storage is provided by a Gould IP-8500 with 12 tiles.

The IP-8500 is provided with a joystick that permits two levels of maneuvering. In one level a simulation of climb and roll is provided. In the other level of control the observation point is moved laterally (horizontally) and vertically but the line of sight remains directed to the ground point. Programs for greater freedom of movement are available but have not as yet been integrated into the system.

Figure 4A:
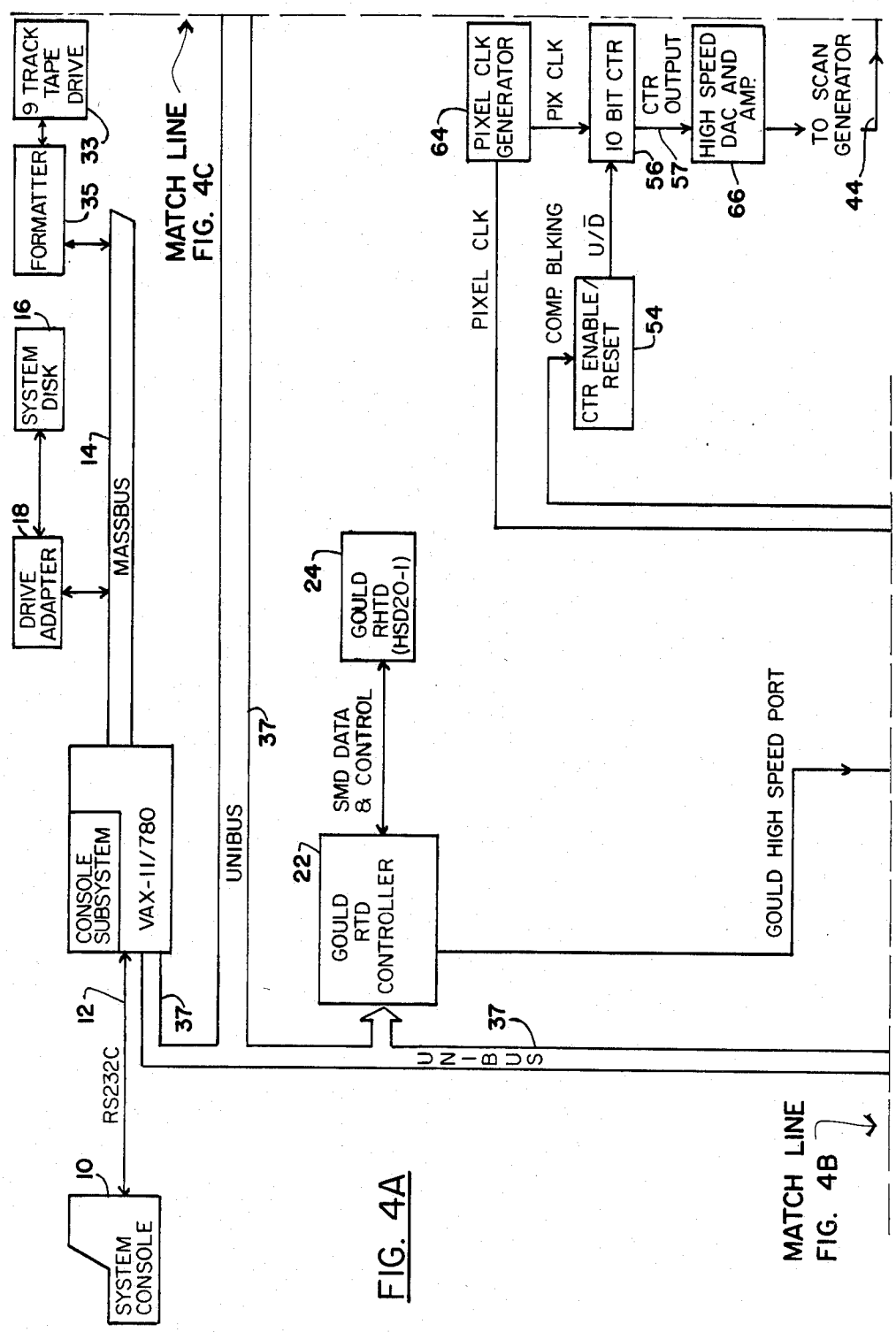
FIG. 4 is composed of FIGS. 4A, 4B and 4C, and is a block diagram of the equipment employed in producing the method of the present invention.
Figure 4B:
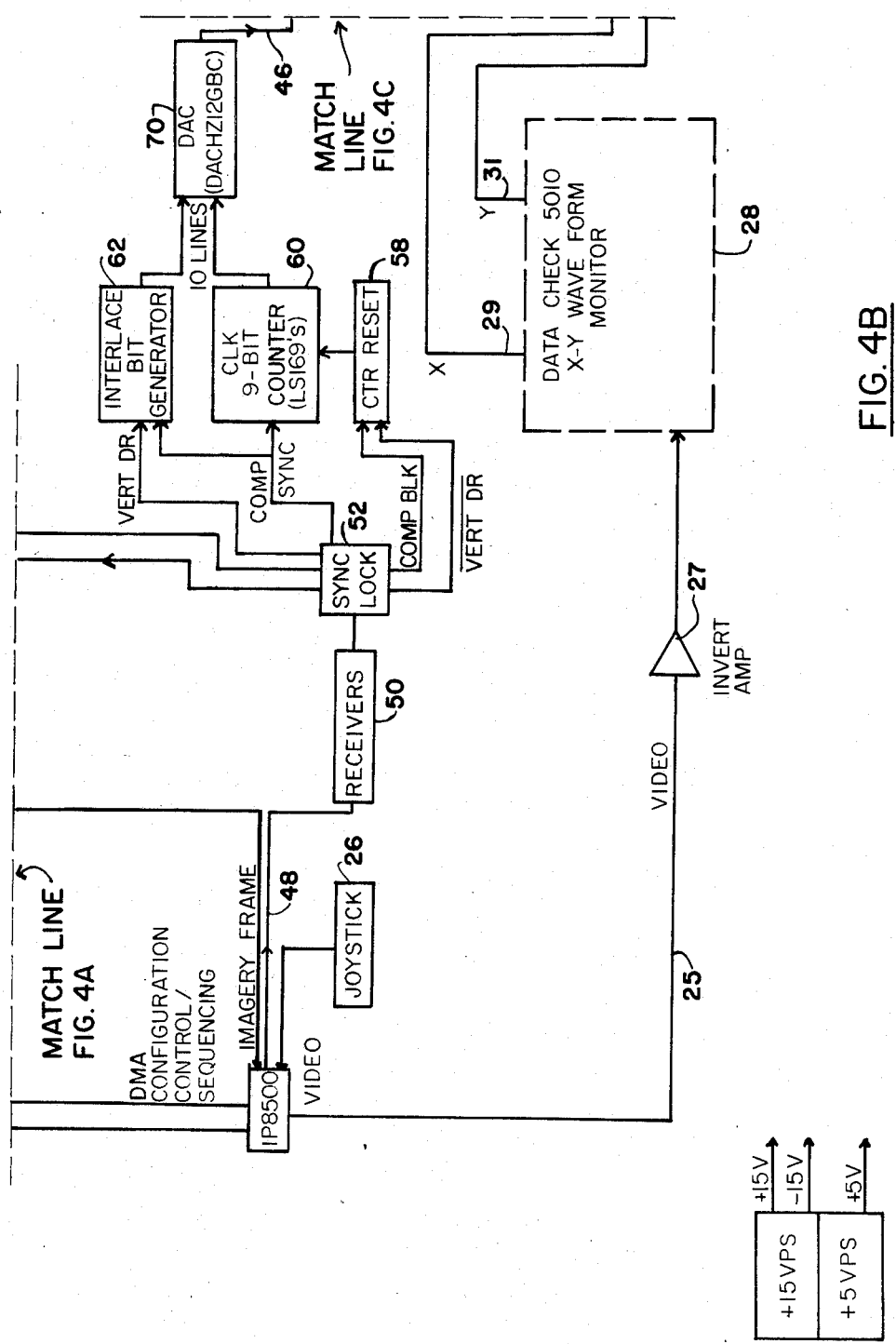
Figure 4C:
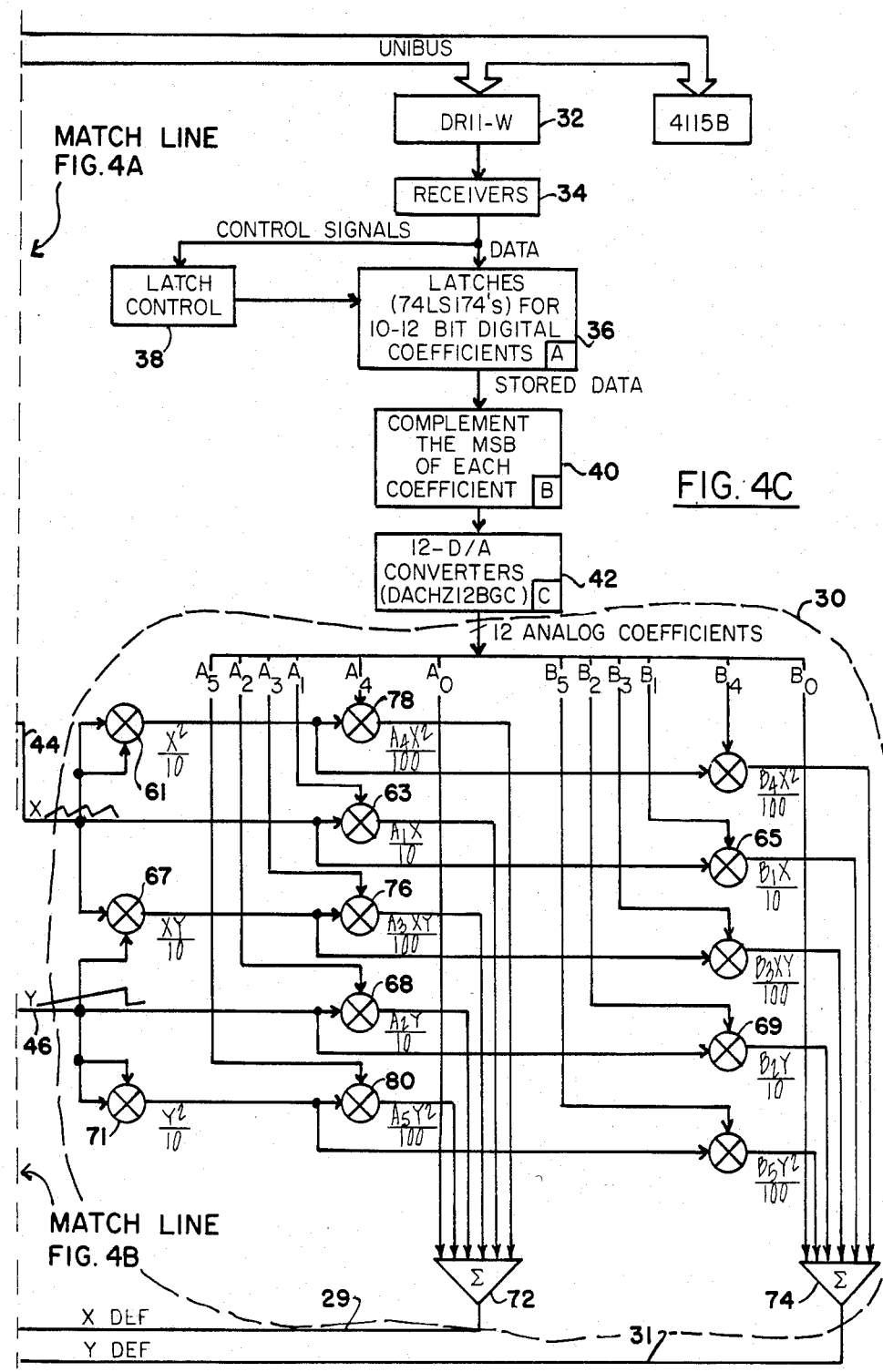

Referring now to FIG. 4 (composed of FIGS. 4A, 4B and 4C) of the accompanying drawings, there is illustrated a block diagram of both the non-real time and real time hardware on which the programs of the present invention are run to perform the above-described method.

The main computer employed for the data processing is a VAX 11/780 manufactured by Digital Equipment Corporation. The computer must have at least two megabytes of RAM. The system disk uses a standard operating system (VMS) and has at least 100 megabytes of memory. A nine-track tape drive 33 capable of reading the 1600 BPI tape from USGS is required. The compiler is VAX 11 Fortran and uses Fortran 77 with ANSI standard X-3.9, 1978, switch selectable to ANSI standard X-3.9, 1966. The computer is provided with a MASSBUS 14 for communication with the system disk 16 and/or the tape drive 33, if either or both is a MASSBUS device, and a UNIBUS 37. Finally, the main computer also has an FP-780 floating point accelerator. The computer is also supplied with DR11-W interfaces but these are illustrated with the equipment with which they interface.

The hardware also employs a Gould IP-8500 Digital Video Processor. The processor has 12 (but can employ up to 16) image memory tiles. It has no internal software and is driven by the VAX. It does include image processing firmware and utilizes the LIPS (Library of Image Processing Routines) programs stored in the VAX. The IP-8500 uses in this system standard resolution (512×512×8) and one video output controller.

Referring now specifically to the block diagram, the system employs a system console 10 connected via an RS232C serial line 12 to the VAX 11/780. The console is employed as the input device for inputting the trajectory $E_t$ commands, and other manual commands, required in the method. As indicated above, the VAX drives, via Massbus 14, an RP06 Massbus system disk 16, via a drive adapter 18. Also, a TE16 tape drive 33 via a formatter 35. A Unibus-driven disk could be employed as an alternative to the RP06.

The VAX has a Unibus 37 for communication with a Gould real time disk controller 22 employed to control one or more Gould real time disks HSD20-1 designated by reference numeral 24. The present method employs only one such disk at this time. The Unibus 37 also communicates with the IP-8500 digital video processor, as does the output of controller 22. A joystick 26 is provided by Gould as an option with the IP-8500 system.

The video output from the IP-8500 is provided via lead 25 and amplifier 27 to a video monitor 28 which is a Data Check 5010 X-Y waveform monitor. The X and Y horizontal and vertical sweep voltages to the monitor 28 are derived from a warp box generally designated by reference numeral 30, via leads 29 and 31, respectively.

Returning to the Unibus 37, it also communicates with the direct memory access (DMA) of a Tektronix 4115B image processor employed (hereinafter referred to as "TEK") in Step 23 of the method as illustrated in FIG. 1. The Unibus 37 is also connected via parallel drive 32, a DR 11-W, with the coefficient processing circuits serving as the input circuits to the warp box 30. These processing circuits comprise receivers 34, latches 36, latch controls 38, a complementer 40 for the most significant bit of each coefficient and 12 digital-to-analog converters 42 to provide 12 analog coefficients to the warp box 30. The receivers 34 and latch control 38 constitute a parallel interface to the remaining circuits.

The warp box 30 is provided with horizontal (x) and vertical (y) sweep input signals via leads 44 and 46, respectively. The horizontal sweep signals are synchronized by the IP-8500, via a lead 48 to receivers 50, to a sync lock 52 which supplies five output signals, a COMP.BLKING to a counter enable reset 54 of a 10 bit counter 56, COMP.BLK and VERT DRIVE signal to counter reset 58, a COMP.SYNC signal to a 9-bit counter 60 and an interlace bit generator 62, and also a VERT DR. signal to the generator 62. The output of the sync lock 52 is clocked by a pixel clock generator 64 which also supplies pixel clock signals at approximately 14 MHz to 10 bit counter 56. In this manner the horizontal sweep is synced to both the pixel rate and the frame rate, which is also synced by the by the IP-8500 to its video signals output. The output of the 10 bit counter 56 is fed via a high speed digital to analog converter and amplifier 66, via lead 44, to the warp box.

The interlace bit generator 62 and counter 60 provide 10 lines to digital-to-analog converter 70 that feeds the y scan lead 46 to the warp box 30; the interlace bit generator 62 adding a single bit to provide the offset necessary for interlacing the scan.

The output wave forms from the scan (sweep) generators are illustrated on leads 44 and 46 in FIG. 4B and are of conventional formation. The X or horizontal sweep is fed directly to four multipliers 61, 63, 65 and 67 and the vertical sweep signal is fed to four multipliers 67, 68, 69 and 71. In multiplier 61 the horizontal sweep signal is squared to produce polynomial term $x^2$ and is multiplied in multiplier 67 with y to produce polynomial term xy. The y term is squared in multiplier 71 to produce polynomial term $y^2$. Each multiplier in the warp box divides by 10 as a scaling factor so that the multipliers 61, 67 and 71 actually produce $x^2/10$, $xy/10$ and $y^2/10$. The coefficients for the polynomial are supplied to the warp box 30 from the 12-D/A converters 42 and are labeled $A_0$ through $A_5$ and $B_0$ through $B_5$. The coefficients $A_0$ and $B_0$ are offsets and are fed directly to output summation circuits 72 and 74, respectively. Coefficient $A_1$ is supplied to multiplier 63 to produce $A_1X/10$ while coefficient $A_2$ is supplied to multiplier 68 to produce $A_2Y/10$. Coefficient $A_3$ is supplied to a multiplier 76 which also receives the output of the multiplier 67 to produce $A_3XY/100$. Coefficient $A_4$ is multiplied with the output of multiplier 61 in multiplier 78 to produce product $A_4X^2/100$ and coefficient $A_5$ is supplied to multiplier 80 together with the output of multiplier 71 to produce $A_5Y^2/100$.

The outputs of multipliers 63, 68, 76, 78 and 80 are all supplied to the circuit 72 to produce the horiizotal sweep polynomial $A_0+A_1X/10+A_2Y/10+A_3XY/100+A_4X^2/100+A_5Y^2/100$. The output of the Vertical summation circuit 74 is $B_0+B_1X/10+B_2Y/10+B_3XY/100+B_4X^2/100+B_5Y^2/100$. The coefficients vary as previously indicated, as a function of movement between full warp images; the coefficients being generated based on a rotation matrix in the VAX; the rotation being about the target GP in FIG. 2. Thus, as the observer moves from point OP to OP' to OP" the camera axis is moved to maintain the ground point GP along the camera axis by rotating the axis about GP as a center. If the angle of the field of view is maintained the same at all points along the trajectory, the field of view (FOV) at the plane AB is narrowed, as is apparent.

The coefficients supplied by the Unibus to the DR 11-W 32 and receivers 34 is a 16-bit number. The four most significant bits designate the coefficient being sent and are stripped off by the receivers and supplied to the latch control 38 to provide proper distribution of the coefficients to the various multipliers of the warp box.

The remaining 12 bits of each coefficient proceed to the latches 36, as previously indicated. These bits are referred to as the coefficients.

It should be noted that the most significant bit of each coefficient is complemented in the circuit 40. Reference is made to Table 1 below for an example of the processing performed by the circuits 36, 40 and 42 labeled with an A, B and C, respectively, in the lower right-hand corner of the blocks of FIG. 4C to provide a tie-in to Table I.

TABLE I

| A OUTPUT | | | B OUTPUT | | | C OUTPUT |
|---|---|---|---|---|---|---|
| MSB | | LSB | MSB | | LSB | (VOLTS) |
| 1000 | 0000 | 0000 | 0000 | 0000 | 0000 | 9.9951 |
| 1011 | 1111 | 1111 | 0011 | 1111 | 1111 | 5.0000 |
| 1111 | 1111 | 1111 | 0111 | 1111 | 1111 | 0.0000 |
| 0011 | 1111 | 1111 | 1011 | 1111 | 1111 | −5.0000 |
| 0111 | 1111 | 1110 | 1111 | 1111 | 1110 | −9.9951 |
| 0111 | 1111 | 1111 | 1111 | 1111 | 1111 | −10.0000 |

The coefficients chosen are typical, but not necessarily exemplary, of any particular flight. As indicated above, the most significant bit of each coefficient is complemented to provide the conversion from column A to column B of the Table. Column C indicates the value of the analog output for each of the six coefficients illustrated. The complementing of the most significant bit of the coefficients is actually practiced herein but has no useful function in this preliminary version of the simulation system of which this system is a part only.

Figure 5A:
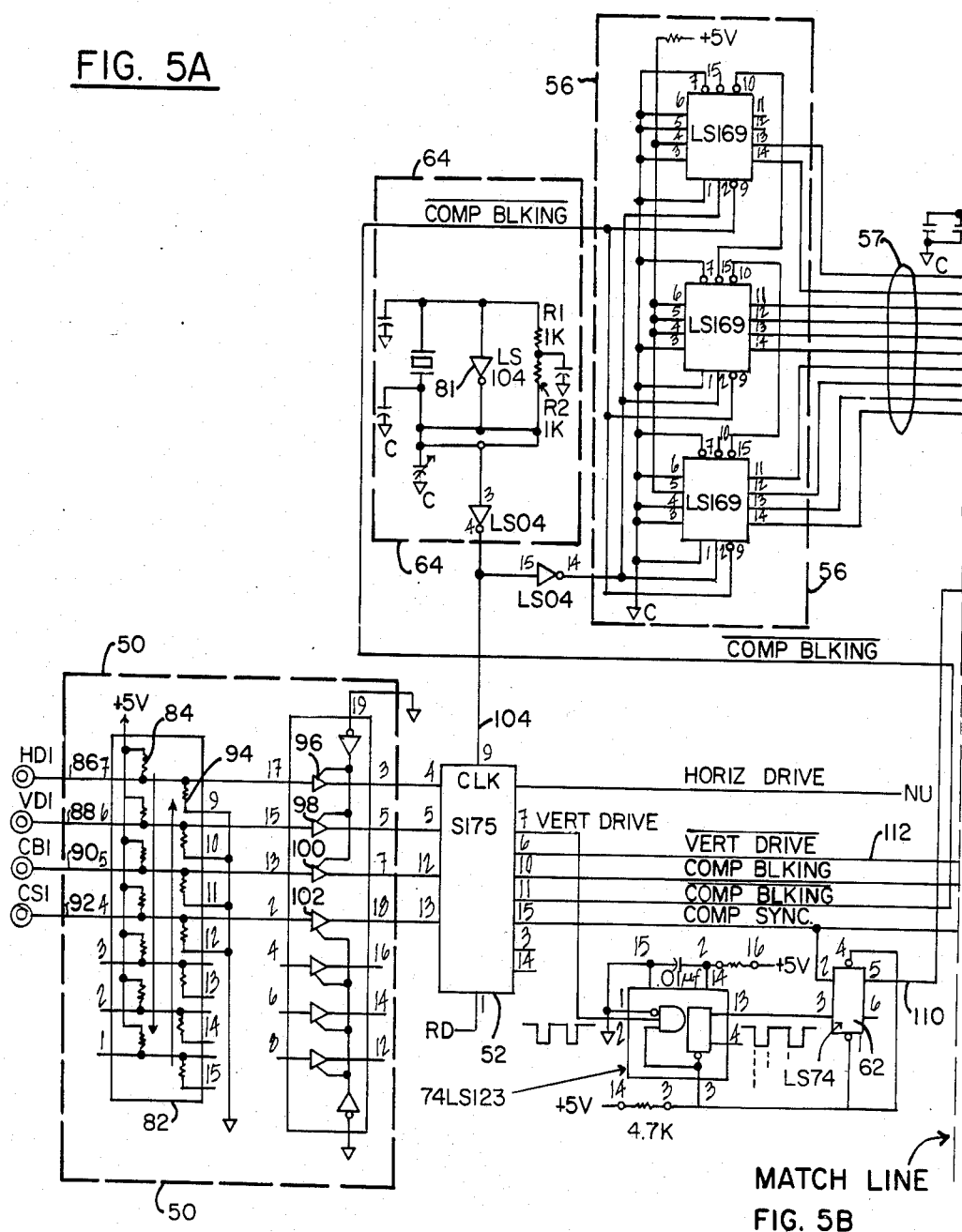
FIG. 5 is composed of FIGS. 5A and 5B, and illustrates the details of the horizontal and vertical sweep generators of FIG. 4.
Figure 5B:
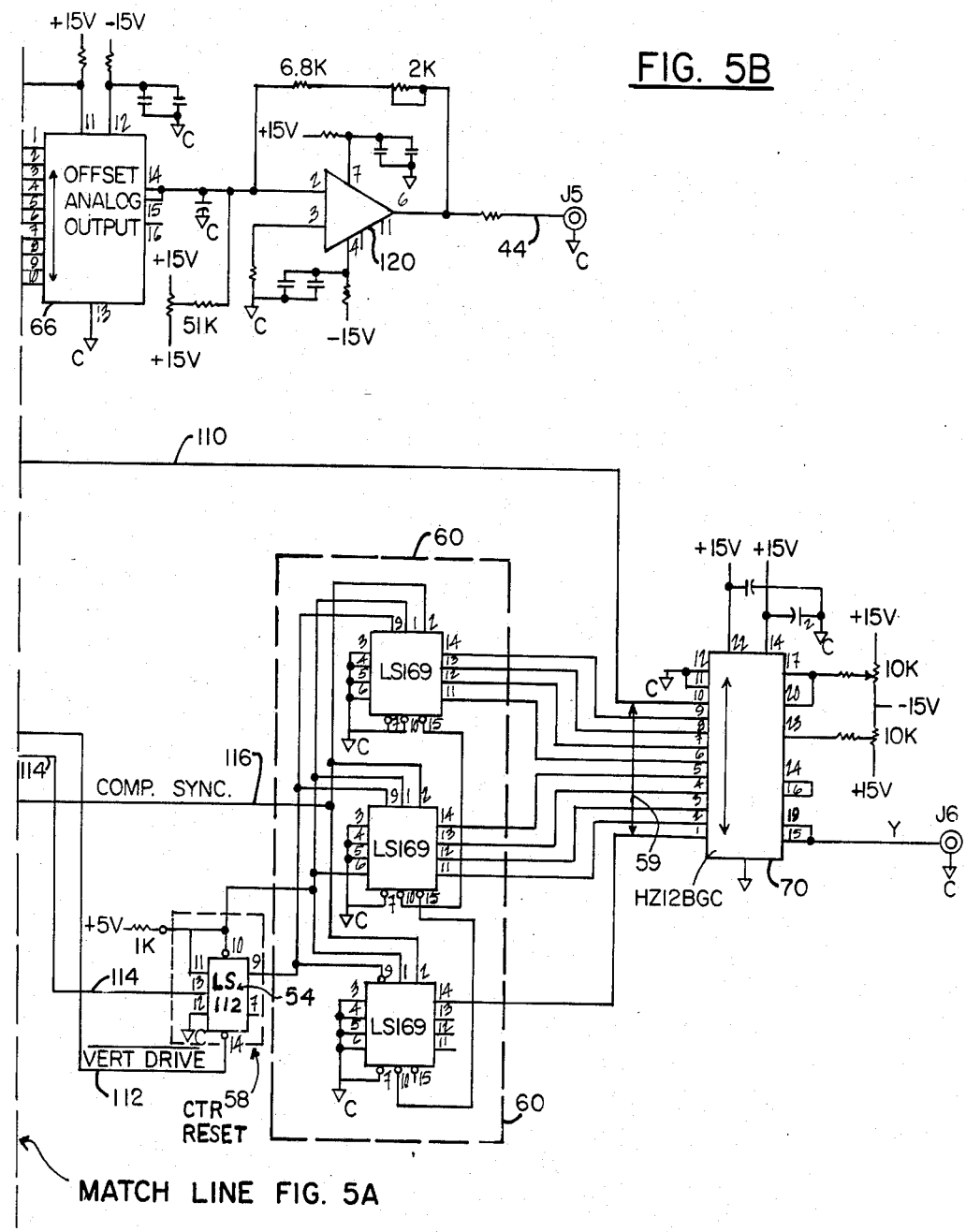

Referring now specifically to FIG. 5 composed of FIGS. 5A and 5B, there is illustrated the details of the horizontal and vertical sweep generator. The receivers 50 comprise a matching network 82 providing a 180 ohm resistor 84 connected between a +5 V supply and each of the individual input leads 86, 88, 90 and 92. Each such lead is connected through a resistor 94 of 390 ohms to common ground. Each of the aforesaid leads is also connected to a different input of amplifiers 96, 98, 100 and 102 of a 74S244, each a three state octal buffer. The outputs of the amplifiers are supplied to pins 4, 5, 12 and 13, respectively, of the sync lock circuit 52 which is an S175; a quad D flip-flop. The sync lock is synchronized to the pixel clock 64 via a lead 104 and provides the aforesaid output signals on pins 6, 7, 10, 11 and 15, all as illustrated in FIG. 5A. The vertical drive signal on pin 7 is supplied to the input gate of a 74LS123 (a dual retriggerable monostable multivibrator) having its output on pin 13 suppied to pin 3 of an LS74 which also receives a COMP SYNC SIGNAL on its pin 2. The interlace bit appears on pin 5 of the LS74 (a dual D-type flip-flop). The interlace bit is supplied to the DAC 70 via lead 110; the DAC being an HZ12BGC.

The sync lock supplies a VERT DRIVE signal and a COMP BLNKING signal via leads 112 and 114, respectively, to the counter reset 58 for the 9-bit counter 60. The counter 60 also receives a COMP SYNC signal from the sync lock via lead 116.

The counter reset circuit 58 is an LS112 (a dual JK edge-triggered flip-flop) which receives the VERT DRIVE on pin 14 and the COMP BLKING on pin 13; outputs being provided on pins 9 and 10 to pins 9 and 1, respectively, of each of three LS169s (4 bit up/down synchronous counters) interconnected to provide a nine bit counter 60. The LS169s are also supplied with the Q output of the flip-flop 54 on their NOT pulse enable pin 9. The 9-bit counter 60 supplies nine leads 59 to the digital-to-analog converter 70. This completes the vertical drive circuits. The circuits are basically conventional, the 9 bit counter providing a recurring 0 to 9 count to the DAC 70 to produce the vertical sweep voltage; the interlace bit generator 62 employing the flip-flop LS74 (dual D-type flip-flop) to add an extra least significant bit to provide a single line shift for interlacing offset.

Referring now specifically to FIG. 5B, as previously indicated, the sync lock 52 supplies a COMP.BLKING signal to a Counter Enable Reset 54 of the horizontal sweep circuit; actually pin 9 of three LS169's interconnected to constitute the 10-bit counter 56. The pixel clock 64 is a crystal controlled oscillator employing an inverter 81 (LS04) for feedback. The oscillator operates at 14 MHz and pulses pins 2 of the LS169s of counter 56. Note that the counter also drives the clock input to sync. lock 52 via lead 104 to insure proper synchronization of the two sweeps; i.e., 60 frames per 8192 horizontal sweeps.

The counter 56 supplies 10 lines to the DAC and amplifier 66 to provide the gradual increase in the analog output voltage as the count increases, as required to produce the horizontal sweep signal. The output of the DAC 66 is amplified in amplifier 120; an AD509KH, to provide the horizontal sweep on lead 44.

Figure 6A:
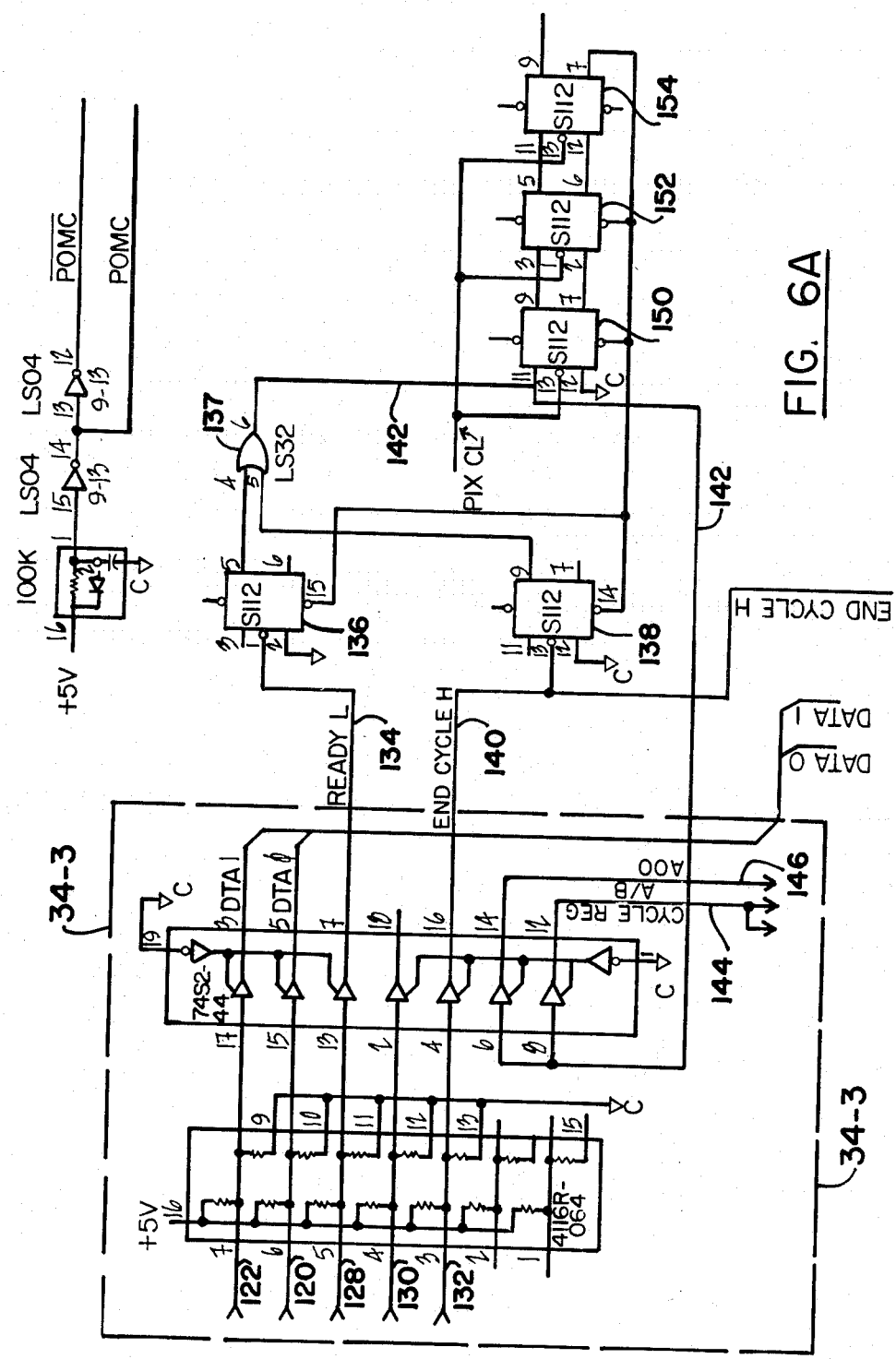
FIG. 6, composed of FIGS. 6A and 6B, is a detailed diagram of the receivers and interface circuits of FIG. 4C lying between the central computer and the latches and latch control feeding the warp box.

Reference is now made to FIGS. 6A and B of the accompanying drawings wherein is illustrated details of the receivers 34 of FIG. 4C. These receivers 34 are the same type as the receiver 50 illustrated in FIG. 5A.

Figure 6B:
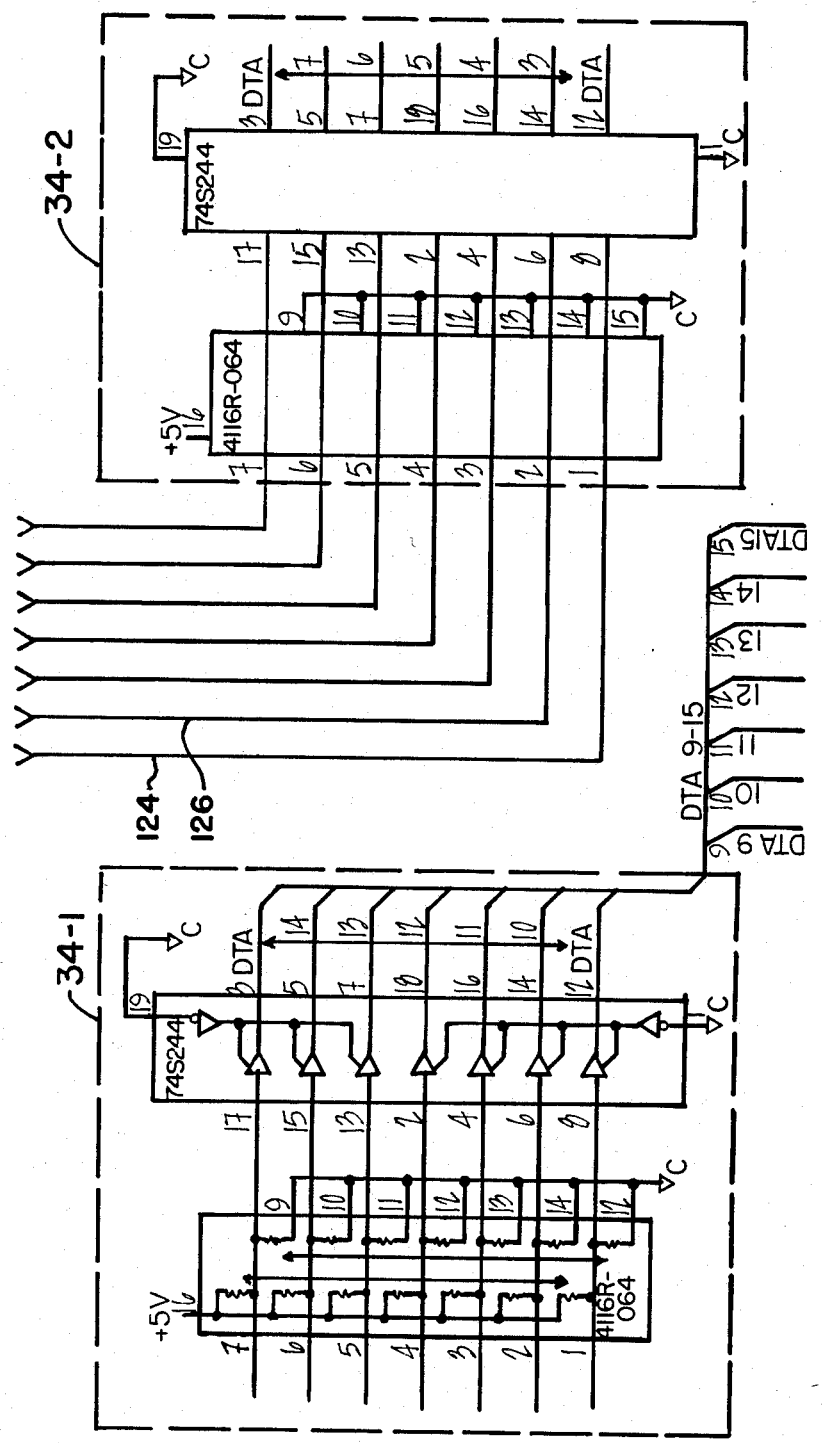

The 16-bit coefficient data from the VAX is supplied via the DR11-W 32 to receivers 34, both of FIG. 4C. Three sets of receivers 34-1, 34-2 and 34-3 are illustrated in FIG. 6. As previously indicated, of the 16 coefficient bits, the four most significant are used to designate the coefficient being sent; these four bits appearing on leads 120 and 122 to receiver 34-3 and 124 and 126 to receiver 34-2. Lead 128 carries a bit indicating that the VAX is ready to transmit, a bit on lead 130 indicates that the information is being transmitted and a bit on lead 132 indicates end of transmission. The ready signal on lead 128 appears on lead 134 at the output of the receiver and is applied to flip-flop 136 (one section of a S112) which supplies at pin 5 a reset signal to OR gate 137. A flip-flop 138 (the other section of the S112) receives the end-of-cycle signal from lead 140 and provides its "1" output to the OR gate 137. Gate 137, via lead 142, supplies a signal to pins 6 and 8 of the 74S244 of the receiver 34-3 which in turn provides signals on leads 144 and 146 to the VAX indicating that the information has been received.

The lead 142 also feeds flip-flop 150, constituting a counter that at count 3, resets flip-flops 136 and 138 and flip-flops 150 and 152 to reset all elements to an initial position to accept a subsequent set of coefficient circuit signals.

Figure 7:
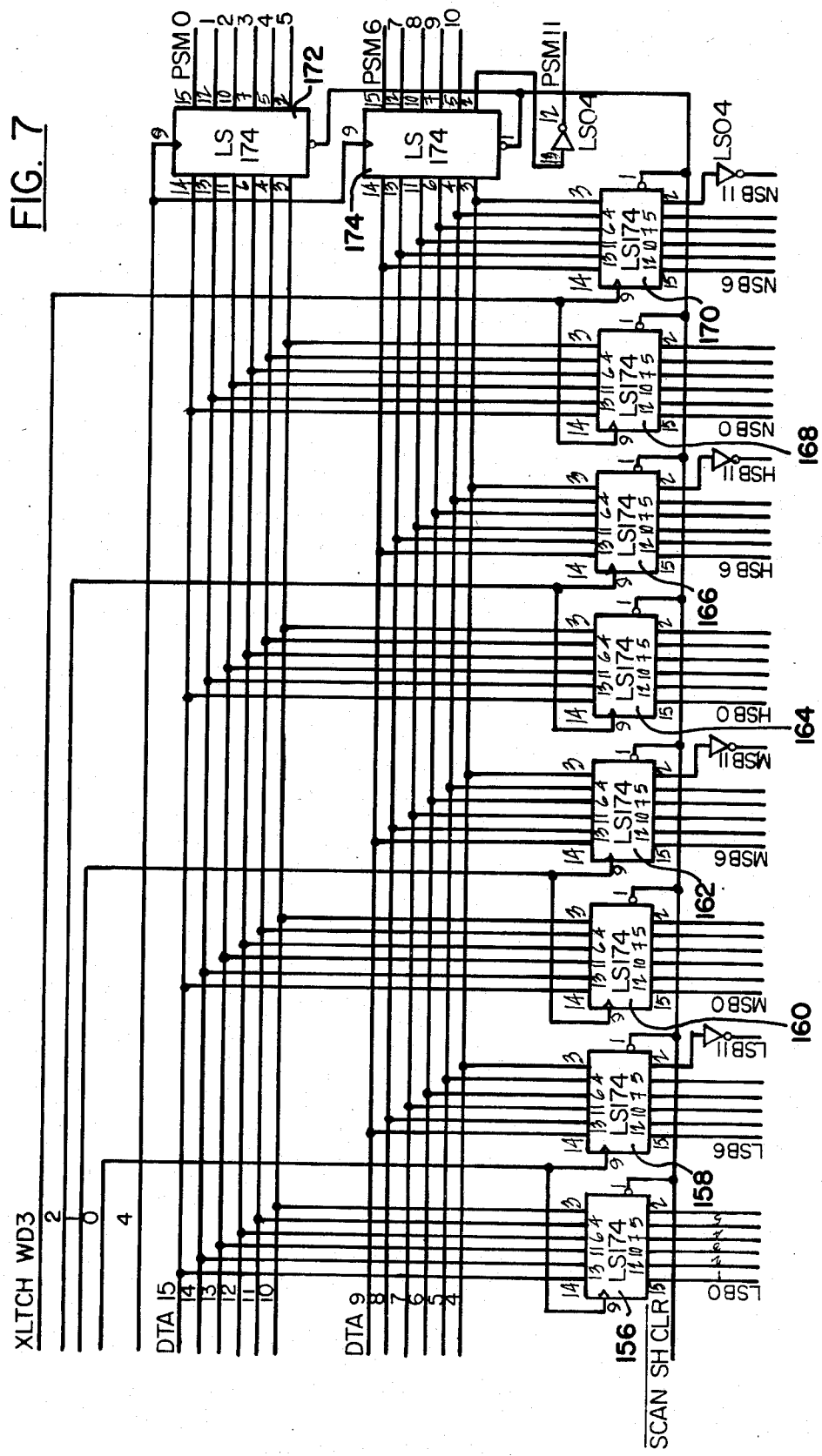
FIG. 7 is a detail drawing of the latches of FIG. 4C.
Figure 8:
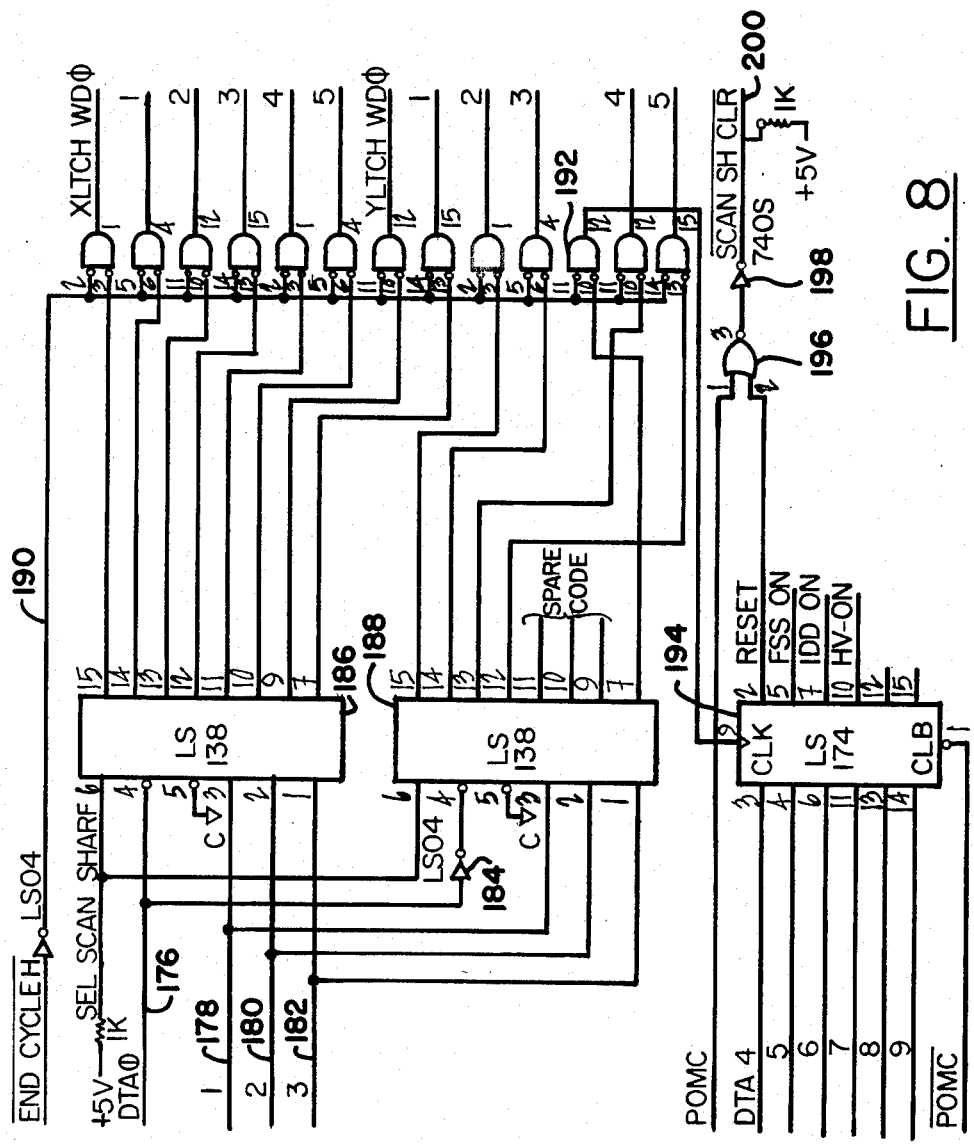
FIG. 8 is a detailed block diagram of the latch controls of FIG. 4C.

Returning to the other two receivers 34-1 and 34-2, pins 1 through 7 of the 4116R of receiver 34-1 receive data bits 9-15 while the 4116R of receiver 34-2 receives data bits 4-8; these constituting the 12 data bits illustrated in Table I. At the output of the receivers, 34-1 and 34-2, the data bits 4-15 are directed to latches, illustrated in FIG. 7, which correspond to latches of block 36 of FIG. 4C. Ten latches are illustrated in FIG. 7; there being 24 in all with a different one-half of each coefficient being stored in a different latch; the 24 latches thus storing 12 coefficients. The 10 latches of FIG. 7 (or five pairs) are numbers 156, 158; 160, 162; 164, 166; 168, 170; and 172, 174. The function of each of the latches is the same; the latches accepting information in accordance with the code developed on leads 120, 122, 124 and 126 in FIG. 6. These signals are applied to leads 176, 178, 180 and 182 in FIG. 8 which in turn are connected to pins 4, 3, 2 and 1, respectively, of a 1-of-8 decoder/multiplexer 186, an LS138. A second decoder/multiplexer 188 receives signals on pins 3, 2 and 1 from leads 178, 180 and 182, respectively, while pin 4 of the latter device 188 receives a signal from lead 176 via an inverter 184.

The output signals from the decoder multiplexers 186 and 188 provide a distinct signal on each output lead in accordance with the code supplied on the leads 178, 180 and 182 with the signal on lead 176 determining which of the components 186 or 188 is active. The other three signals provide 8 mutually exclusive active "low" outputs. An output is developed when signals on pins 4 and 5 are low and the signal on pin 6 is high. The output leads of the components 186 and 188 are fed to a group of Quad 2 input NOR gates and are gated by an inverted End Cycle H signal on lead 190 to twelve output leads designated XL TCH WD0-WD5 and YL TCH WD0-WD5. The output from NOR gate 192 is fed to the clock input to HEX D flip-flop 194. The information on the "D" inputs is loaded on the clock and cleared on the "clear" input POMC. Only the reset output on pin 2 is utilized and it is gated with the POMC signal through NOR gate 196 and inverter 198 to provide a SCAN SH CLR signal on lead 200.

Referring again to FIG. 6, the POMC signals are generated at system power up to initialize the system to a predetermined state.

Returning again to FIG. 7, each of the XLTCH and YLTCH signals are supplied to a different latch, the XL TCH WD0-WD4 leads of FIG. 7 being supplied to the clock inputs 9 of HEX D flip-flops 156, 158, respectively. Data leads DTA 4 through DTA 15 (twelve in all) are supplied to all of the pairs of flip-flops. Data is loaded in only in the presence of the clock pulse, i.e. pulse on pin 9 so that the data is stored in the latch as selected by the decoding function of the circuits of FIGS. 8 and 9. It is noted that the most significant bit of each coefficient, such bit appearing on pin 2 of the right hand flip-flop, such as flip-flop 158, is inverted to provide a complemented bit.

Figure 9:
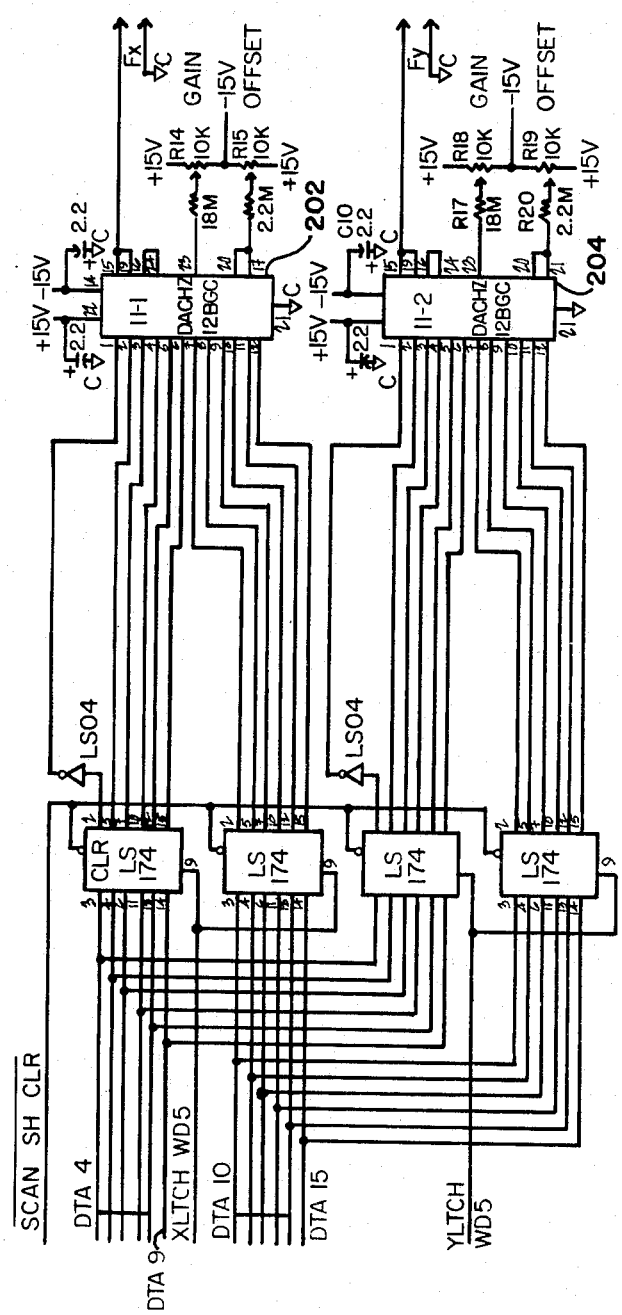
FIG. 9 is a detailed diagram of the interconnection of the latches and digital to analog converters of FIG. 4C.

The output of each latch, reference being made to FIG. 9 of the accompanying drawings, is supplied to a digital-to-analog converter; two being illustrated as components 202 and 204 in FIG. 9. The DACs are HZ12BGCs, providing, in the illustrated case, the $F_x$ and $F_y$ coefficients.

It should be noted that once each set of coefficients is read out to the warp box 30 of FIG. 4C, the SCAN SH CLR signal clears all of the latches so that the next group of coefficients may be received.

Figure 10:
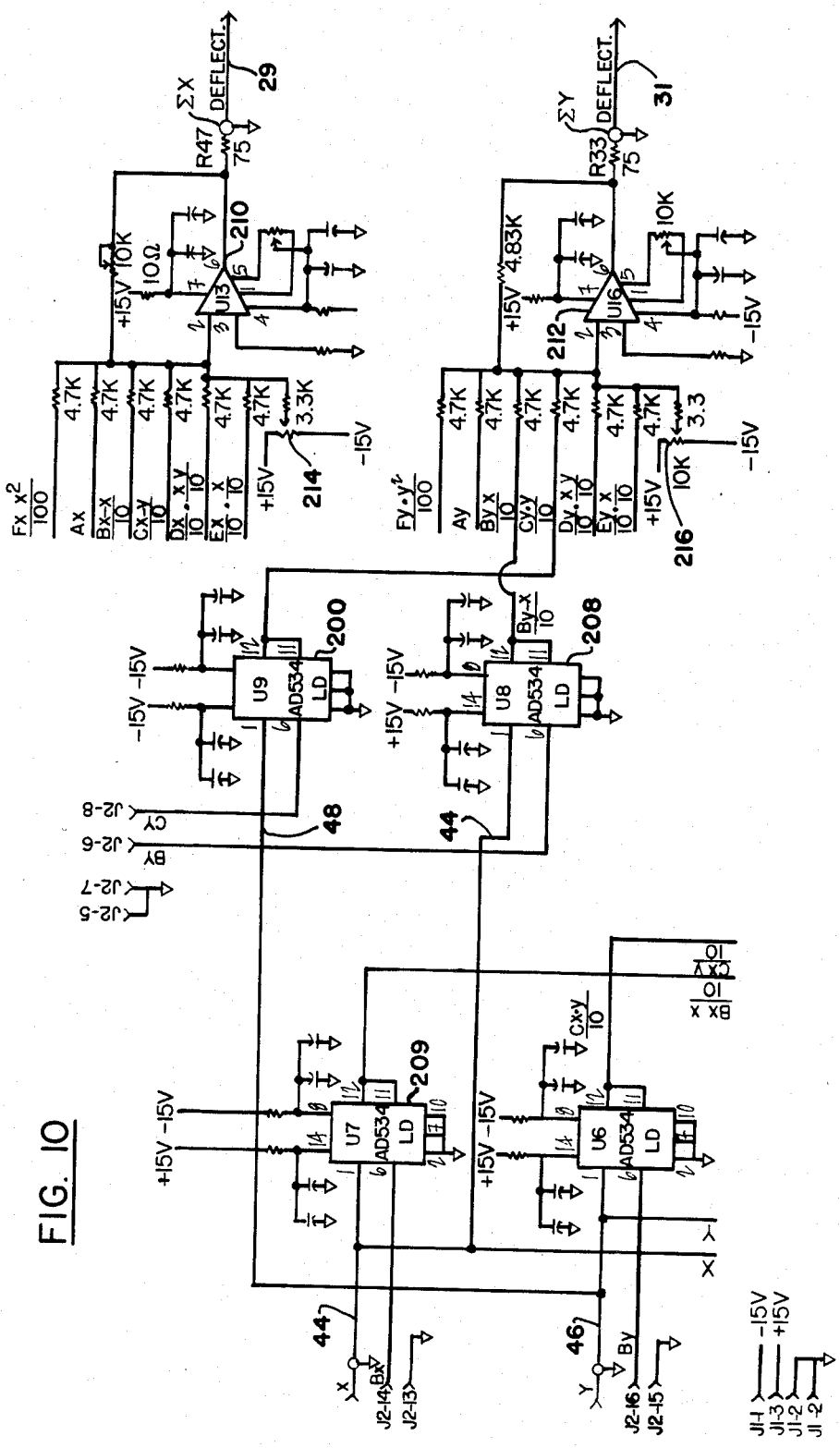
FIG. 10 is a detailed block and circuit diagram of the exemplary circuits of the warp box of FIG. 4C.

Referring now to FIG. 10 of the accompanying drawings, four multipliers of the warp box 30 and the summation circuits are illustrated. The drawing illustrates four multipliers AD534LD, (each of which is a four quadrant analog multiplier). The x and y scans are provided on leads 44 and 46, respectively, to each of the x and y scan circuit multipliers, respectively. A different coefficient is applied to each multiplier, each from a different A/D converter. For instance, a multiplier 208 receives the x scan voltage and the $B_y$ coefficient. The output signal thus is $B_yX/10$. Correspondingly, a multiplier 200 receives the Y warp voltage and the $C_y$ coefficient. The output voltage is $C_yY/10$. All of the coefficients are summed in a summation circuit which is a "741"; the x-coefficients being summed in component 210 and the y coefficients in component 212. The offset voltage is a sixth coefficient, $A_x$ or $A_y$. Potentiometers 214 and 216, connected across +15 V supply, are used for fine adjustment of the scan start locations. The X and Y deflection voltages then appear on leads 29 and 31, respectively.

Figure 1B:
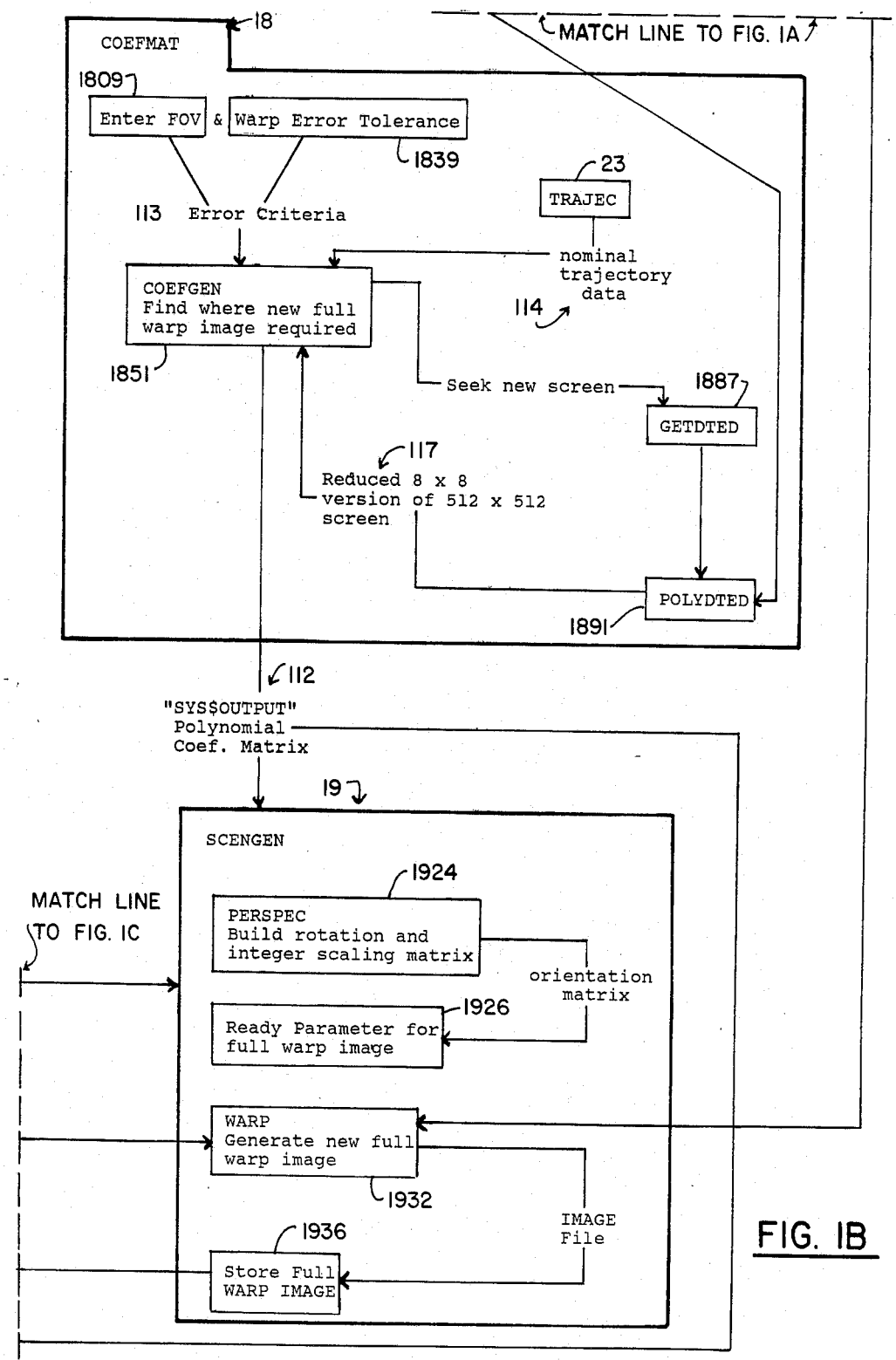
Figure 1C:
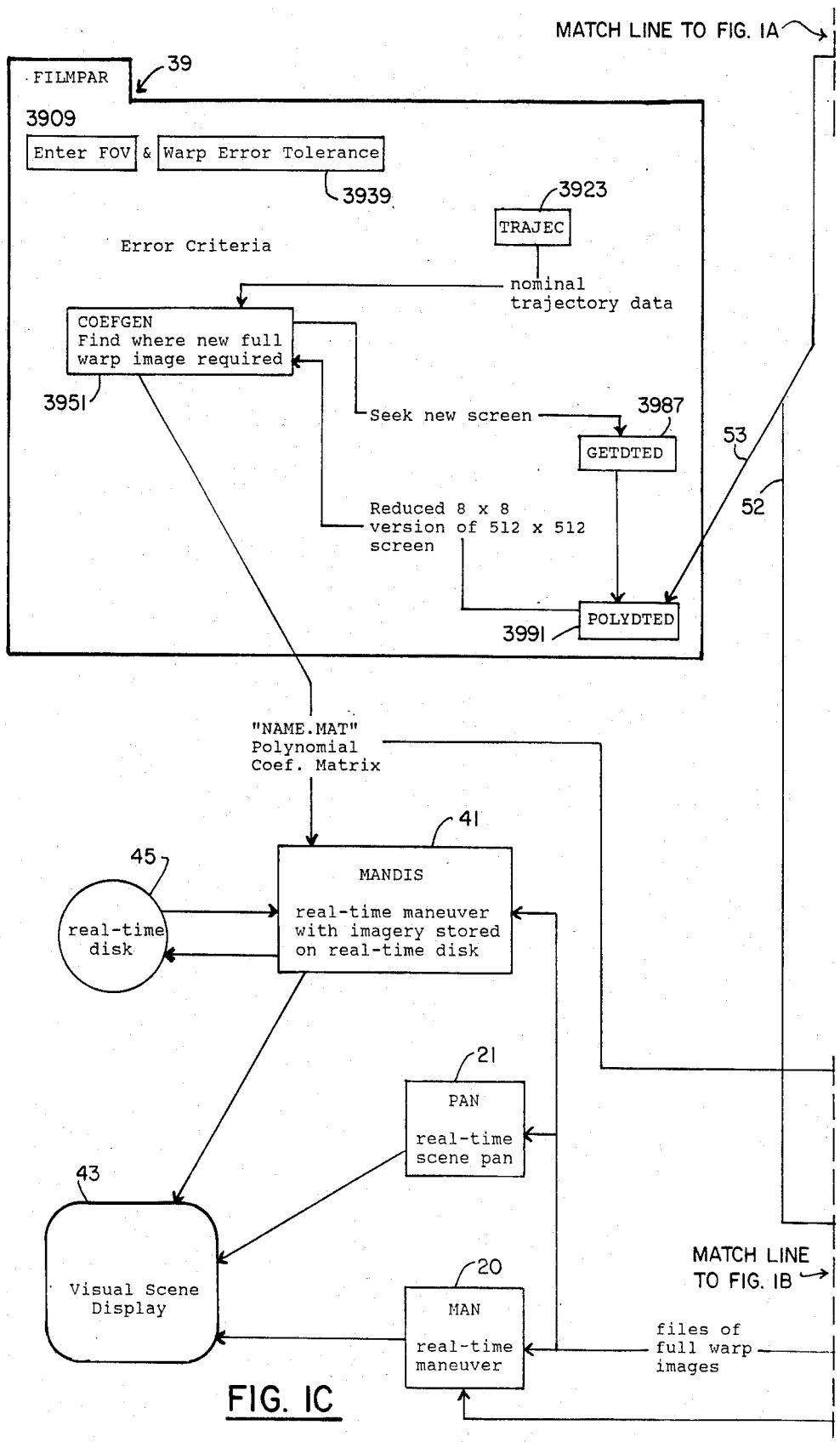

Leaving the hardware discussion for now and returning to a more detailed discussion of the programs whose general flow interaction is illustrated in FIGS. 1A–C and discussed above, detailed below is the logical flow pattern of the following programs designated as follows in FIG. 1: PHOFILE 11, ZOOM 12, NEWFIT 13, CAMPAR 14, TREAD 15, TDECODE 16, MAPZ 17, COEFMAT 18, SCENGEN 19, MAN 20, PAN 21, FILMPAR 39, AND MANDIS 41.

The actual program listings are supplied in the form of a microfiche appendix to this specification.

PHOFILE

As explained earlier, the program PHOFILE is utilized to read the tape of digitized information created from the terrain photograph created by the C-4500 Colormation Mark II Digitizer in step 1, FIG. 1. Following the flowchart of FIG. 11 the operation of PHOFILE is as follows: A file 1100 called 1BASE32.DAT is created and allotted memory space equivalent to the value assigned to the constant IBLKS, 131,072 in this instance. Next, block 1102, a message is sent to the screen of the TEK to indicate that a file has been created. The exemplary message used in the present embodiment is 'DBA1:[IMAGES]1BASE32.DAT, DATA FILE CREATED'.

The program, block 1104, next prepares the VAX for reading the tape by calling a command located in the VAX Operating System (VOS) identified as SYS$ASSIGN. Before actually reading the tape the VAX must be commanded, block 1106, to go to the beginning of the tape and then to skip the unwanted rows of data, block 1108. The VOS command SYS$QIOW supplied with the appropriate data row values as shown in block 1109 is used to index the VAX to the proper starting point on the photo tape. The program then outputs a message to the screen of the TEK, block 1110, such as "Skip to Beginning of File, Skip First 474 Records" to indicate that the tape is indexed to the proper starting point. The data input is then begun, block 1111.

The program next determines the number of super pixels i.e. corners of pixel cells, block 1112, and reads in the useful portions of the record. In block 1114, a first block of 32 rows on the tape for 256 super pixels (pixels defining the corners of DTED cells) or 8192×32 pixels is read into the appropriate subscripted locations of variable IOSB( ). In block 1116 the appropriate byte of this block of data stored in IOSB( ), in the exemplary embodiment the second BYTE IOSB(2), is examined to determine the record length of the data block. If the record length differs from 9140 a message indicating the record length indicated by the examined byte is displayed on the TEK screen, block 1118. The processing is paused by the program until the "C" or continue key is depressed by the operator. If the record length was indicated to be 9140, or after the continue is depressed, the program flows on to block 1120.

In block 1120 the appropriate byte, in this case IOSB(1), is examined to determine if the end of the tape has been reached. If the byte does not indicate the end of the tape, the program proceeds on to block 1124.

If however the byte examined indicates the end of the tape then a message indicating the end of the tape has been reached is output to the screen of the TEK, block 1122, along with an indication of the length of the record just read, i.e. the value of IOSB(2) in the exemplary embodiment. The tape is then instructed to rewind with the appropriate VOS command IO$_REWIND. After the operator depresses the return key to allow the program to proceed, the program then proceeds to block 1124 to store the last read block of data.

The order of pixels created along each row read in steps is then reversed in block 1126 to match the actual photograph and not its mirror image. The program outputs a message to indicate completion of reverse processing of each row such as the exemplary message "Done With Superpixel Row #", block 1128. The program then goes to the next row until all 256 rows are complete, block 1130.

When all rows are read in, the files are then closed down using the VOS commands SYS$QIOW and SYS$DASSGN. The message "Processing Complete", block 1132, or similar is then outputted to the TEK screen and the program is complete.

ZOOM

Figure 12A:
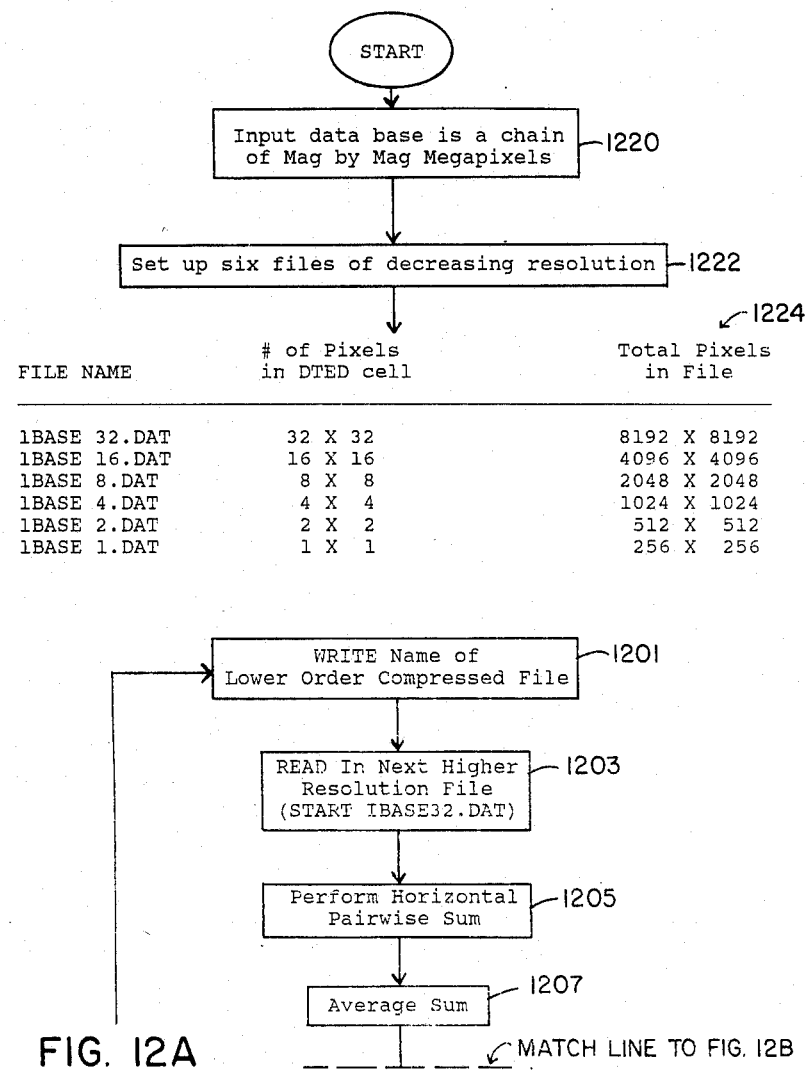
FIGS. 12A and 12B illustrate the flow diagram for the program ZOOM.
Figure 12B:
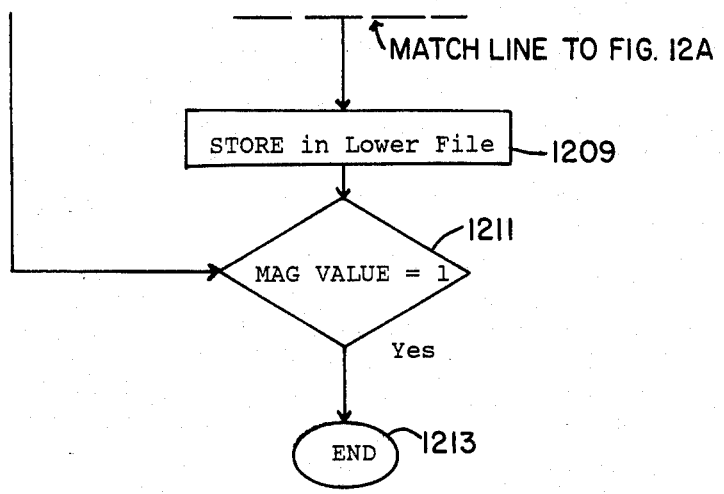

Program ZOOM (FIG. 12) initially sets a character variable to a generic file value, i.e., "DBA1: [IMAGES]1BASE00.DAT" where the "00" is replaced by the magnification values (i.e., 32, 16, 8, 4, 2, 1) as the series of 6 differing resolution files block 1224 are established, block 1222. The file name is first set to "DBA1:-[IMAGES]1BASE32.DAT" the high resolution file created in program PHOFILE input in block 1220. That file is opened and a new file is created with a name representing the new magnification value, i.e. ZOOM then writes the name of the file of lower magnification value block 1201 to the screen of the TEK and a message to indicate that the file is being processed.

The next portion of the program reads in the next higher resolution file, block 1203, compresses the larger magnification value file down to the lower magnification format. This step is accomplished by averaging adjacent horizontal pairs of pixels, block 1205, and producing their average, block 1207. The information is stored, block 1209, and a decision is made in block 1211 as to whether or not the magnification value is 1. If not the program loops back and the newly created file becomes the high magnification file to be compressed into a file of one-half the magnification value. This looping is done beginning with file magnification 32 and halving each time to get files magnification 16, 8, 4, 2 and 1. Six differing resolution files are created for the exemplary embodiment. When the magnification value becomes 1 the program ends, block 1213.

NEWFIT (Selections 1-3)

Program NEWFIT (see FIGS. 13A-13M) has several functions, the primary function being, as described earlier, to identify the pixel coordinates of the control points. After the pixel data has been matched with its appropriate elevation in program MAPZ, NEWFIT (Selections 4-8) is then used to display or alter the elevation of any particular pixel location.

The first portion of the program, block 1300, initializes the various constants and variables for the program. NEXP is set equal to 6 for the Number of EXPonents of magnification, i.e. there are 6 levels of pixel resolution. ISPAN and JSPAN are set equal to 8192 for the number of pixels along a side. NBUFF is set to 16384 as twice the value of ISPAN and JSPAN as a size of value for the storage file. IP is set equal to 262,144 to be used to establish the number of subscripts allotted to the variable SCENE, i.e. the number of pixels in a row of DTED cells.

MAXZOOM is set at 32, the number of the highest resolution file also indicating the 32 by 32 pixel grid which forms one cell in this resolution pixel file as opposed to the 1 by 1 pixel grid of the lowest resolution file of zoom value 1. IXGRID and IYGRID are set to 256 due to the screen display size of a 256 by 256 grid.

The character variable "NAME" is set to "DBA1:-[IMAGES] BASE__.DAT", see block 13104, in CLOSET, block 1310. The position before "BASE" is left blank to enable the program to determine whether it should select from the set of files created by program ZOOM or from elsewhere. The space will be filled with a 1 if selection from the ZOOM-created set of files is appropriate.

The two characters between "BASE" and ".DAT" are filled with 1, 2, 4, 8, 16 or 32 depending on the resolution of the file to be called.

After initialization, subroutine SETUP is called, block 1302, to initialize the TEK terminal for proper display. As shown in the flow diagram, subroutine SETUP, block 1304 readies the terminal for display of a menu and defines the graphic symbols and cursor.

Next NEWFIT assigns values to the subscripted variables NUMB, INCB and IZOOM as shown below, block 1306.

| | | | | | | |
|---|---|---|---|---|---|---|
| NUMB(1-6) | 1 | 4 | 16 | 64 | 256 | 1024 |
| INCB(1-6) | 4096 | 1024 | 256 | 64 | 16 | 4 |
| IZOOM(1-6) | 1 | 2 | 4 | 8 | 16 | 32 |

Next the menu of selections is outputted to the screen, block 1308. The program is then ready to receive an input from the operator to indicate his menu selection, block 1305.

The menu, block 1308, presented to the operator has 8 selections. The first two selections, 1 and 2, blocks 13051 and 1312, allow the operator to color the file using subroutine COLSET, block 1310. Depending on the value of the variable "IREV" given in the call for subroutine COLSET, the coloring of the file can be normal, block 13052 or reversed, block 13121. This function colors in the display to be manipulated so that the objects represented by control points can be seen on the screen by the operator.

Subroutine CLOSET operates as follows; first a message requesting the name of the file to be colored, block 13101, is displayed on the TEK screen. The operator then identifies the file to be colored, block 13102. The file name supplied is evaluated, block 13103, and if unidentifiable or if the default file is specified, then the default file "BW.FOR" is utilized and flow is directed to block 13108.

If the desired file is available it is opened, block 13104, and its color coding is converted, block 13105. Either full color, block 13107, or grey shade, block 13106, is selected and the file colors are interpolated, block 13108 and reversed if called for by the value of IREV supplied in block 13152 or 13121. The colord file is then stored, block 13109.

Selection 3, block 1314, allows for a new data file to be called to the screen for processing, i.e. identification of control points. As indicated in the flow diagram, block 13141, the operator is prompted to confirm that the data base is from the pixel data base created in ZOOM and to supply the zoom exponent 0-5 to indicate the resolution of the file to be viewed.

The magnification value is then retrieved, block 1316, from the values stored in the subscripted variable IZOOM based on the ZOOM exponent value. The particular desired resolution file is selected, block 1318, based on the mag value and the magnification value depicting the resolution file is written to the screen, block 1320.

The direct access file "BASE__.DAT", block 1322 is opened and then in response to the prompt "X, Y OFFSET? 256×256 GRID", block 1324, the operator supplies the X and Y offset, block 1326, to indicate where to begin the screen display. The data is then read from the selected resolution file, block 1328, into a buffer file the final value in the buffer is checked, block 13281, and when the buffer is exhausted it is refilled, block 13282, from the direct access file opened in block 1322. The data in the buffer is utilized to fill the appropriate pixels, block 13283. Once the appropriate buffers are filled, the DMA is utilized, block 13284, to create the on-screen picture for the TEK display. Subroutine TEKXY is utilized to display the picture from DMA to the TEK, block 13285.

The subroutine DMA is utilized, block 13286, to transfer data to the screen of the TEK as shown in the flow diagram. The other subroutines TEKXY block 13328, TEKINT, WRITET block 13331, ERROR and ISTAT are from a subroutine group written by DBA equipment to allow interaction between the VAX 11/780, the TEK and other associated peripheral equipment to form a screen image.

Subroutine DMA, block 1332, first obtains parameters relating to the active conditions of the devices being linked, block 13321, to determine status and stores this in IOPENP. IOPEN is then set, block 13322, and evaluated, block 13323, to determine whether DMA is opening channels to begin transfer or closing down channels at the conclusion of transfer.

In block 13324, the value of IOPENP is evaluated to determine the initialization status of the equipment, and if already initialized, DMA can proceed directly to the transfer block 13330. Otherwise, the system must be initialized block 13325, and the blocksize for proper display on the TEK screen must be established, block 13326. Therefore, subroutine TEKINT is utilized, block 13327, to convert the necessary data to TEK integer format, block 13328. Once conversion is established, the DMA board blocksize can be set, block 13329, and transfer can commence, block 13330.

To begin transfer, subroutine WRITET, block 13331, is utilized to establish communication parameters and check through errors. reading to or from the DMA is then designated, block 13332 and performed. If neither selection is made an appropriate error message is displayed on the TEK screen, block 13335. Otherwise, information is read from or written to the DMA, blocks 13333 and 13334 respectively, through buffers into appropriate DMA blocks, block 13336. Once transfer is complete, the channels are closed, block 13337.

The end of selection 3 sets the logical operator "$ELEV_{13}$ NOT_READ" to True because at this point there is no elevation associated with the file.

The remainder of the NEWFIT file menu selections, 4–8, will be discussed appropriately after program MAPZ.

CAMPAR

Figure 14A:
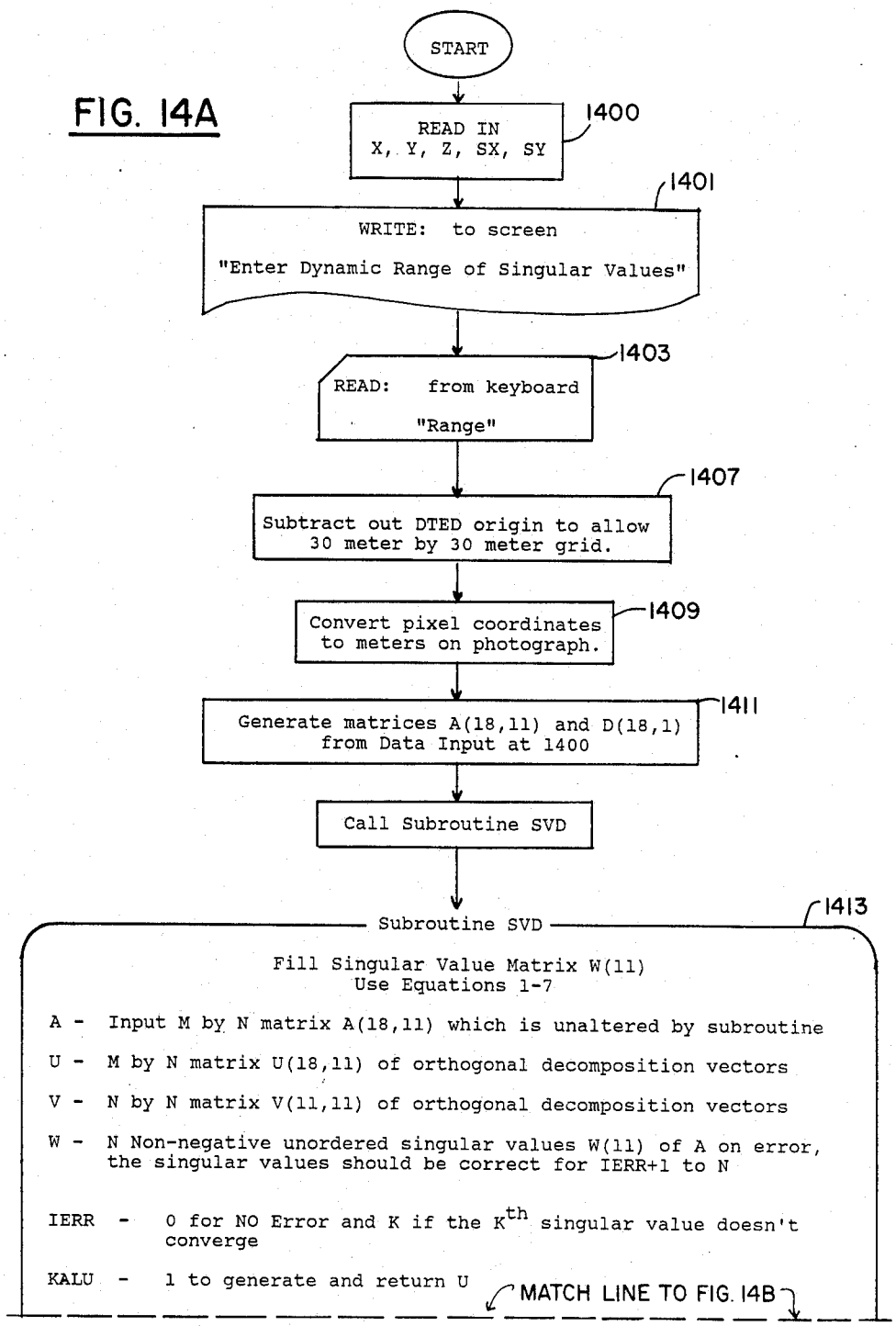
Figure 14B:
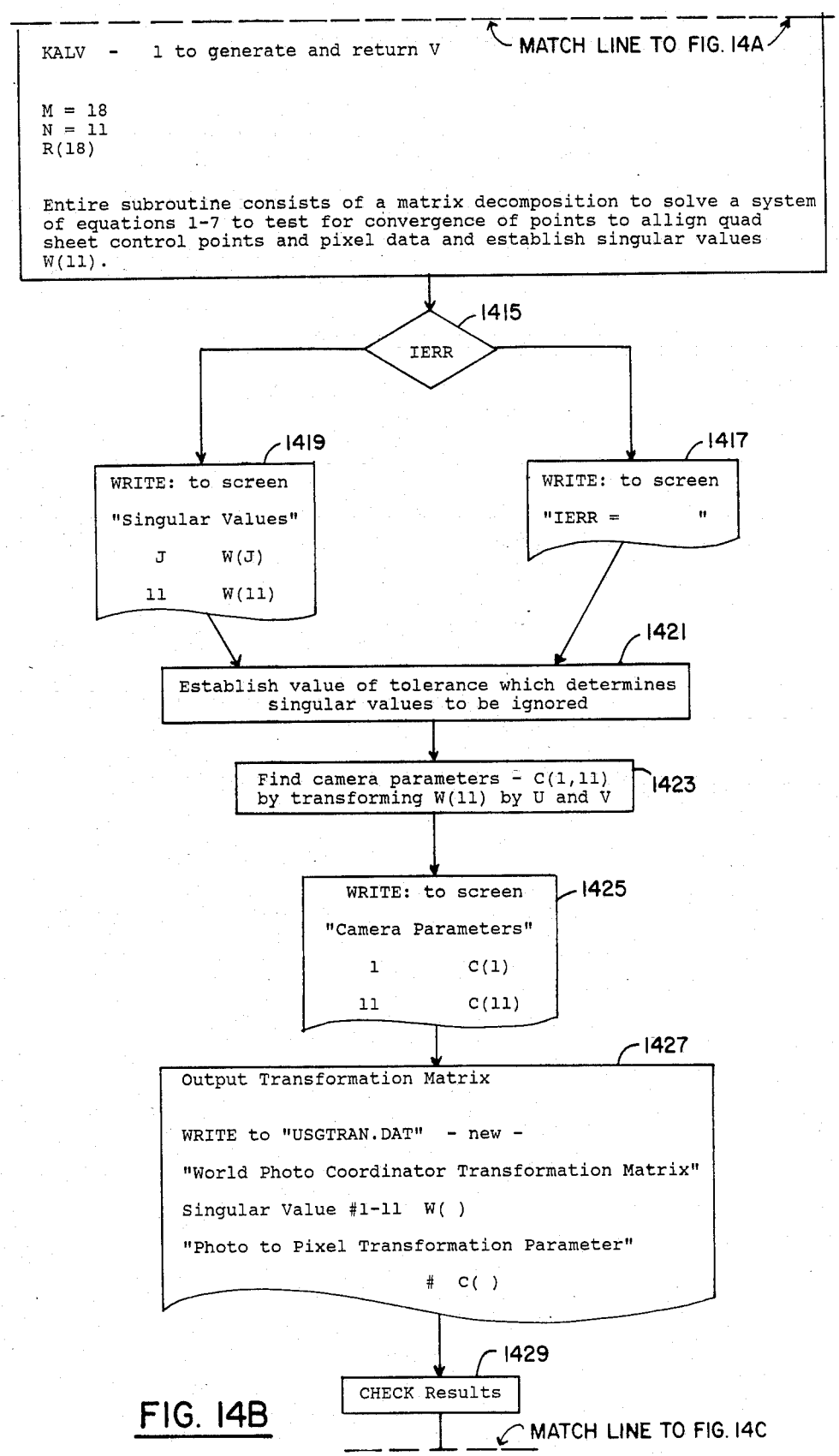

Program CAMPAR (FIGS. 14A–14C) utilizes two inputs, block 1400, to create the appropriate overlay between pixel data and quad sheet control points. One input data set is the X, Y, Z values of the 9 quad sheet control points in UTM coordinates, these are stored in the subscripted variables X, Y and Z where $(X_1\ Y_1\ Z_1)$ is the coordinates and elevation of the first control point in UTM system values. The other data set is the pixel coordinates of the control points read from the screen in program NEWFIT. This data is stored in the subscripted variables SX and SY where $(SX_1\ SY_1)$ is the location of the first control point in pixel (X, Y) coordinates.

The operator is requested to supply the range for singular values, block 1401, and the values are input by the operator, block 1403, based on the desired tolerance of the matrix calculations performed in CAMPAR.

The next portion of CAMPAR, block 1407, subtracts out the DTED (X,Y) origin of 500010 and 4691220, respectively, in an exemplary embodiment being considered. Block 1409 converts pixel coordinates to meters by dividing SX and SY values by "PSCALE", i.e. $25 \times 10^{-6}$.

In order to generate a view to represent that which an observer would see if viewing the terrain from the observation point of the camera (see FIG. 2), there has to be generated a set of parameters or factors (a set of 11 in this exemplary embodiment) to be used to transform vertically observed X, Y values of pixel coordinates into X, Y values as seen from the camera point of view. The X, Y values of a representative pixel once changed to camera view are referred to as U, V coordinate values of the pixel.

To determine the values of U and V it is necessary to translate the value of X and Y to X' and Y' to take into account the camera angle from vertical assuming flat terrain, and then to modify X' and Y' by an elevation factor (Z') or (W') which allows for the actual vertical elevation modified by the camera angle. The equations to find the U and V coordinates of a pixel are therefore:

$$U = X'/\alpha Z' = X'/W' \tag{1}$$

$$V = Y'/\alpha Z' = Y'/W' \tag{2}$$

The equations to find X', Y' and Z' are:

$$X' = C_{11}X + C_{12}Y + C_{13}Z + C_{14} \tag{3}$$

$$Y' = C_{21}X + C_{22}Y + C_{23}Z + C_{24} \tag{4}$$

$$W' = C_{31}X + C_{32}Y + C_{33}Z + C_{34} \tag{5}$$

Substituting from above for X' and Y' and equating to 0 we get:

$$XC_{11} + YC_{12} + ZC_{13} + C_{14} - UXC_{31} - UYC_{32} - UZC_{33} - UC_{34} = 0 \tag{6}$$

$$XC_{21} + YC_{22} + ZC_{23} + C_{24} - VXC_{31} - VYC_{32} - VZC_{33} - VC_{34} = 0 \tag{7}$$

In order to solve this series of equations to obtain the desired set of Camera Model Parameters, the program sets up two matrices A[18,11] and D[18,1] filled, block 1411, with 9 pairs of equations 6 and 7 with different (X, Y, Z, U, V) to generate the control point coordinates as shown below:

$$A(18,11)$$

$$\begin{pmatrix}
X_1 & 0 & X_2 & 0 & X_3 & 0 & X_4 & 0 & X_5 & 0 & X_6 & 0 & X_7 & 0 & X_8 & 0 & X_9 & 0 \\
Y_1 & 0 & Y_2 & 0 & Y_3 & 0 & Y_4 & 0 & Y_5 & 0 & Y_6 & 0 & Y_7 & 0 & Y_8 & 0 & Y_9 & 0 \\
X_1 & 0 & Z_2 & 0 & Z_3 & 0 & Z_4 & 0 & Z_5 & 0 & Z_6 & 0 & Z_7 & 0 & Z_8 & 0 & Z_9 & 0 \\
1 & 0 & 1 & 0 & 1 & 0 & 1 & 0 & 1 & 0 & 1 & 0 & 1 & 0 & 1 & 0 & 1 & 0 \\
0 & X_1 & 0 & X_2 & 0 & X_3 & 0 & X_4 & 0 & X_5 & 0 & X_6 & 0 & X_7 & 0 & X_8 & 0 & X_9 \\
0 & Y_1 & 0 & Y_2 & 0 & Y_3 & 0 & Y_4 & 0 & Y_5 & 0 & Y_6 & 0 & Y_7 & 0 & Y_8 & 0 & Y_9 \\
0 & Z_1 & 0 & Z_2 & 0 & Z_3 & 0 & Z_4 & 0 & Z_5 & 0 & Z_6 & 0 & Z_7 & 0 & Z_8 & 0 & Z_9 \\
0 & 1 & 0 & 1 & 0 & 1 & 0 & 1 & 0 & 1 & 0 & 1 & 0 & 1 & 0 & 1 & 0 & 1 \\
-(SX_1) & X_1 & . & . & . & . & . & . & . & . & . & . & . & . & . & . & -(SY_9) & X_9 \\
-(SX_1) & Y_1 & . & . & . & . & . & . & . & . & . & . & . & . & . & . & -(SY_9) & Y_9 \\
-(SX_1) & Z_1 & . & . & . & . & . & . & . & . & . & . & . & . & . & . & -(SY_9) & Z_9
\end{pmatrix}$$

These two matrices, A and D, once filled, are utilized by subroutine SVD, block 1413, to produce matrices $U[18,11]$, $V[11,11]$, and $W[11]$ by the following set of equations together with equations 1–7:

$$A[18,11] \, C[11,1] = D[18,1]$$

where;

$$A[18,11] = U[18,11] \, W[11] \, V[11,11]$$

substituting for A;

$$U[18,11] \, W[11] \, V[11,11] \, C[11,1] = D[18,1]$$

solving for C;

$$W[11] \, V[11,11] \, C[1,11] = U^T[11,18] \, D[18,1]$$

$$C[11,1] = V^T[11,11] \, W^T[11] \, U^T[11,18] \, D[18,1]$$

When operation is returned to the main program, CAMPAR, all error values produced in SVD are checked, block 1415, and those not equal to 0 are displayed, block 1417. Next, all singular values, i.e. the $W[11]$ matrix values, are displayed in order, block 1419. Next, the tolerance is set in block 1421 equal to the largest singular value divided by the value of range input in block 1403.

The program next performs a loop from 1 to 11 in which it first checks the singular value, in the $W[11]$ matrix with the relevant subscript location, against the tolerance. If the singular value is greater than the tolerance, camera parameters are generated by the following equation:

$$V^T W^{-1} U^T D = C[1,11] \qquad (14)$$

This equation is derived in steps from the following series of equations:

$$SUM = U^T D \qquad (11)$$

$$SUM = SUM/W = W^{-1} U^T D \qquad (12)$$

$$C = C + SUM \cdot V^T = V^T W^{-1} U^T D \qquad (13)$$

The program block 1423 utilizes the following series of equations to perform the mathematical functions of equations 11–14 above, to establish values for the camera model matrix $C(1,11)$ from $W(11)$. The equations are solved for $J=1$–11 to convert $W(1\text{–}11)$ to $C(1\text{–}11)$ respectively.

$$SUM = U(1,J)D(1) + U(2,J)D(2) + U(3,J)D(3) + \ldots U(18,J)D(18) \qquad (15)$$

$$QUOTIENT(J) = SUM/W(J) \qquad (16)$$

$$C(J) = QUO(1)*(V(J,1)) + QUO(2)(V(J,2)) = QUO(3)(V(J,3)) = \ldots QUO(11)(V(J,11)) \qquad (17)$$

Next the camera parameter matrix $C[1,11]$ is written to the screen, block 1425, and then stored in File "USGTRAN.DAT", block 1427.

The results are checked, block 1429, and the program generates the model and displays the error values for a final, on-screen, check by the operator, block 1431.

TREAD

Figure 15:
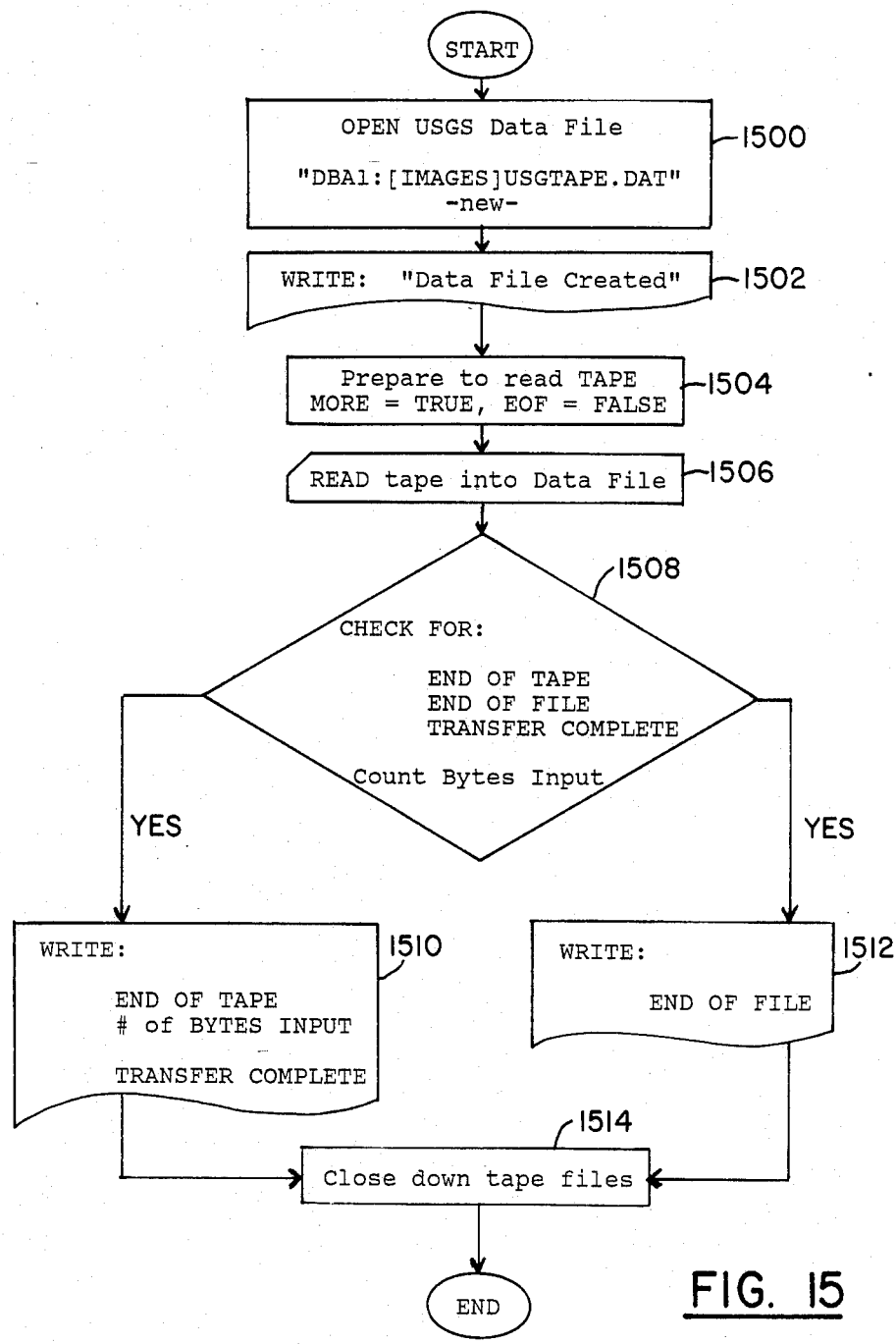
FIG. 15 illustrates the flow diagram for the program TREAD.

Program TREAD, diagrammed in FIG. 15, reads the United States Geological Survey tape. In block 1500 the program in the USGS data is read, into file "DBA1:-[IMAGES]USGTAPE.DAT" to hold the data read from the tape, and the operator is informed of completion of the read function by an on-screen message such as "DATA FILE CREATED", block 1502.

VOS command SYS$ASSIGN is called, block 1504, to assign the proper channels to read the type. Logical operator "MORE" is set to True and "EOF" (end of file) is set to False. "MORE" is used as a tape status indicator with "EOF" used for file status.

In block 1506, the tape is read using VOS command SYS$Q10W along with external tape command IO$_READVBLK. If an end of tape byte is encountered, block 1508, a message is displayed on the screen, block 1510, and the tape is no longer read. Logical "MORE" is also set to False.

If an end of file byte, block 1508, is encountered a message indicating first or second EOF encountered is displayed on the screen, block 1512. If this is the first EOF then the tape continues to be read and logical "EOF" is set to True. If this is the second EOF then logical "EOF" is already True and the tape is no longer read.

As long as only one EOF byte has been encountered and no end of tape is detected the tape continues to be read with an updated on-screen indication of the number of bytes read into the record.

When the data has been read into the file "USG-TAPE.DAT", a message such as "Transfer Complete" is displayed on the screen, block 1510, and the tape files are closed down by VOS command SYS$Q10 and SYS$DASSGN, block 1514. The tape is rewound by external tape command IO$_REWIND.

TDECODE

Figure 16A:
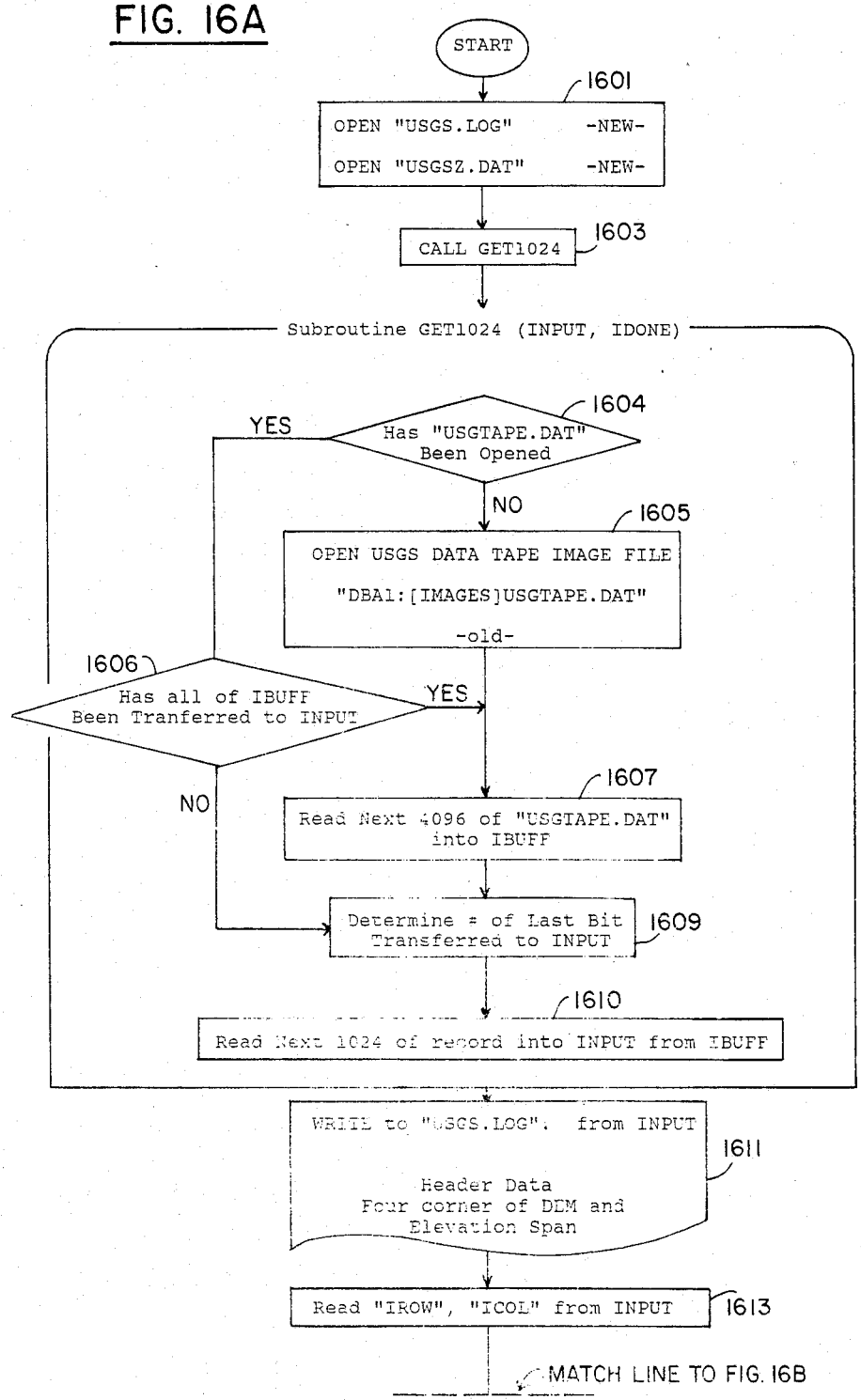
FIGS. 16A and 16B illustrate the flow diagram for the program TDECODE.
Figure 16B:
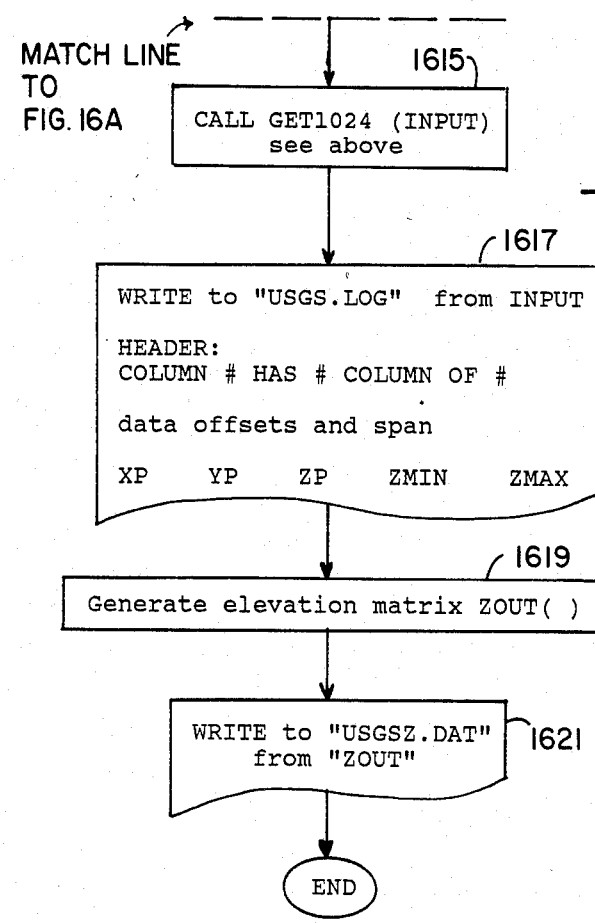
Figure 17B:
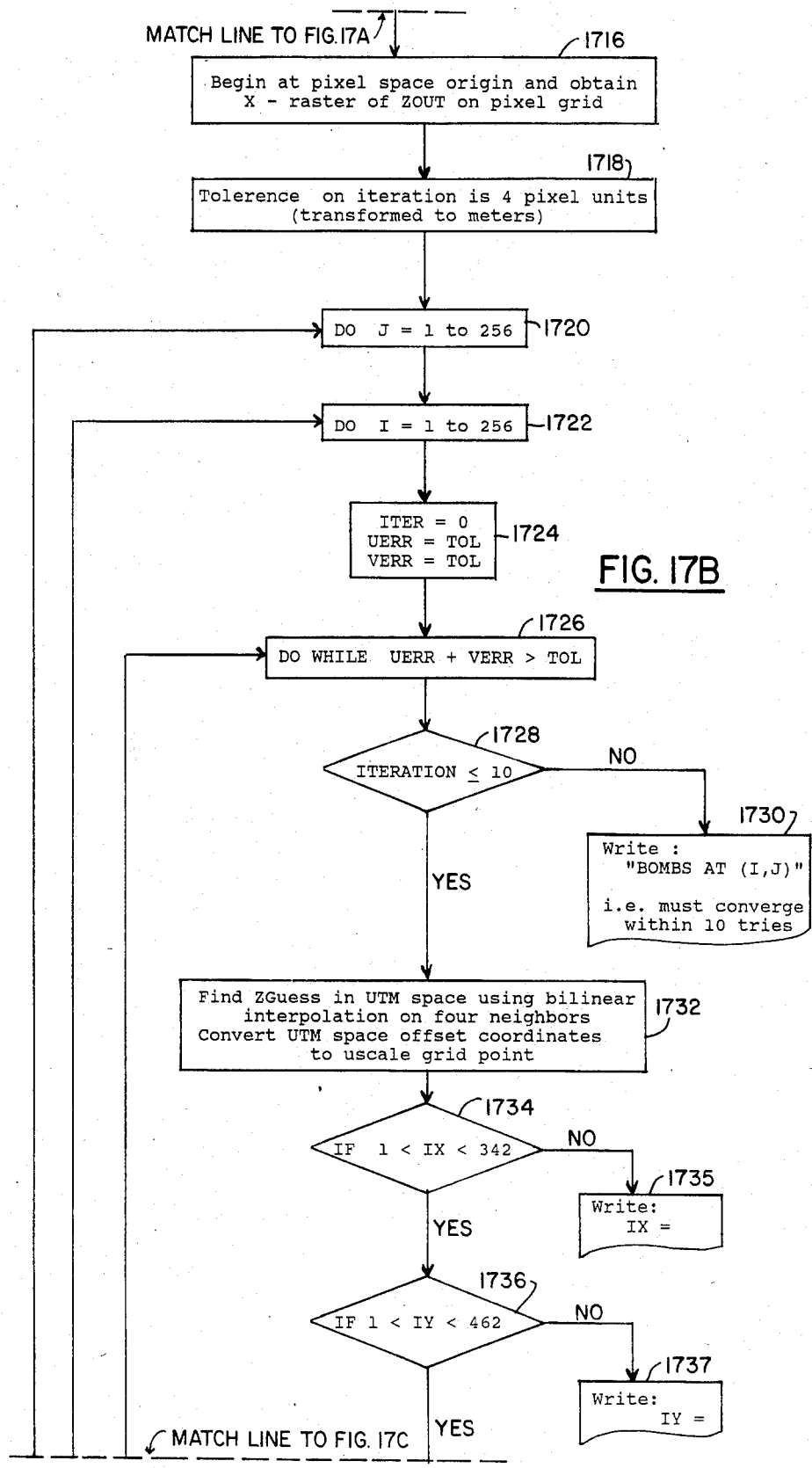
Figure 17C:
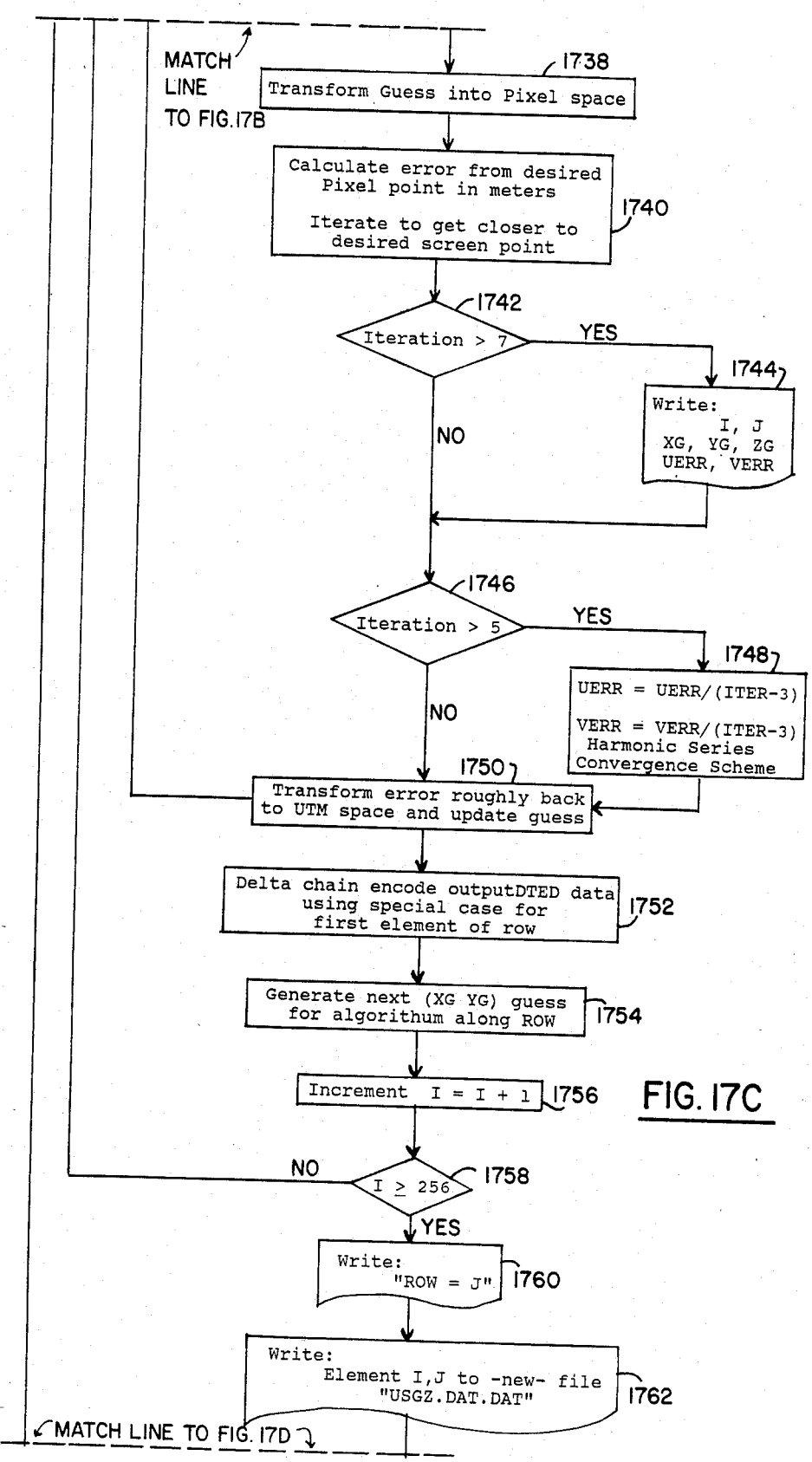
Figure 17D:
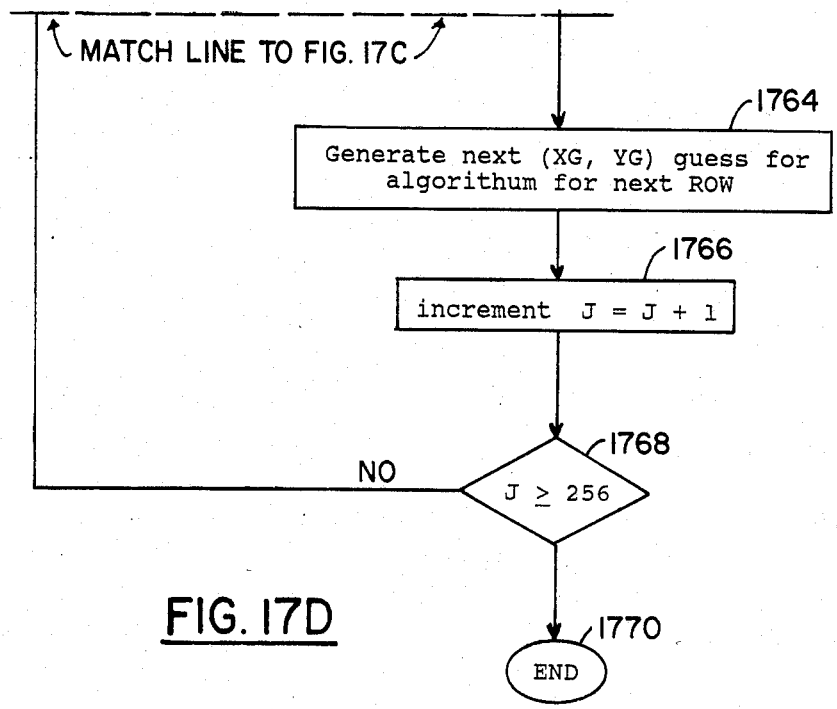

Program TDECODE, see FIGS. 16A and 16B, organizes the information read from the tape into file "USGTAPE.DAT" in program TREAD. TDECODE first opens two new files, block 1601, to store different portions of the data from file "USGTAPE.DAT". The two new files "USGS.LOG" and "USGSZ.DAT" are to store header and elevation data, respectively.

Next subroutine GET1024 is called for the first time, block 1603, to read data from "USGTAPE.DAT", block 1605. On this first pass, file "USGTAPE.DAT" is opened and the first 4096 bits of data from "USGTAPE.DAT" are read into subscripted variable IBUFF, block 1607 and the first 1024 bits in IBUFF are read into INPUT, block 1609. The above occurs only on the first call of GET1024, otherwise GET1024 operates in the following manner:

Initially, GET1024 checks to see if file "USGTAPE.DAT" has been opened, block 1604, and if not the file "USGTAPE.DAT" is opened, block 1605, and the first 4096 bits of information are read into IBUFF, block 1607. If file "USGTAPE.DAT" has been opened, block 1604 sends the program to block 1606 to determine if all of IBUFF has been read into INPUT. If all of IBUFF has been read into input (by four passes through block 1610) then the next 4096 bits of data are read from "USGTAPE.DAT" into IBUFF, block 1607.

Next, a determination is made as to the number of the last bit transferred from IBUFF to INPUT, block 1609. Once this number is detected, block 1610, the next 1024 bits are transferred from IBUFF to INPUT. Therefore it takes four passes to empty IBUFF into INPUT and since IBUFF holds 4096 bits and INPUT only holds 1024 bits the new 1024 bits from IBUFF replace the old bits in INPUT. The file INPUT is then ready to be utilized by the main program, TDECODE.

The header data, which is not used in the present system, is written to file "USGS.LOG", block 1611. This data occupies specific known locations on the tape 73–528 and so can easily be selected out of the usable elevation data.

Block 1611 also places the "four corners of DEM" occupying locations 547–738 onto "USGS.LOG" as well as "elevation span" locations 738–786. The data at locations 811–864 on INPUT is also written to "USGS.LOG".

Next, block 1613, the values of IROW and ICOL are read into these variables from locations 853–858 and 859–864, respectively. These variables are used later in reading elevation data for ICOL's and IROW's.

Subroutine GET1024 is then called upon again, block 1615, to read the next cluster of 1024 data bits from IBUFF into INPUT. This data is processed in block 1617 to write header data to "USGS.LOG". Elevation information is stored temporarily in "ZOUT( )", block 1619, and then transferred to file "USGSZ.DAT", block 1621.

Block 1615 calls subroutine GET1024 which then runs as described earlier. Unlike the first pass operation this time block 1604 detects that file USGTAPE.DAT has been opened and so flow goes to block 1606 which detects that IBUFF has not been emptied to INPUT and so directs flow to block 1609 which detects a count of 1024 on the last bit transferred. Therefore block 1610 causes bits 1025–2048 to be transferred from IBUFF to INPUT and then returns operation to TDECODE.

A loop is started which runs through blocks 1617, 1619, 1621 and back with one pass for each column from 1 to ICOL.

In block 1617 the values for the variables "JROW, JCOL, IPROW, IPCOL, XP, YP, ZP, ZMIN and ZMAX" are extracted from this second 1024 set of information from locations 1–6, 7–12, 13–18, 19–24, 25–48, 49–72, 73–96, 97–120, 121–144, respectively. The above variables stand for total number of rows, total number of columns, initial row, initial column, X-position, Y-position, Z-position, minimum elevation on tape, maximum elevation on tape, respectively.

The endpoint of the DO loop, variable "NPOINTS", which fills ZOUT( ), is set to the product of IPROW*IPCOL. A DO loop to fill ZOUT( ) for the $J^{th}$ row is started at 1 and runs to NPOINTS, filling in elevation values for ZOUT(1) through ZOUT(462). The value for ZOUT(1) is the sum of ZP (the reference elevation) and the value read from INPUT locations 145–150. The rest of ZOUT is filled by the sum of ZP and the next 6 bits from INPUT, i.e. 151–156, 157–162, etc., until the 1019th bit is used at which time GET1024 is called to retrieve the next 1024 bits from "IBUFF" or "USGTAPE.DAT" depending on the decisions made in block 1604 or 1606, and ZOUT continues to be filled starting back again from INPUT(1–6), etc.

Once the $J^{th}$ column elevation data has been supplied to ZOUT so that ZOUT(1)–ZOUT(462) are filled the data is transferred to "USGSZ.DAT" for the $J^{th}$ column and the loop goes back to 1617 to fill the next row and so on to column ICOL.

MAPZ

Program MAPZ, FIGS. 17A–17D, utilizes the camera model matrix generated in CAMPAR to match pixel data with elevation values from TDECODE. File "USGTRAN.DAT", block 1700, which comprises the camera model matrix(C), is read into the T(3,4) "transformation" matrix, block 1702, containing the factors derived in CAMPAR from the least squared error fit equations, as follows:

$$T(3,4) = \begin{pmatrix} C(1) & C(5) & C(9) \\ C(2) & C(6) & C(10) \\ C(3) & C(7) & C(11) \\ C(4) & C(8) & C(12) \end{pmatrix}$$

A second matrix B(2,2), block 1704, is generated from the T(3,4) matrix using the following equations:

$B(1,1) = T(2,2)/D$ $B(1,2) = -T(1,2)/D$ $B(2,1) = -T(2,1)/D$ $B(2,2) = T(1,1)/D$ where:

$D = (T(1,1) \, T(2,2)) - (T(2,1) \, T(1,2))$

Next, block 1706, the step size (spacing between DTED cell centers) in pixel space "PSTEP" is set to 800 micrometers. The data from TDECODE is stored in file "USGSZ.DAT" and read, block 1708, into ZIN(462×432) matrix. The step size or grid spacing in UTM is set at 30 meters, block 1710.

The next portion of the program, block 1712, generates a 256×256 grid of UTM data in pixel coordinate space, and in camera parameters. A non-linear transform involves a first guess and in the exemplary embodiment we begin with X-guess=9790 and Y-guess=5580. The tolerance on each iteration is 4 pixel units transformed into meters or 100 micrometers.

The elevation data transformed into pixel coordinates is stored one row at a time temporarily in the subscripted variable ZOUT(256). Each element along a row is stored as a change from the element to its left, and the first element of each row is stored as a change from the first element of the row below, block 1714. Starting at pixel origin and adding the difference of each next pixel, block 1716.

Two DO loops are utilized to fill the 256×256 DTED grid stored in file "USGZDAT.DAT". The inner loop fills a row, DTED cell by DTED cell, block 1722. The outer DO loop shifts the filling to the next row up so the inner loop on the next run will fill the next higher row, block 1720.

In this example, the program sets the tolerance to 100 micrometers. J is indexed to 1 for the first row and PX is set equal to 0 to indicate no offset from left end of the first element of the row. I is indexed to 1 for the first element of whichever row is being processed. The number of the iteration is set to 0 to indicate the beginning of the convergence operation and the U and V errors are set equal to the tolerance.

A conditional DO loop is entered, block 1726, which will run until 10 iterations have been completed, block 1728 and 1730, or until the sum of the absolute values of the U and V errors is less than the tolerance. This conditional loop runs through an iterative calculation to continually update and compare X- and Y-guesses for DTED cell values.

First the iteration counter is updated by adding a 1, then the X-guess and Y-guess are utilized to find Z-guess in UTM space, block 1732, using bilinear interpolation on four neighbors. The guesses are updated by dividing each by the step size in UTM space, i.e. 30 meters. One is added to those updates and they are designated IX and IY, respectively. They are then checked to see if the IX, IY values fall outside the 432×462 grid, blocks 1734 and 1736, respectively. If the values lie outside these limits, then appropriate messages are displayed, blocks 1735 and 1737 respectively. The deltas or changes from grid points are then determined by subtracting IX from the updated X-guess to get EX, and subtracting IY from the updated Y-guess to get EY. The bilinear interpolation is then performed using the following equation:

$$ZG = ZIN(IY,IX)(1-EX)(1-EY) + ZIN(IY+1,IX)(1-EX)EY + ZIN(IY,IX+1)EX(1-EY) + ZIN(IY+1,IX+1)(EX)(EY)$$

The guesses are transformed into pixel space, block 1738, by the following series of equations. First, holding values for UU, TT and VV are established by the following equations:

$$UU = T(1,1) \; XG + T(1,2)YG + T(1,3)ZG + T(1,4)$$

$$VV = T(2,1) \; XG + T(2,2)YG + T(2,3)ZG + T(2,4)$$

$$TT = T(3,1) \; XG + T(3,2)YG + T(3,3)ZG + T(3,4)$$

Then values for U and V are found using the following equations:

$$U = UU/TT$$

$$V = VV/TT$$

The program, block 1740, is employed to calculate the error by which the transformed guess values are off from the desired pixel location. This is done by setting UERRor equal to U-PX and VERRor equal to V-PY.

At this point the program checks to see if the number of iterations performed is greater than 7, block 1742. If more than 7 iterations of the conditional DO have been performed, the values of I column and J row are outputted to the TEK 4115 screen, block 1744, as well as values of XG, YG and ZG along with the UERRor and VERRor in meters (arrived at by multiplying UERRor and VERRor by PSCALE).

After the check for 7 iterations, regardless of the outcome, the program continues and subsequently checks to see if more than 5 iterations of the conditional DO have been completed, block 1746. If the iteration number is greater than 5, UERRor and VERRor are reduced by the following equations, block 1748, to reduce oscillation by harmonic series damping:

$$UERR = UERR/(\# \text{ of iteration} - 3) \tag{27}$$

$$VERR = VERR/(\# \text{ of iteration} - 3) \tag{28}$$

Before beginning the next iteration the error is transformed back to UTM space and the guess is updated by the following rough equations:

$$XG = XG - (B(1,1) \; UERR + B(1,2) \; VERR)TT \tag{29}$$

$$YG = YG - (B(2,1) \; UERR + B(2,2) \; VERR)TT \tag{30}$$

The conditional DO loop is now run through again until the tenth iteration is reached, or the sum of the errors is less than the tolerance set in block 1718, at which time the Z-guess is ready to be delta encoded and stored.

Once the conditional DO has been exited, block 1750, the Z- or elevation guess minus the previous Z-guess is stored in the subscripted variable ZOUT(I) where I is equal to the element position along the row from 1–256, block 1752. Z-guess is not stored whole, but as a difference from the previous elevation so, as explained earlier, the elevation data is stored as a delta or change encoded string. The present Z-guess is then stored as an elevation not a change in elevation value in variable "ZP" initially set to 0 be available for subtraction from the next Z-guess.

The Z value of the first element of a row where I=1, is stored in the variable ZPP for use in determining the change in elevation between the first element of this row and the row immediately above.

When the DTED cell for which Z-guess was determined was the first element along the row, the first guess for the first element of the next row to be processed are thusly XGP=XG, YGP=YG and TTP=TT.

The next step, block 1754, generates the next X-guess and Y-guess to be used as initial guesses for the next element along the row, by the following equations:

$$X\text{-guess} = X\text{-guess} + B(1,1)(PSTEP)TT$$

$$Y\text{-guess} = Y\text{-guess} + B(2,1)(PSTEP)TT$$

$$PX = PX + PSTEP$$

Once these intial guesses are generated, the element position along the current row, I, is updated block 1756, and checked block 1758 and if the row has been completed, the program returns to the beginning of the inner loop, block 1724, and goes through the iterative process to obtain a Z-guess or elevation value for the next DTED cell along the J row being processed by the outer loop, block 1722.

Once all of the 1-256 values for cells have been filled, the program drops out of the inner loop, block 1758, to perform the iterations to fill the next row above, i.e. the J+1 row. The number of the row just processed is displayed, block 1760, and all of the values that were individually stored in subscripted variable ZOUT for the row just finished, i.e. row J, are transferred to permanent storage in file "USGZDAT.DAT", block 1762.

Guesses for the values for the first element of this next row are arrived at by the following equations, block 1764, utilizing values stored during the previous row:

$$X\text{-guess} = XGP + B(1,2)(PSTEP)TTD$$

$$Y\text{-guess} = YGP + B(2,2)(PSTEP)TTP$$

$$PY = PY + PSTEP$$

$$ZP = ZPP$$

The row number is then updated, block 1766, and checked, block 1768, and if the last row has not been processed, the flow returns to block 1720 to process the next row. If all rows are filled the program ends, 1770.

NEWFIT (Selections 4-8)

At this point it is appropriate to discuss options 4-8 of program NEWFIT, after the formation of file "USGZDAT.DAT", and its identification with a particular geographic location by the insertion of a character between the "Z" and the first "D" (step 10, FIG. 1A).

Figure 13C:
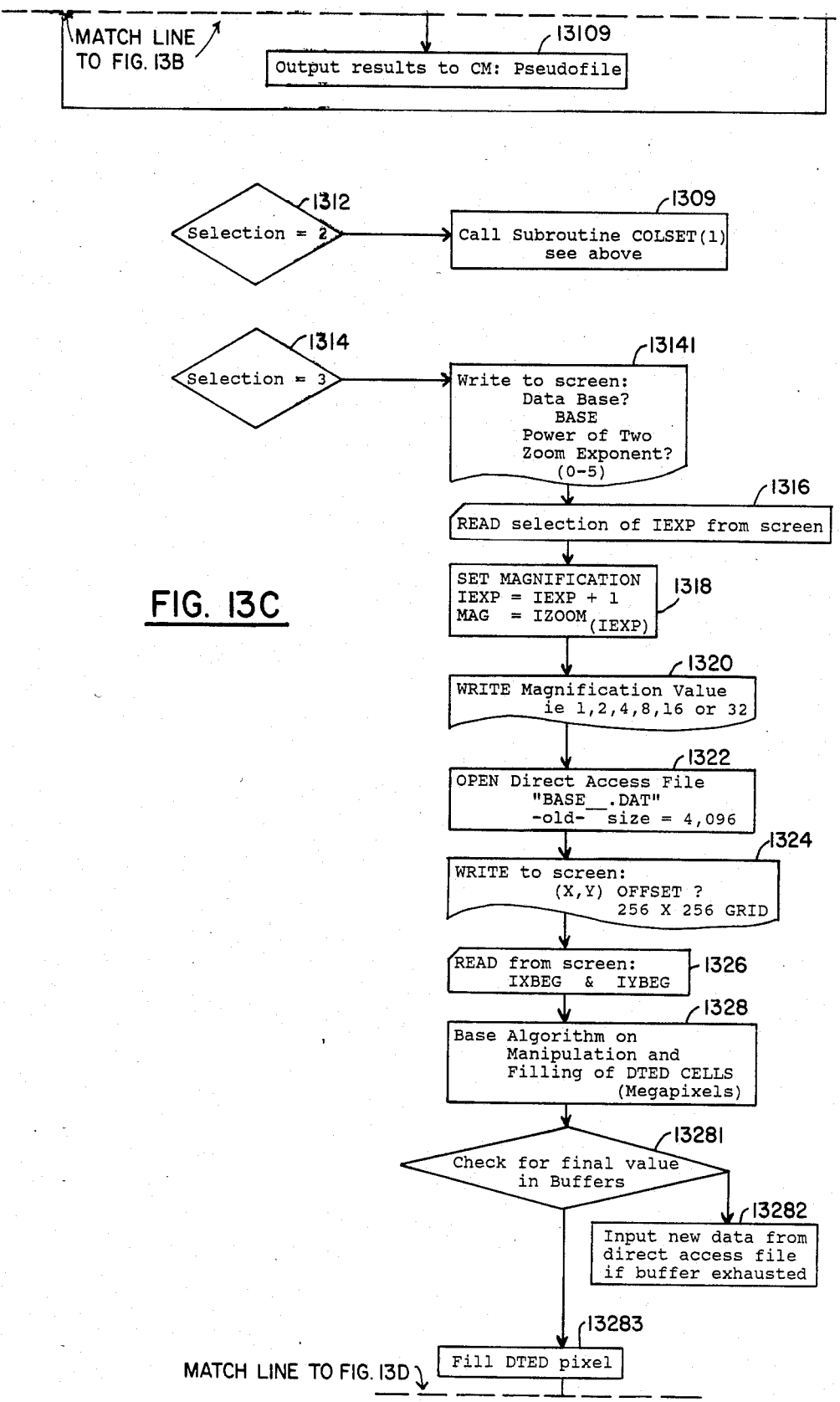
Figure 13D:
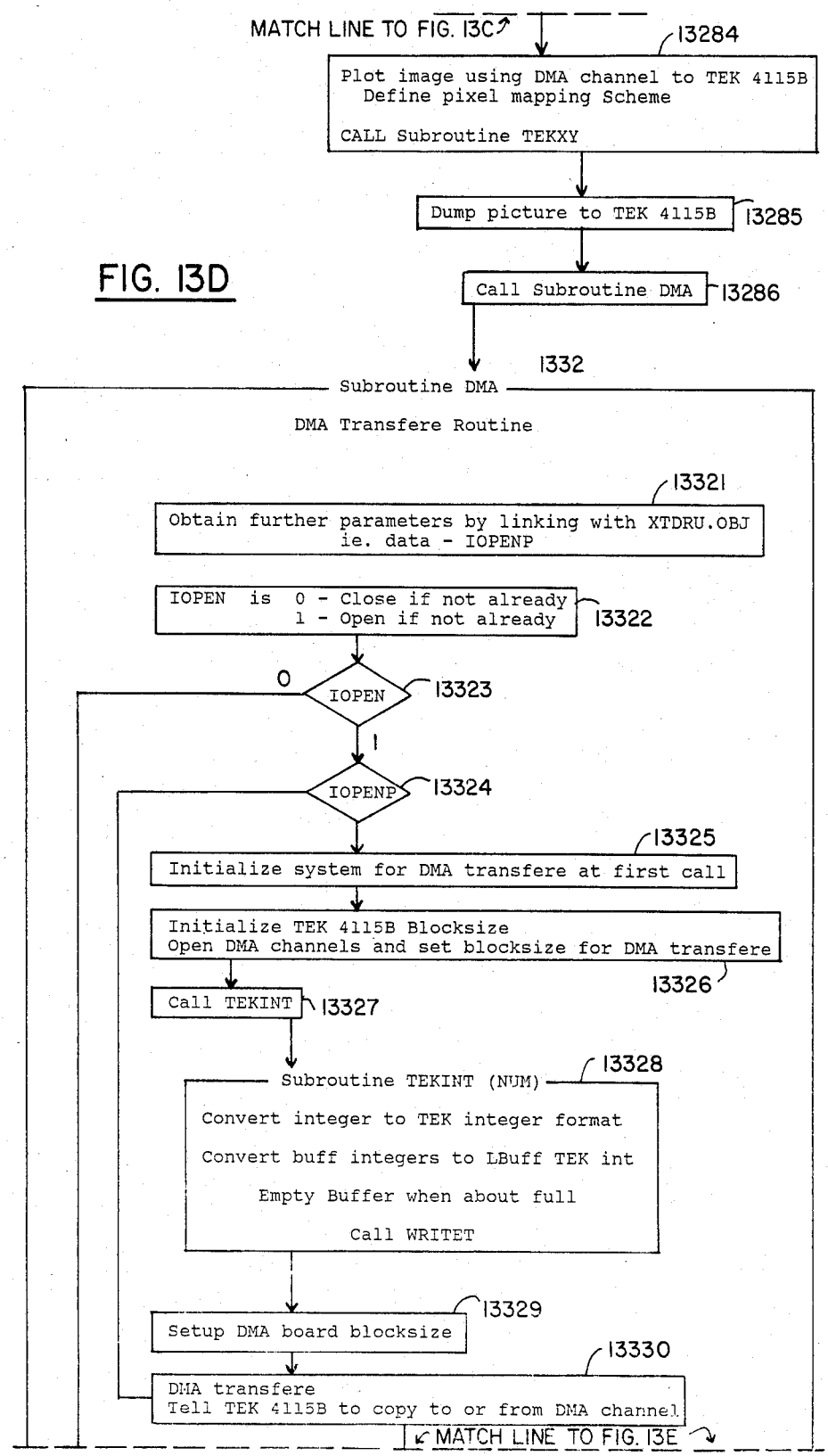
Figure 13E:
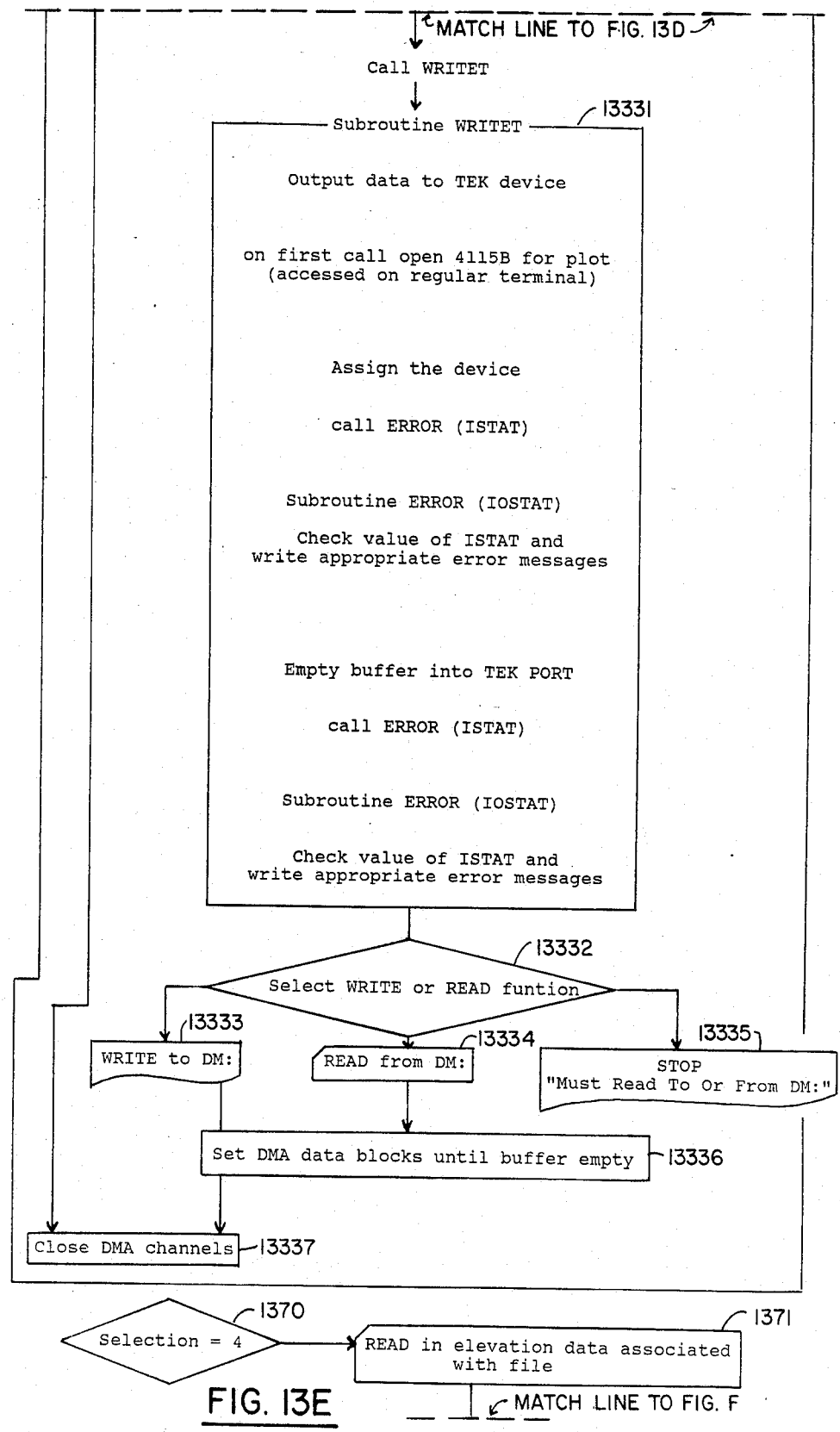

By selecting option 4, block 1370 FIG. 13E, designed to read in elevation data, block 1371, from the menu the operator can locate points in the view displayed. The operator will receive pixel coordinates, elevation value and offset for any point selected with the TEK screen cursor.

Figure 13F:
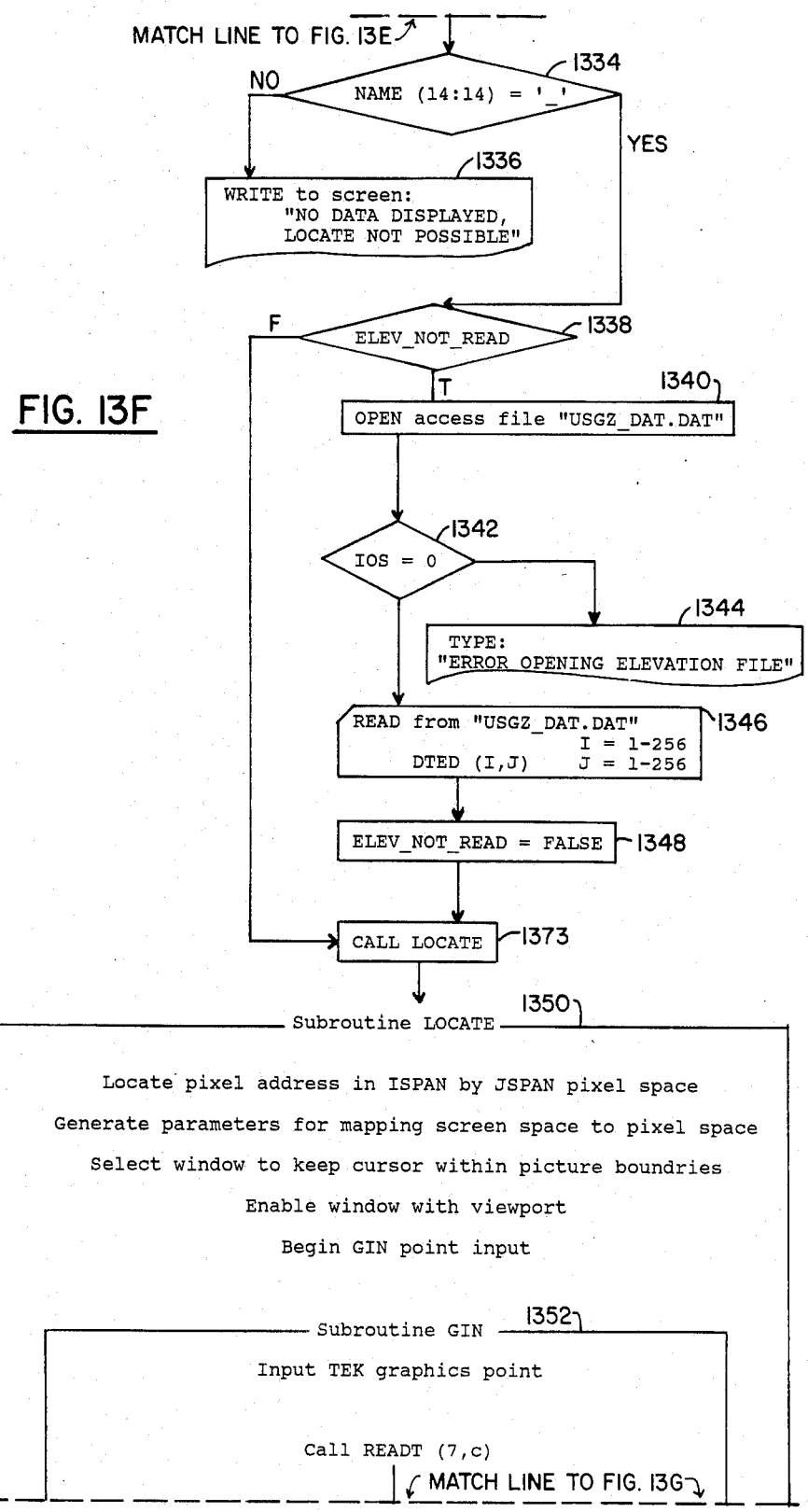
Figure 13G:
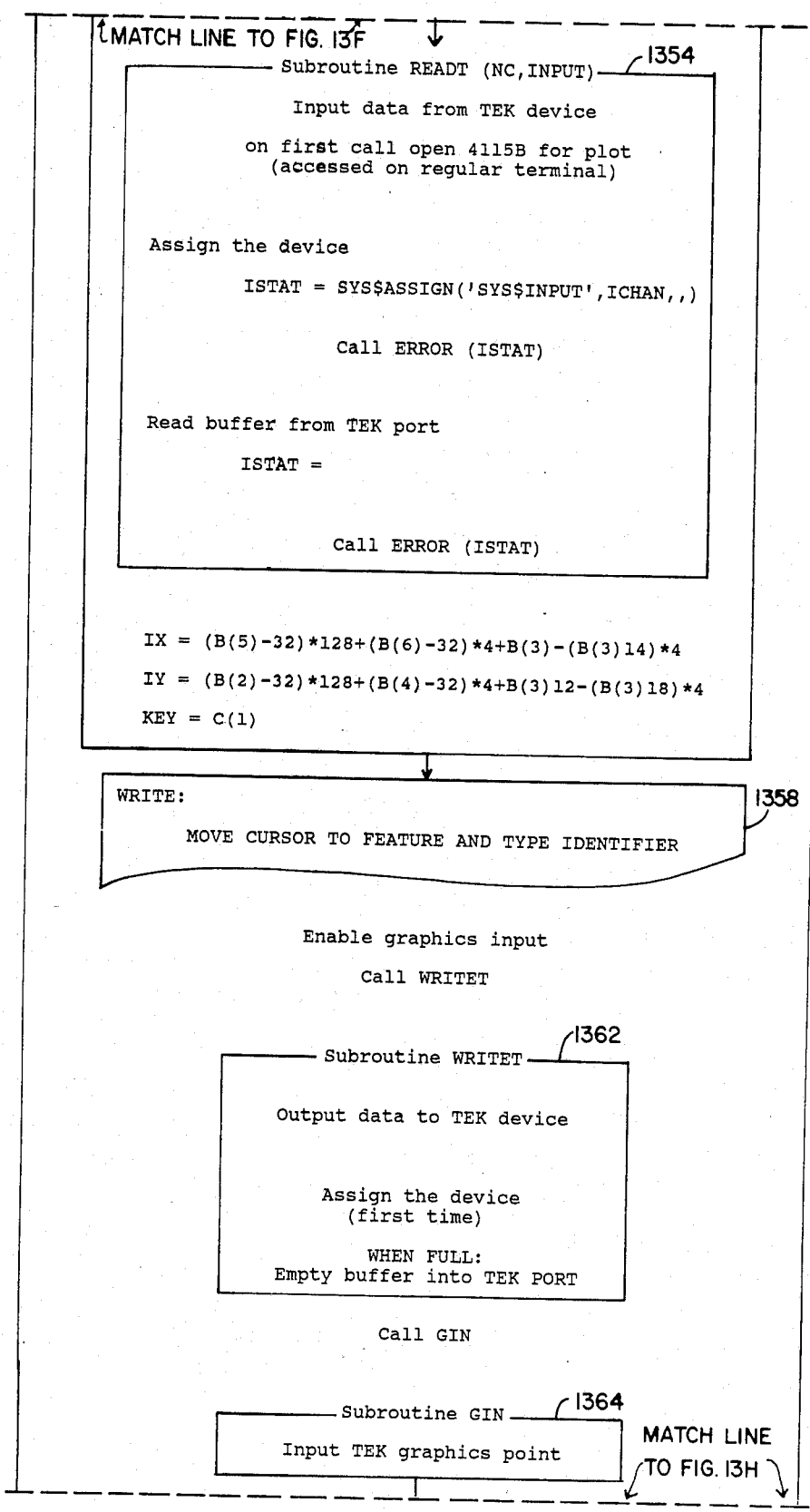

First, the program seeks the value of character variable "NAME" block 1334, FIG. 13F and investigates the value of its 14th character. If this character is blank then no data is displayed and location of points is not possible, and therefore an appropriate message is displayed on the TEK screen, block 1336.

If the data file has been identified, the program NEWFIT checks to see if the elevation has been read by checking the value of logical "ELEV.NOT.READ", block 1338. If the elevation has been read the program immediately calls subroutine LOCATE block 1350, if not, then the file "USGZ?DAT.DAT" is accessed, block 1340, and checked for validity, block 1342. If the file designated is not valid an appropriate message will be displayed, block 1344

The file is read into matrix DTED (256,256), block 1346 and the value of logical operator "ELEV_NOT_READ" is changed, block 1348, to indicate that the elevation data has been read. At this time the program calls subroutine LOCATE, block 1373.

Subroutine LOCATE, block 1350, does the actual pixel address locating in 8192×8192 pixel space, it generates the parameters for mapping screen space to pixel space, selects the window to keep the cursor within picture boundaries, and enables the window with viewport for display of pixel coordinates.

LOCATE first generates parameters for mapping screen space to pixel space by the following equations:

$$IOFF = IXBEG(MAXZOOM) \tag{40}$$

$$JOFF = IYBEG(MAXZOOM) \tag{41}$$

$$IFAC = MAXZOOM/MAG \tag{42}$$

Subroutine TEKXY, a DBA created subroutine for interaction of the VAX and the TEK, is accessed to convert pairs of values to the TEK X, Y format.

The buffer "BUFF" is utilized to select a window to keep the cursor within picture boundaries. VOS command characters are stored in BUFF for utilization later to control screen output limits and boundaries. Specific control characters for communication with the TEK programs and used in the exemplary embodiment include: "ESC, IW, IVO!, IEOA@O, SK, SQ, LF, IDO, LTI, KEY, and SC. The TEK programs are: GIN block 1352, WRITET, READT block 1354, BWSET, TEKINT and ERROR.

In the exemplary embodiment the message "Move Cursor To Feature and Type Identifier" is displayed to the TEK screen, block 1358. The operator then moves the cursor and types the identifier key. This will activate the call for subroutine GIN which interacts with subroutines READT and WRITET to produce on-screen indications of location and elevation values.

WRITET, block 1352, assigns the proper devices and empties VAX buffers into the TEK port utilizing VOS commands SYS$QIO, SYS$WAITER, SYS$ASSIGN and SYS$SETEF. READT operates much the same as WRITET, except it reads the buffer from the TEK port and so detects the screen location of the cursor as opposed to outputting cursor location data as the WRITET does.

Both subroutines open the TEK for a plot on first call and access the TEK as a regular terminal. They assign the device differently. READT assigns using ISTAT=SYS$ASSIGN('SYS$INPUT', ICHAN,,) while WRITET uses ISTAT=SYS$ASSIGN('SYS$OUTPUT', LCHAN,,) and ISTAT=SYS$SETEF(%VAL(50)). Both utilize subroutine ERROR (ISTAT) to check data transfers and output QIO error messages when appropriate.

To read the buffer from the TEK port, READT utilizes the VOS commands by ISTAT=SYS$QIOW(%VAL(ICHAN), %VAL('31'x),,,,%VAL(%LOC(INPUT)),%VAL(NC),,%VAL(0),,,). Whereas WRITET uses the commands ISTAT=SYS$WAITFR(%VAL (50)) and ISTAT=SYS$QIO(%VAL(50),%VAL(LCHAN),%VAL ('130'X),,,,%VAL(%LOC(BUFF)),%VAL(LBUFF-1),,%VAL(0),,,).

GIN, block 1364, and associated subroutines output values for variables IX1, IY1, and KEY. If IX1=IX2 and IY1=IY2 then the point coordinates output by GIN are the same as the previous point output and this implies that the input is finished block 1366, in which case subroutine TEKINT is called to convert the integers from 2 to "ISEG" into TEK integer format, and subroutine LOCATE is exited, block 1360, and therefore selection 4 is completed.

If the new IX and IY values differ from the old, then subroutine EL is called, block 1368, after IX2 and IY2 are set equal to the new IX, IY values and then the following equations are solved:

$$IPX1 = (IFAC(10)IX1)/64 + IOFF \tag{43}$$

$$IPY1 = (IFAC(10)IY1)/64 + JOFF \tag{44}$$

$$IGX = IPX1/32 + 1 \tag{45}$$

$$IGY = IPY1/32 + 1 \tag{46}$$

Subroutine EL regenerates the elevation value for the pixel location selected. The elevation variable is first set to 0, then the row and column locations (IGX, IGY) are checked to see that they lie within the screen boundaries, block 1370, i.e. between 1 and 256, inclusive. If not an appropriate message is displayed, block 1372. The elevation of the desired point is regenerated by first adding together all of the left-most pixel values of each row from the bottom row to row IGY, block 1374, and then, by summing along the row from the left-most to the IGX pixel cell and adding this to the previous total of the pixel elevation differences along the left-most column, block 1378, unless the pixel lies in the first column, block 1376. This procedure will generate the elevation value for the selected DTED cell, i.e. DTED (IGX, IGY), because the elevations were stored in program MAPZ as offsets from neighboring pixels and not as distinct elevation values.

Control is now returned to subroutine LOCATE which will now output values to the TEK screen for visual viewing by the operator, block 1380. Values of IPX1, IPY1, ELEV, IGX, IGY and DOFF are output to the TEK screen where IPX, IPY are the pixel X, Y location values of the screen point being interrogated, ELEV is the actual elevation of the cell at that screen point generated in "EL". IGX and IGY are the converted values of IPX and IPY, respectively, into DTED matrix space needed to generated ELEV, and DOFF is the original offset elevation value assigned to the DTED cell, i.e. DTED(I,J) in MAPZ.

Next LOCATE, block 1382, writes the identifier within the GIN viewport and stores it in a blinking segment using BUFF storage and subroutine WRITET to transfer the segments to the TEK port.

NEWFIT option 5 "Alter Elevation" allows the operator to manually change or alter the elevation of a particular DTED cell or a group of DTED cells. As shown in FIG. 1, step 6, this is accomplished through subroutine ALTEL which calls up the DTED data base which has been assigned a particular geographic identifier, block 1384. The data base is displayed on the screen of the TEK and locations are selected by the operator and the new elevations desired for those locations are entered.

The option "Alter Alevation" may be utilized to change elevations, to modify terrain features, to clean up the appearance of an image or to update a landscape which has been changed since the aerial photographs were taken.

The start of option 5 is very similar to the initial steps of option 4. The same checks to see if a data file has been displayed and to see if the elevation has been read are made blocks 1386–1396. Once the elevation has been read, i.e. matrix DTED (I256, J256) is filled from USG-Z_DAT.DAT, then block 1301 of NEWFIT begins an instruction sequence output to the TEK screen for operator interaction.

In blocks 1301 to 1311, the following sequence of information is written and read:

| WRITE | READ |
|---|---|
| "New Elevation" | elevation to "IEL" |
| "From (X, Y) | desired beginning point |
| 256 × 256 Grid" | into "IXBG, IYBG" |
| "To (X, Y) | desired ending point |
| 256 × 256 Grid" | into "IXND, IYND" |

This information tells the subroutine ALTEL, block 1315, where to start and stop changing elevations and what new value to substitute for the existing elevation. Subroutine ALTEL sets all elevation values between the starting and ending pixels equal to the value specified.

After the desired values for starting and ending pixels and new elevation are entered, subroutine ALTEL is called, block 1313.

ALTEL checks to make sure that the beginning column number is less than the ending column number and that the beginning row number is less than the ending row number. ALTEL switches designated column or row beginning and end numbers when necessary, blocks 1317 through 1325.

Next subroutine EL is called to obtain the elevation value "ELP" of the beginning pixel IXBG of each row from IYBG to IYND EL also returns the offset or change in elevation value from the pixel to its left of that pixel in the following format:

"Begin Pixel Elev for Row #=#
Begin Pixel Offset=#

Subroutine EL, block 1327, is utilized to find the elevation value of the last pixel that is to be changed in each row, i.e. DTED (row, IYND). This information is stored in variable "ELE" for later use.

Next the value is stored in the DTED matrix for the beginning pixel of each row and is displayed and the desired elevation change is supplied, block 1329, and then altered by the following formula shown:

$$\text{new value DTED(Row, IXBG)} = \text{old value} \\ \text{DTED(Row, IXBG)} - (\text{old elev} - \text{IEL}) \tag{46}$$

This procedure will store the new offset value to produce the desired new elevation value in the DTED matrix. The new offset value stored in the DTED matrix is also displayed on the screen.

In block 1331, the DTED matrix values of all cells along each row, after the first through the IYND cell, is set to 0 because the elevation for each is the same as the first and so the elevation offset is 0.

The elevation of the next cell past the last cell in each row to be altered, needs to be restored. The offset elevation value for the cell stored in the DTED matrix will no longer produce the correct elevation value because of the change in elevation of the cell to its left. Therefore, the following equation, block 1333, is used to restore the correct elevation by establishing a new offset value and storing this value in the DTED matrix in place of the old value for DTED (row, IXND+1):

new DTED (row, *IXND*+1)=old DTED (row,
*IXND*+1)+old elevation "ELE"−IEL     (47)

If the beginning column, i.e. column IXBG, is the first, then before the next row up can be processed and after processing of the final row, i.e. row IYND, the DTED matrix value of the cell of the row above must be corrected by the following formula, block 1335:

new DTED (row+1,1)=old DTED
(row+1,1)+old elevation of lower row
"ELP"−IEL     (48)

ALTEL then checks to determine if the last row to be processed has been altered, block 13351, and if more rows remain, continues with the DO loop, block 133352, and processes the next row and so on row by row, bottom to top.

Figure 13H:
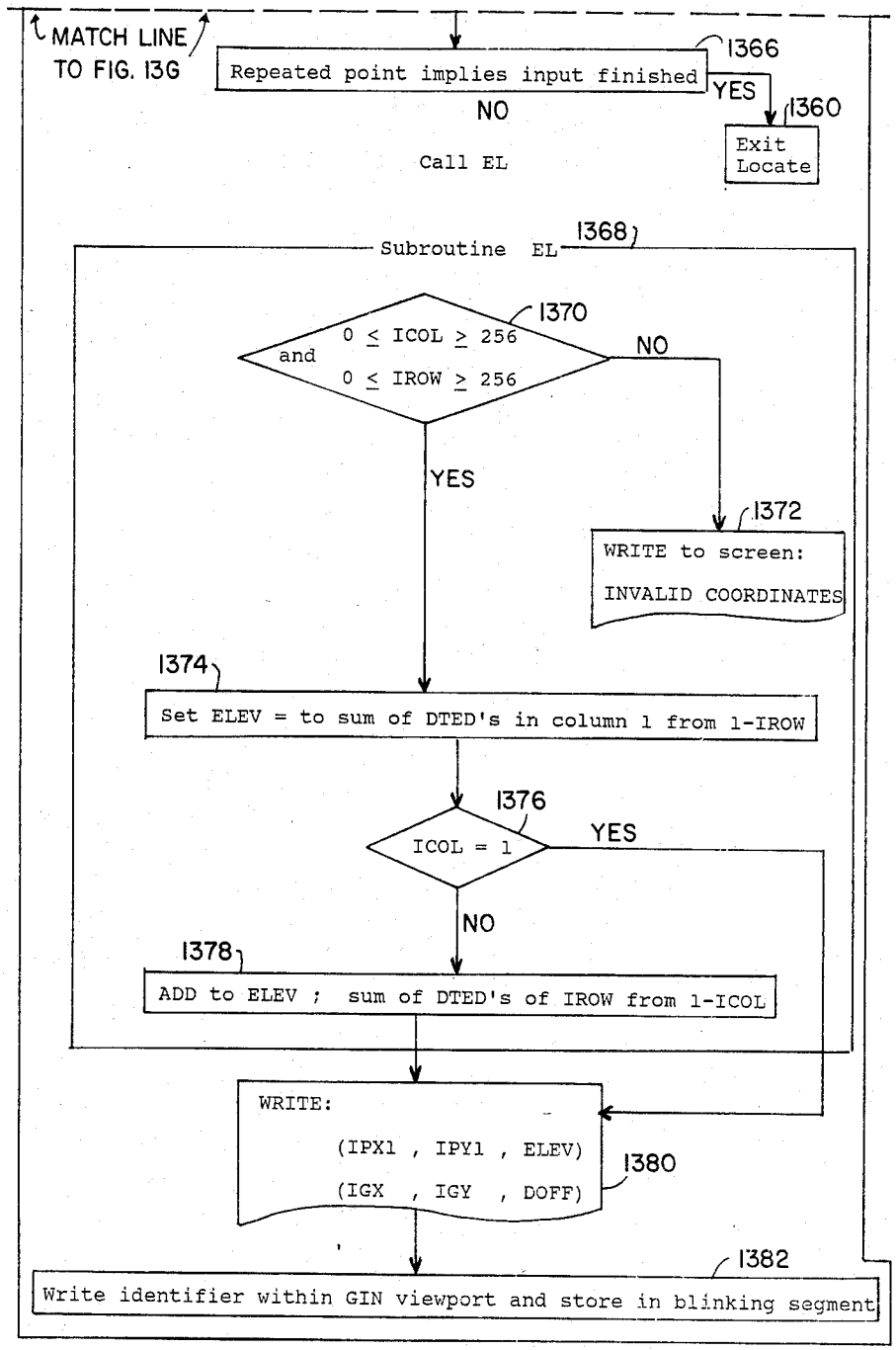
Figure 13I:
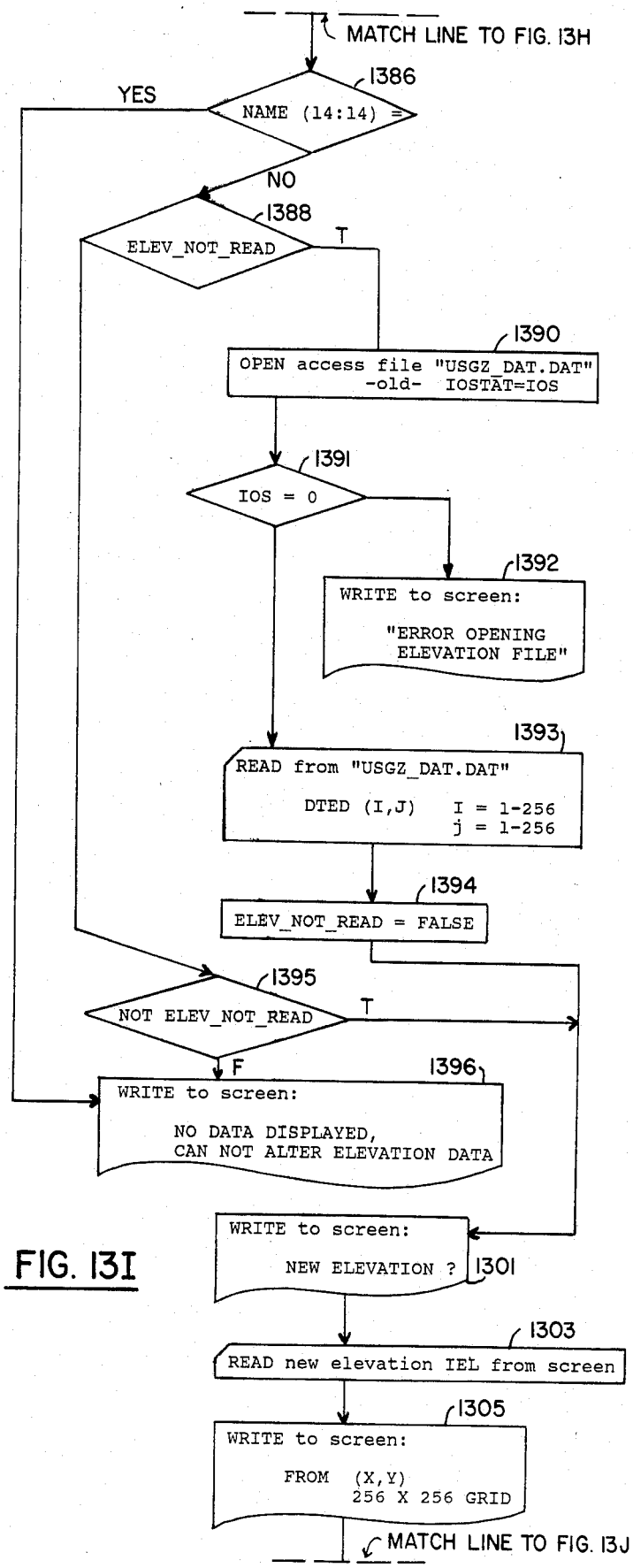
Figure 13L:
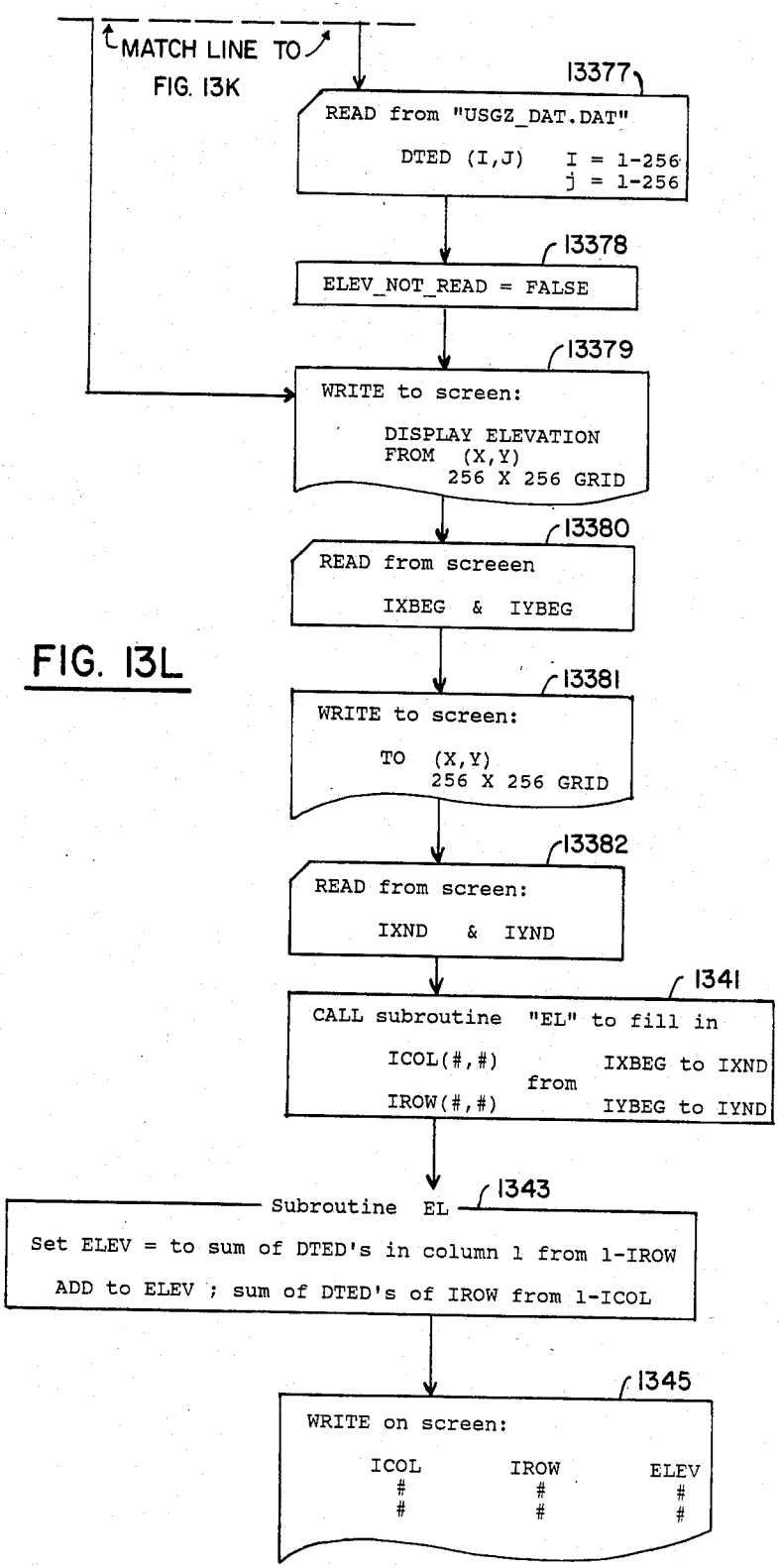
Figure 13M:
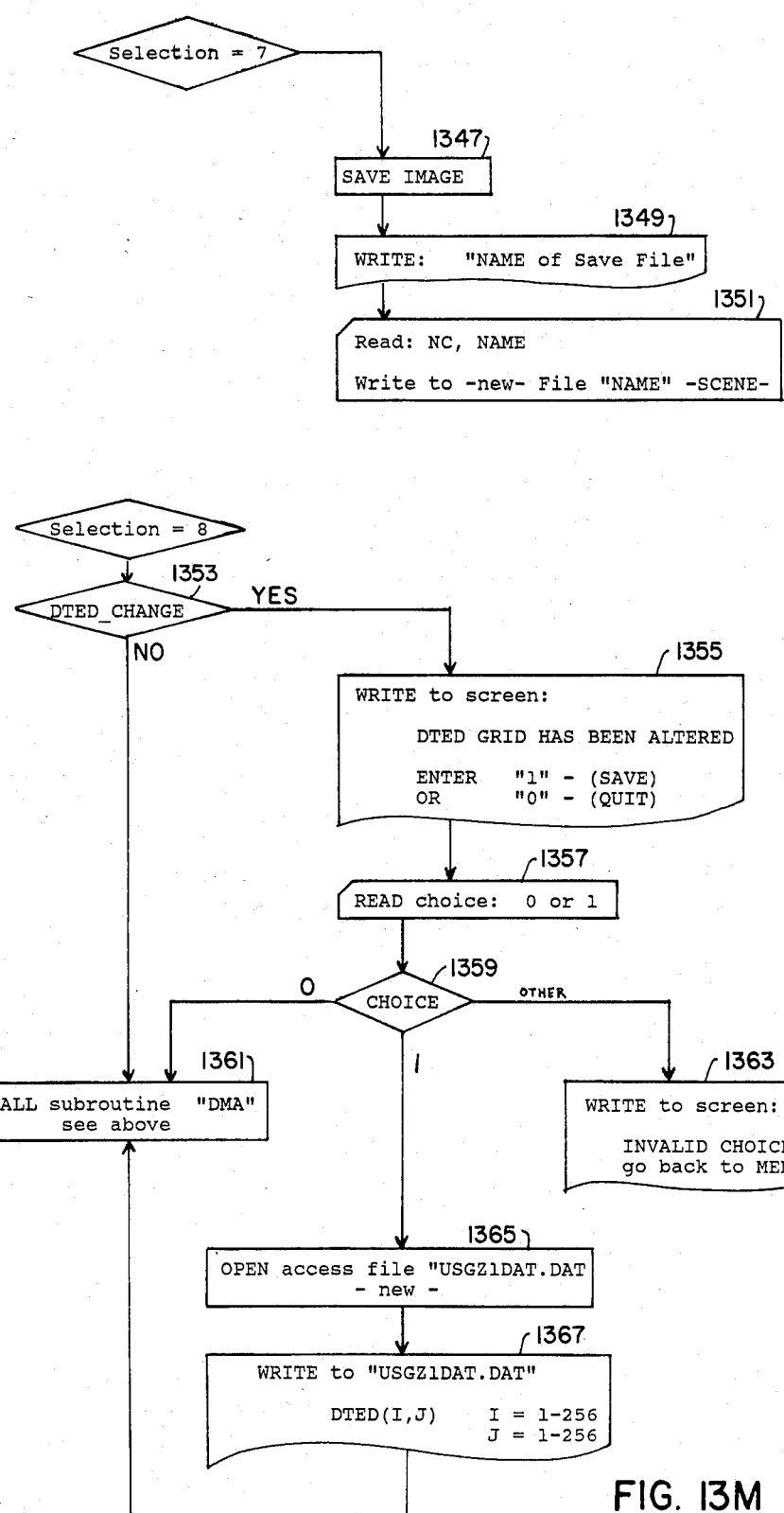

NEWFIT selection 6, FIG. 13K block 13370 through FIG. 13L block 13382, operates in substantially the same manner as selection 5, FIG. 13H block 1384 through FIG. 13J block 1311. Selection 6 does not call ALTEL, but has a DO loop block 1341 FIG. 13L at this point in the program in which subroutine "EL" is called each time through. The DO loop runs from (IXBG, IYBG) to (IXND, IYND) as values fed into EL. EL, block 1343 produces elevation values for these cells and outputs them to the TEK screen in the format below: block 1345,

| ICOL | IROW | ELEV |
|---|---|---|
| # | # | # |
| # | # | # |
| # | # | # |

Selection 7 "Save Image" of NEWFIT saves the altered or unchanged version of the DTED matrix presently contained in the VAX, block 1347. The program outputs the message "NAME of Save File" to the TEK screen, block 1349, to prompt the operator to enter the name of the file to which he wishes to have the DTED matrix written. In the exemplary embodiment the file will have the name "USGZ_DAT.DAT" where the blank is filled in with a geographic location indicator.

The matrix DTED is then written to the file designated in block 1349 by the operation of the program in block 1351.

The final option 8 "Stop" ends the program, saving the altered information if desired. Block 1353 checks to see if the DTED matrix has been altered. If the matrix has not been altered, the program flows to block 1361 which calls subroutine DMA, see earlier portion of flow chart. When DMA is called in block 1361, the value of IOPEN is set at 0 therefore the subroutine is directed by block 13323 straight to block 13337 and the DMA channels are closed and the program NEWFIT is stopped and exited.

If, however, the DTED matrix has been altered, the program flows to block 1355 and outputs a message such as "DTED Grid Has Been Altered" and gives the operator the choice of saving the alteration or quitting. The choice is read, block 1357, and analyzed, block 1359. If quit is chosen, subroutine DMA is called with IOPEN=0 as above, block 1361. If neither save nor quit is chosen, block 1363, "Invalid Choice" is output to the TEK screen and the program goes back to the main menu at the beginning of NEWFIT.

If the choice is to save, then the program flows to block 1365 and a new file "USGZ1DAT.DAT" is created and the DTED matrix is written to this file, block 1367, and then subroutine DMA is called with IOPEN=0 as above, block 1361.

COEFMAT

The main program portion of COEFMAT (FIGS. 18A–18M) comprises essentially a menu output, block 1803, which allows operator selection. The selection mode will call various appropriate subroutines to accomplish the necessary tasks. The first block of COEFMAT, 1801 FIG. 1B, opens two new files, SYS$OUTPUT and SYS$INPUT, for future use. In block 1803, the menu is written to the screen of the TEK. The operator makes a selection from this menu which is read by the program, block 1805.

If the operator's selection equals 1, block 1807, then subroutine FIELDV is called, block 1809, to choose the field of view for nominal flight path. The field of view is entered in degrees, and depends on the scope of vision to be afforded the pilot being briefed. Subroutine FIELDV outputs a message to the TEK screen asking for a field of view in degrees, block 1811. The operator enters a value and it is assigned to the variable "FOV", block 1813.

If the selection is 2, "File Output Mode", block 1815, then subroutine PFILE is called, block 1817. The subroutine outputs a menu, block 1819, to the TEK screen and allows the operator to select "No Output" or to "Name the Coefficient Output File". If selection from this menu is 0 for "No Output", subroutine PFILE returns control to the main program back to the initial menu.

If in subroutine PFILE, the selection is 1 for "Name Coefficient Output File" then subroutine GETNEW is called, block 1821.

Subroutine GETNEW is used to open a file with a new name assigned by the operator. First, block 1823, GETNEW displays a message on the TEK "Enter Name of New File" to prompt the operator to enter a file name. Next, block 1825, GETNEW reads the name of the file entered by the operator. The file name is checked against existing files to see if that name already exists, block 1827. If the name assigned by the operator is new then a new file with that name is opened for later use, block 1829.

If the file name already exists then another menu, block 1831, is written to the TEK screen. The operator can choose to overwrite the existing file or to go back and enter a different file name. The choice of the operator is read, block 1833, and appropriate action is taken. Either flow is routed back to block 1823 or on to block 1835 where the existing file is reopened.

If the main menu selection is 3, "Warp Error Tolerance", block 1837, then subroutine TOLER is called, block 1839. This program is used to establish a set of tolerances utilized during warping. Later, in the program COEFMAT, warped scenes are checked against the original scene for skewing of points and the amount of skew is compared with the tolerances established here to see if a new scene needs to be generated when the skew is greater than the set tolerances.

First, the previous tolerances are erased and the tolerance variables are set equal to 0 and a message indicating this is written to the TEK screen, block 1841. Next, block 1843, menu 1 is written to the TEK screen and the operator makes a choice from 1 to 4, which produces the second menu from which the operator will assign values for the fixed threshold and percentage of step size for each of the standard deviations, Absolute Average and Worst Case Offset. These values are stored in the TOL(3,2) matrix in the following manner:

| TOL | | |
|---|---|---|
| Standard Deviation Fixed Threshold | Absolute Average Fixed Threshold | Worst Case Offset Fixed Threshold |
| Standard Deviation % of Step Size | Absolute Average % of Step Size | Worst Case Offset % of Step Size |

The MODET(3,2) matrix will have a 1 at the corresponding position to indicate that a tolerance variable has been entered for the corresponding factors in the TOL(3,2) matrix.

Once all values desired to be applied by the operator have been entered and stored in the TOL matrix, block 1845, control is returned to COEFMAT and the operator again selects from the original menu, block 1803.

If the main menu selection is 4, "Generate Coefficient", block 1847, then subroutine COEFGEN is called, block 1849. Subroutine COEFGEN, block 1851, utilizes: (1) the Field of View "FOV" read in block 1813; (2) the indicator ("MODEP") read in block 1819 which indicates whether output is or is not; (3) the tolerance matrix TOL(3,2); and (4) the tolerance change indicator matrix MODET(3,2) from block 1845 to generate a set of warp coefficients to be stored in the file opened in block 1829 or block 1835.

COEFGEN outputs a prompt to the TEK screen, block 1853, to prompt the operator to input the desired number of time intervals along the trajectory path, in other words, the number of times the screen is to be updated from the start to the end of one fly-over. The greater the number of iterations, the shorter the length of each time interval and the smoother the scene appearance. At some point the smoothing of the scene will not create any smoother picture to the observer. Also there is a limit to the speed of updating available in the VAX which creates the need to balance update frequency against the smoothness of transition from warp image to warp image. Block 1855 reads the number of intervals input by the operator into variable "NUMITER".

COEFGEN next needs to calculate the Camera Position "XC", the Target Position "XT", Rotation Angle "ROT" and Time Interval "ITER", and uses subroutine TRAJEC, block 1857.

Subroutine TRAJEC, block 1859, is utilized to set initial values of "XC" and "XT" and to update "XC" based on the number of the iteration for the same "XT".

TRAJEC in the exemplary embodiment assumes a camera speed of 22 meters/frame, a straight line flight path and constant flight altitude. XC represents the position in pixel coordinates of the camera at each desired time frame. XT represents the position in pixel coordinates of the target, i.e. the center of the field of view. ROT represents the rotation in degrees of the output scene, i.e. negative roll angle about the longitudinal axis of the camera.

First, TRAJEC determines the position of the camera along the flight path by checking the camera time frame number. The time frames run from 1 to 300. If the time frame is less than one or greater than 300 TRAJEC stops execution and an appropriate message "Nonpositive Frame" or "Access Beyond Last Frame" is displayed, respectively. At this point in subroutine COEFGEN, the first time TRAJEC is called, the frame number will be 1 because the iteration number is set to 1 at the start of COEFGEN.

TRAJEC next sets the values of XC to:

$$XC(1) = 2731 + (IFRAME - 1)4.957678$$

$$XC(2) = 8500 - (INFRAME)21.43412$$

$$XC(3) = 1800$$

Next TRAJEC checks the frame or iteration number and sets the value of XT accordingly as follows:

For Iterations 1–180:

$$XT(1) = 3841$$

$$XT(2) = 3701$$

$$XT(3) = 1372$$

For Iterations 181–210:

$$XT(1) = 3841 + (\text{Iteration} - 180)3.2476$$

$$XT(2) = 3701 + (\text{Iteration} - 180)0.75116$$

$$XT(3) = 1372 - (\text{Iteration} - 180)0.4$$

For Iterations 211–240:

$$XT(1) = 3939$$

$$XT(2) = 3724$$

$$XT(3) = 1360$$

For Iterations 241–270:

$$XT(1) = 3939 - (\text{Iteration} - 240)3.2479$$

$$XT(1) = 3724 - (\text{Iteration} - 240)0.75116$$

$$XT(3) = 1360 + (\text{Iteration} - 240)0.4$$

For Iterations 271–300:

$$XT(1) = 3841$$

$$XT(2) = 3701$$

$$XT(3) = 1372$$

Once these values have been assigned for the first iteration, i.e.:

$$XC(1) = 2731$$

$$XC(2) = 8500$$

$$XC(3) = 1800$$

$$XT(1) = 3841$$

$$XT(2) = 3701$$

$$XT(3) = 1372$$

then flow is returned to subroutine COEFGEN which calls subroutine DOCUM next, block 1861.

Subroutine DOCUM prints out the field of view in degrees "FOV", the number of grid points used to check warp alignment (i.e. 64 or 8×8), the starting camera and target positions "XC" and "XT". DOCUM also prints out values for Standard Deviation, Absolute Average and Worst Case Offset tolerances but only if values for those tolerances were entered earlier. This output to the TEK screen takes on the format substantially as shown in block 1861 in the exemplary embodiment.

Next subroutine COEFGEN checks the value of "NEWGET" block 1863. NEWGET will equal 0 when it is necessary to obtain the next point of iteration or time frame along the designated trajectory. Therefore as long as NEWGET is not equal to 0 the program flows to block 1865 and processes the particular camera position XC along the trajectory. If NEWGET equals 0 at this point however, then flow is to block 1818 and the next point along the trajectory is obtained.

At this stage of COEFGEN, however, NEWGET has been previously set equal to 1, therefore flow will be directed to block 1865. In block 1865 the number of the iteration is checked and if equal to 1, flow is routed to block 1879 in order to generate a new scene from the XC, XT information. At this point in the program, i.e. the first time through, the iteration will be equal to 1 therefore flow is to block 1879.

First, block 1881, the origin of this warp, XC and XT, are saved in variables XOC and XOT, respectively. Next, a grid of 8×8 points for the full warp data is generated by calling subroutine GETDTED, block 1883.

GETDTED 1887 receives the values of XC, XT and FOV pixel data and elevation data to generate X, Y, Z coordinates of an alignment grid with XC as the origin. GETDTED first calls subroutine PERSPEC, block 1889, to generate orthogonal rotation and integer scaling orientation transformation matrix T(3,3) PERSPEC builds the matrix from the values of XC and XT by the following series of equations:

$$DX = XC(1) - XT(1)$$

$$DY = XC(2) - XT(2)$$

$$DZ = XC(3) - XT(3)$$

$$HYP = \sqrt{DX^2 + DY^2}$$

where HYP is the camera distance from the origin in the X, Y plane.

If the value for HYP=0 then the SPH and CPH values are set to 0 and 1, respectively. Otherwise SPH and CPH are set equal to DX/HYP and DY/HYP, respectively.

$$DIST = \sqrt{HYP^2 + D^2}$$

where DIST is the camera distance from the origin in 3-D space.

$$STH = HYP/DIST$$

$$CTH = DZ/DIST$$

The values for the T(3,3) matrix are then filled as follows:

$$T = \begin{pmatrix} CHP & CTH(SPH) & STH(SPH) \\ -SPH & CTH(CPH) & STH(CPH) \\ O & -STH & CTH \end{pmatrix}$$

Once this matrix is filled, flow returns to GETDTED which immediately calls subroutine POLYDTED, block 1891. POLYDTED, block 1891 detailed as FIGS. 18K-M, receives XC, FOV and the T matrix from GETDTED and the DTED data base from MAPZ to produce the ZIN(8,8) matrix which is the grid used to test the warp alignment. The camera position values XC(1-3) are stored in variables XC, YC and ZC, respectively, to represent X, Y and elevation values of the camera position.

First, block 1860, POLYDTED reads the appropriate geographic file created in MAPZ into a storage matrix ZBUFF (65,536) where each element of file "USGZ1DAT.DAT" is read into a subscripted location in ZBUFF( ) corresponding to its location in "USGZ-1DAT.DAT". The range of valid data is set to 1-65,536 in the exemplary embodiment, block 1862. Next all the values for the ZIN(8,8) matrix are set equal to $-1 \times 10^{30}$, the furthest possible value, block 1864.

Consecutive grid points of ZIN need to be transformed to new perspective, block 1866, and therefore appropriate scale factors for the camera rotation matrix T(3,3) are modified here, block 1868. First values for XYF and ZS are found by the equations shown in block 1868 and then values for the T(3,3) matrix are modified as shown, where TT stands for the old T matrix available when subroutine POLYDTED was called.

The offsets are established based on the camera position XC, YC, ZC using the following equations shown in block 1870:

$$XOFFD = -XC/32$$

$$YOFFD = -YC/32$$

$$ZOFFD = ZBUFF(1) - ZC$$

Figure 18A:
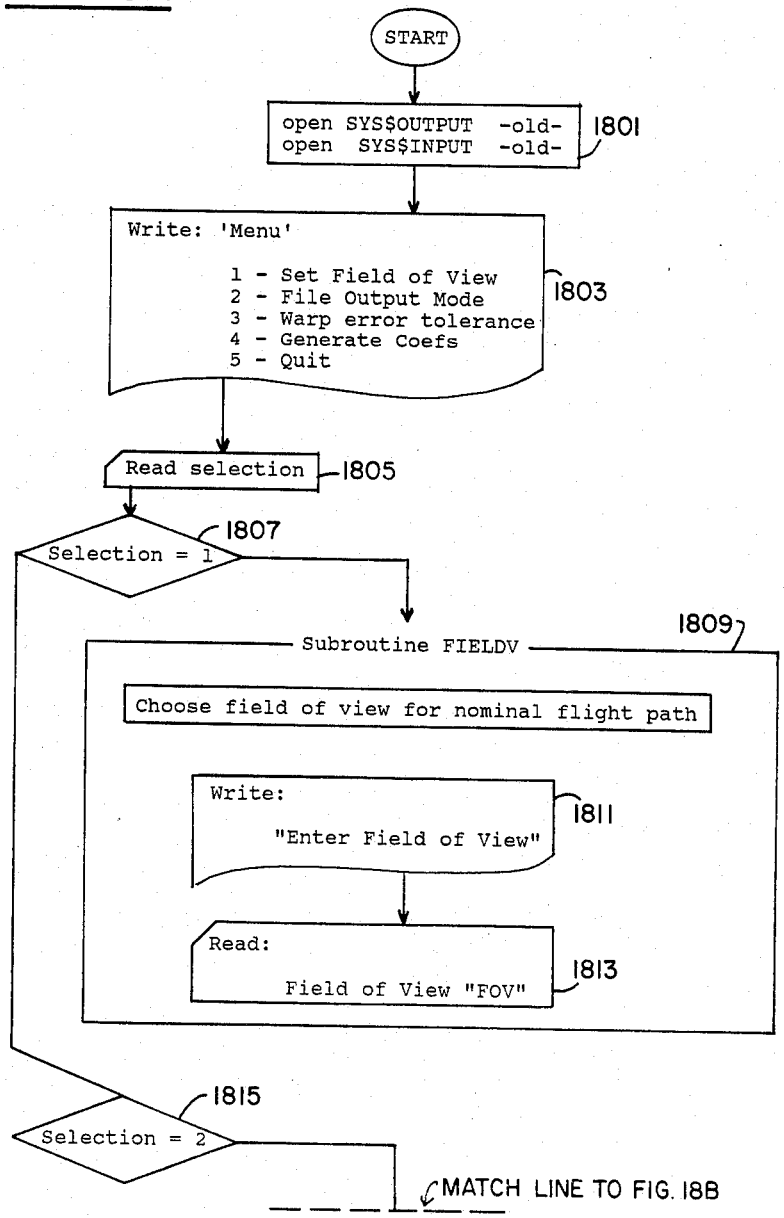
FIGS. 18A–18M illustrate the flow diagram for the program COEFMAT.
Figure 18B:
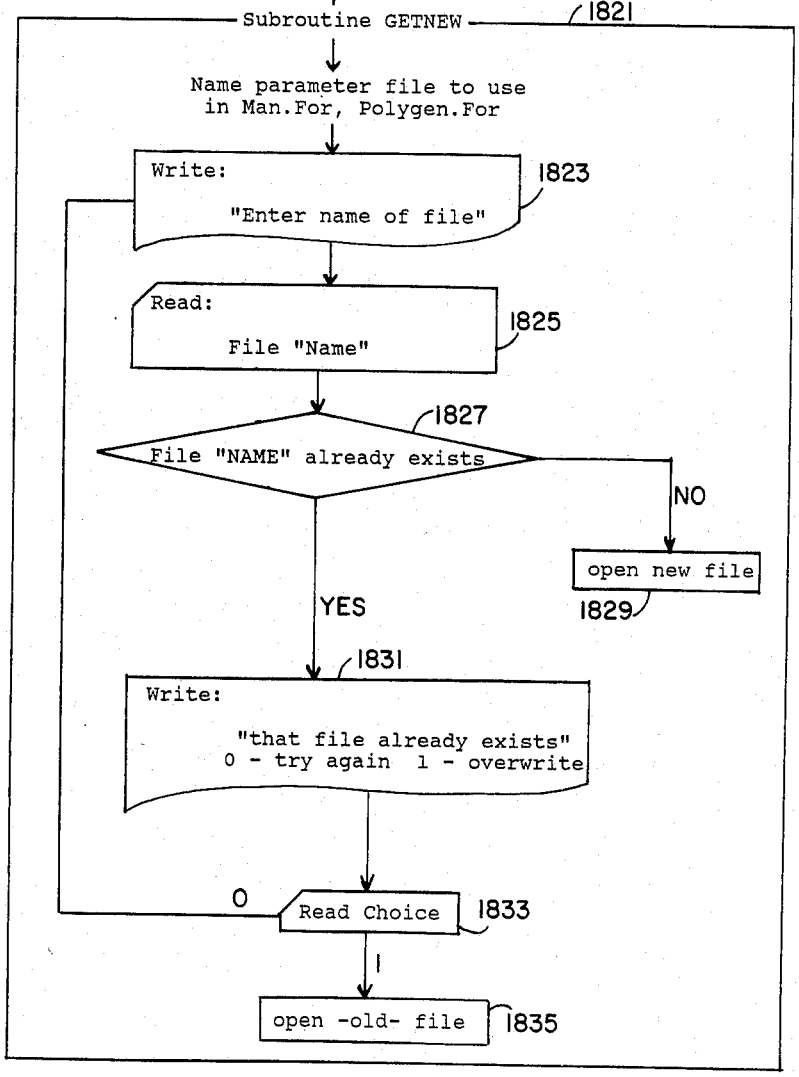
Figure 18C:
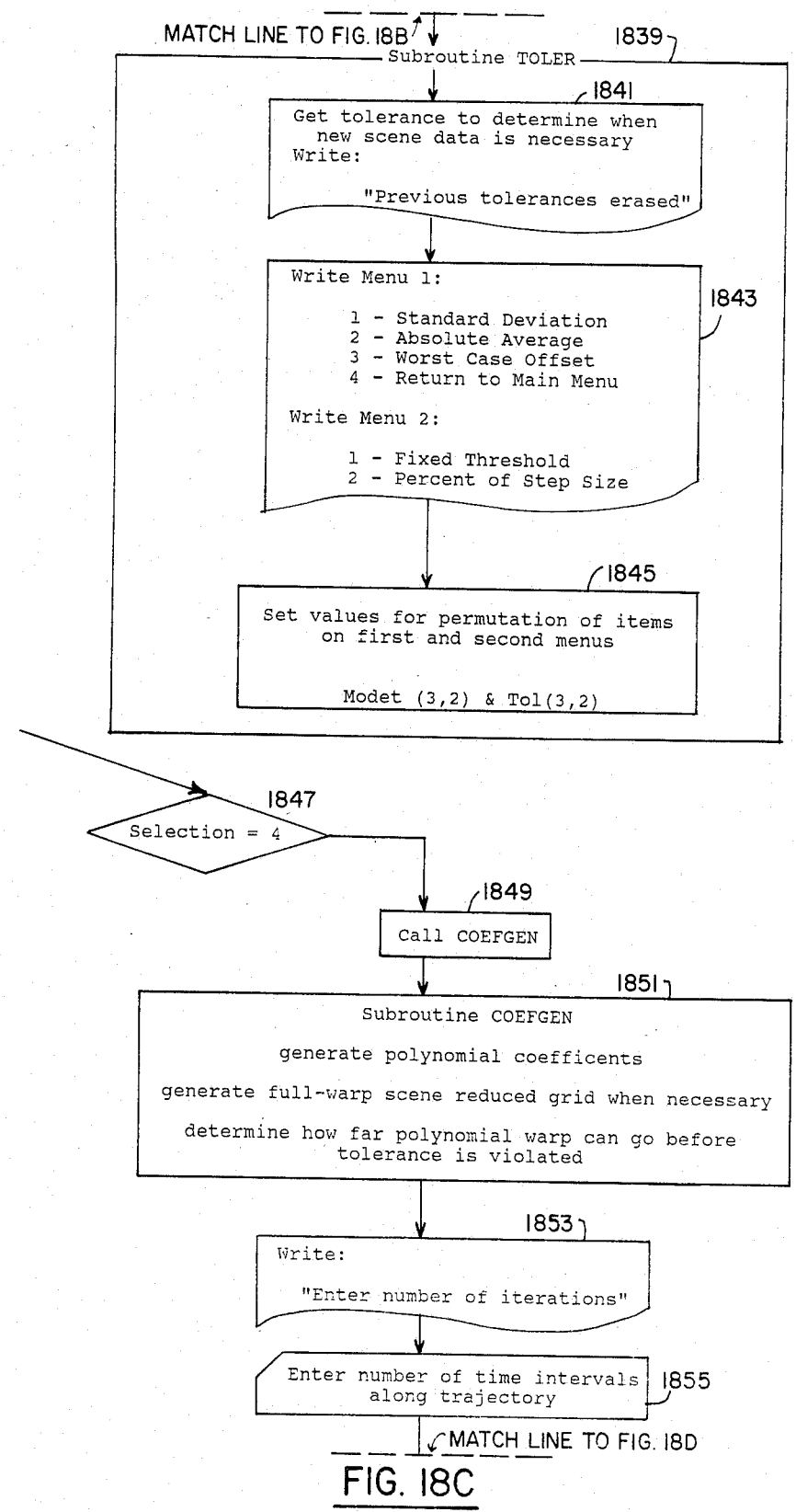
Figure 18D:
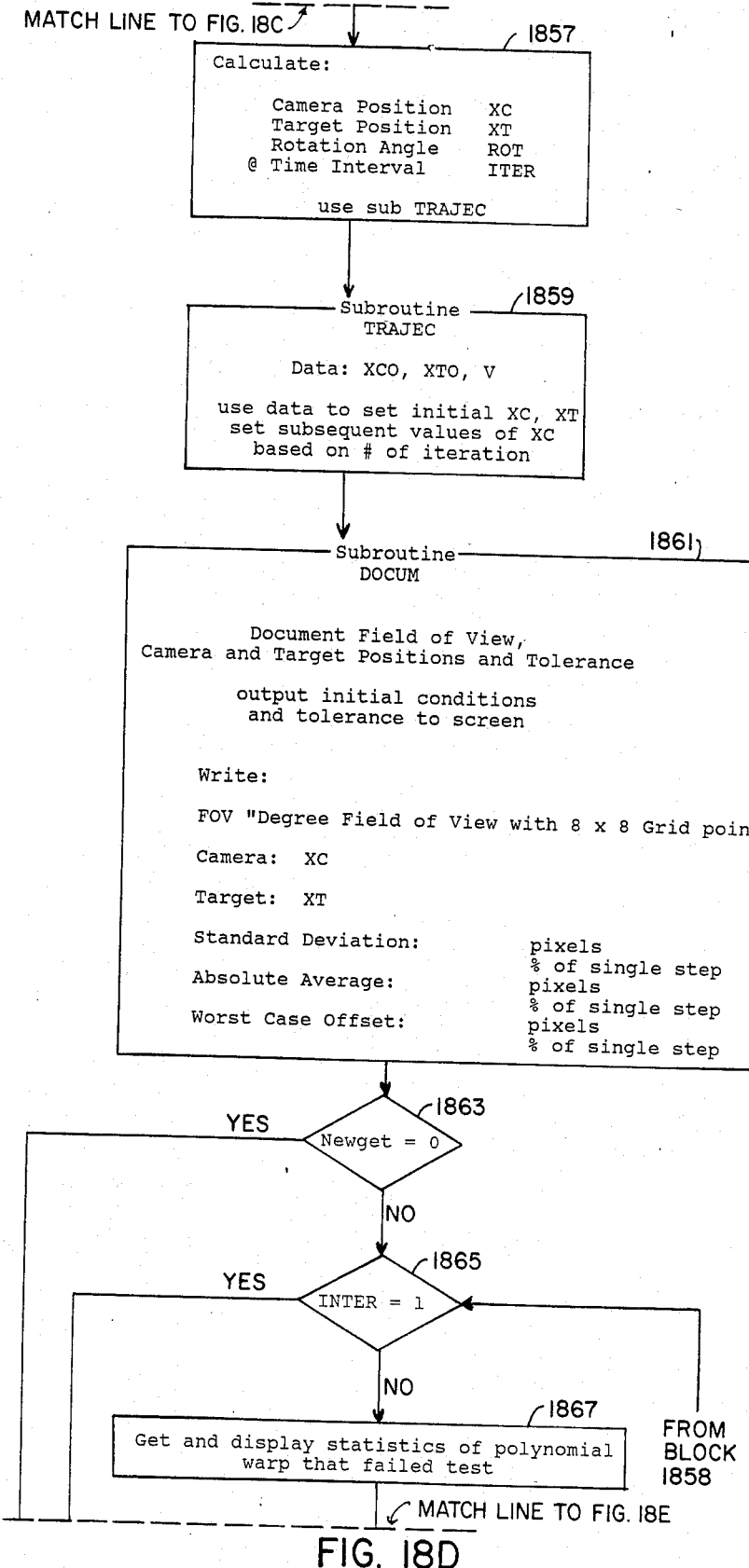
Figure 18E:
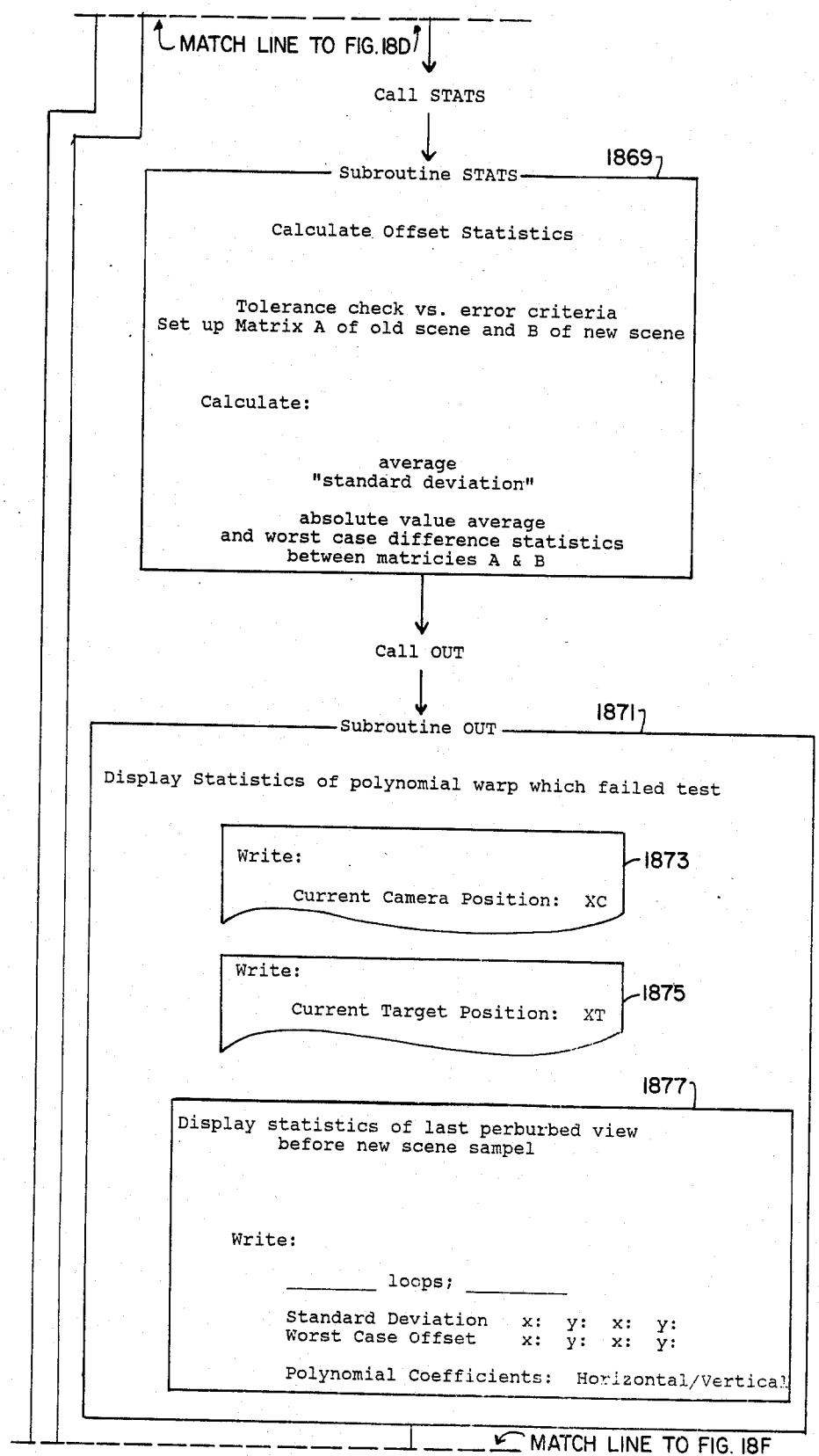
Figure 18F:
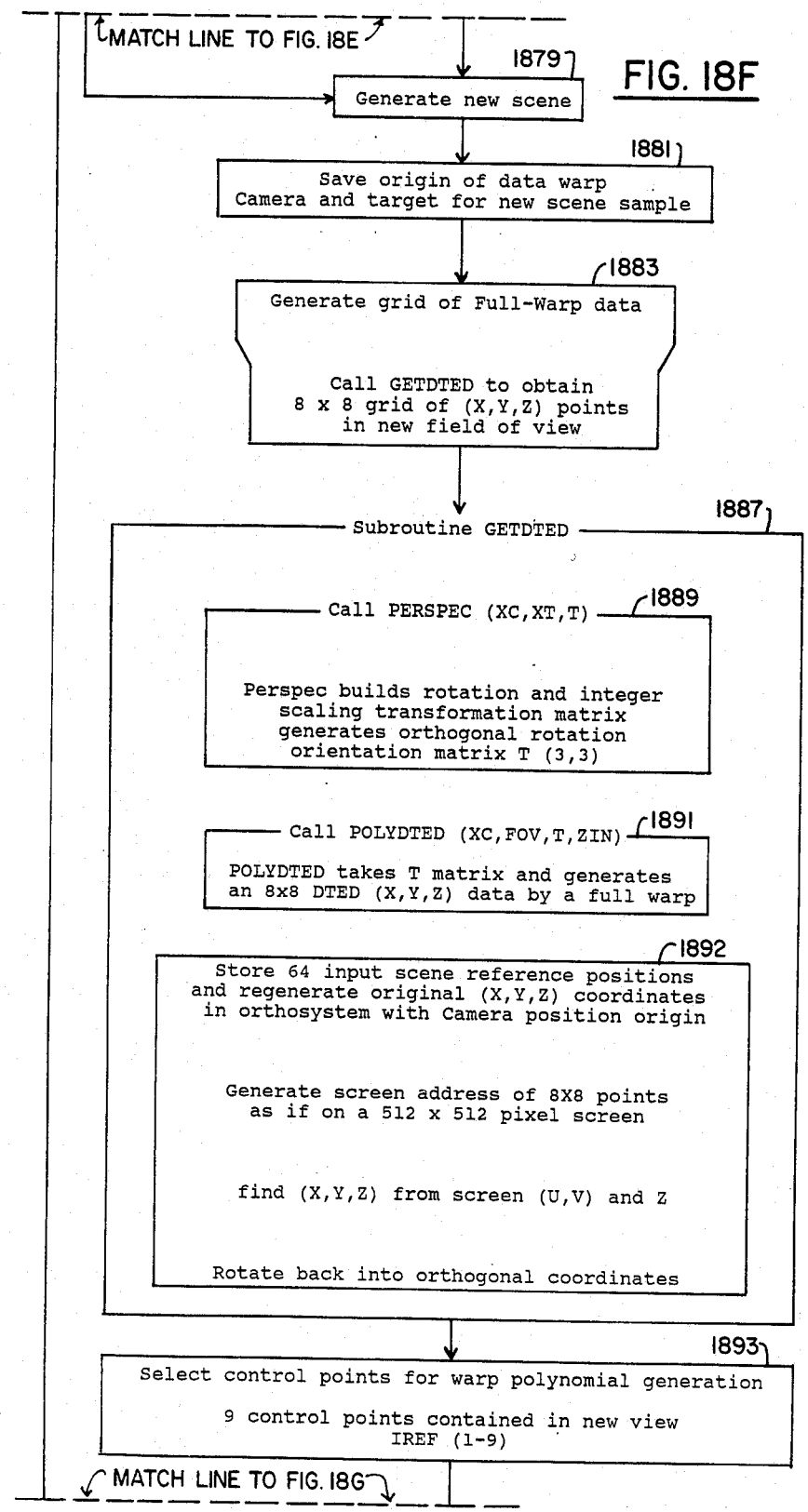
Figure 18G:
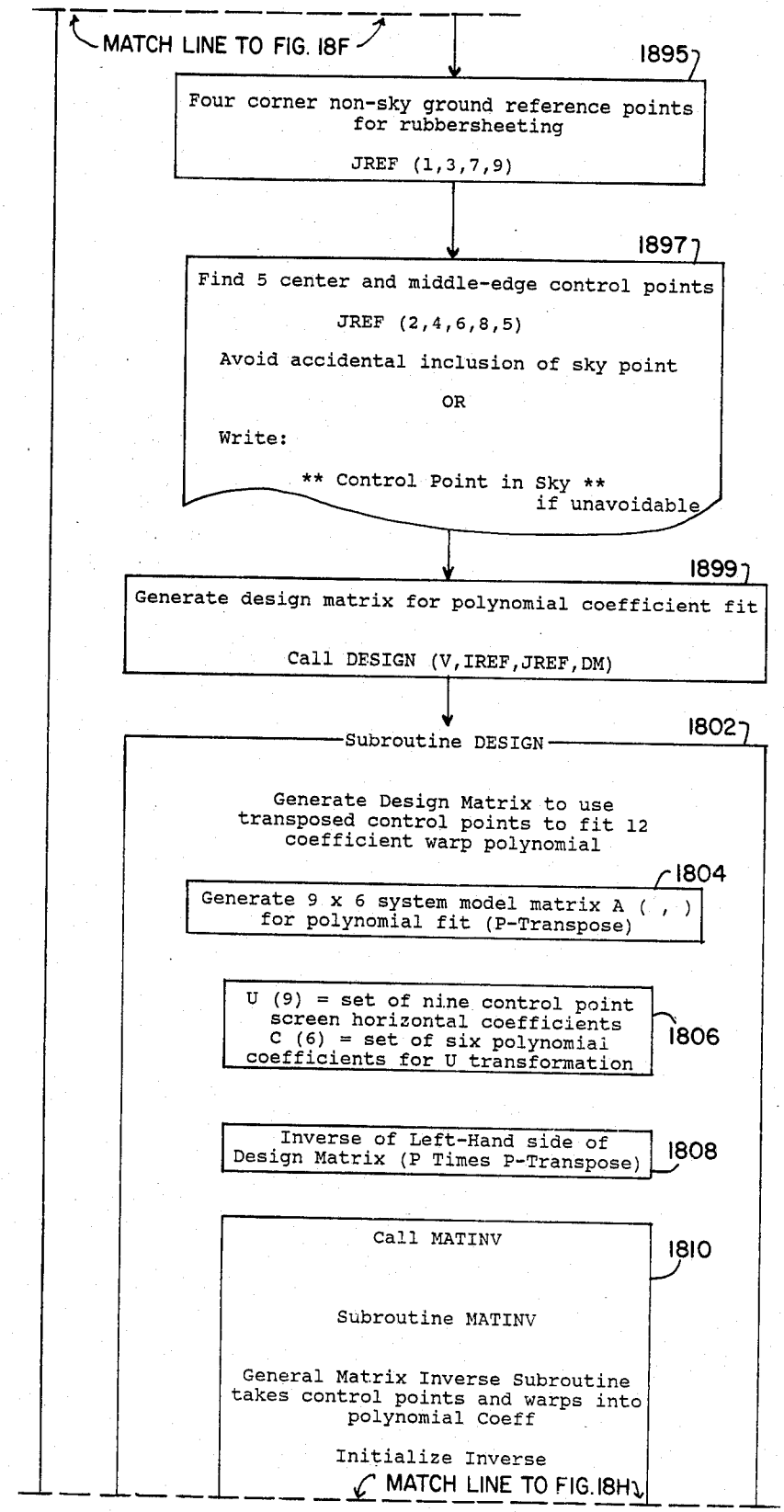
Figure 18H:
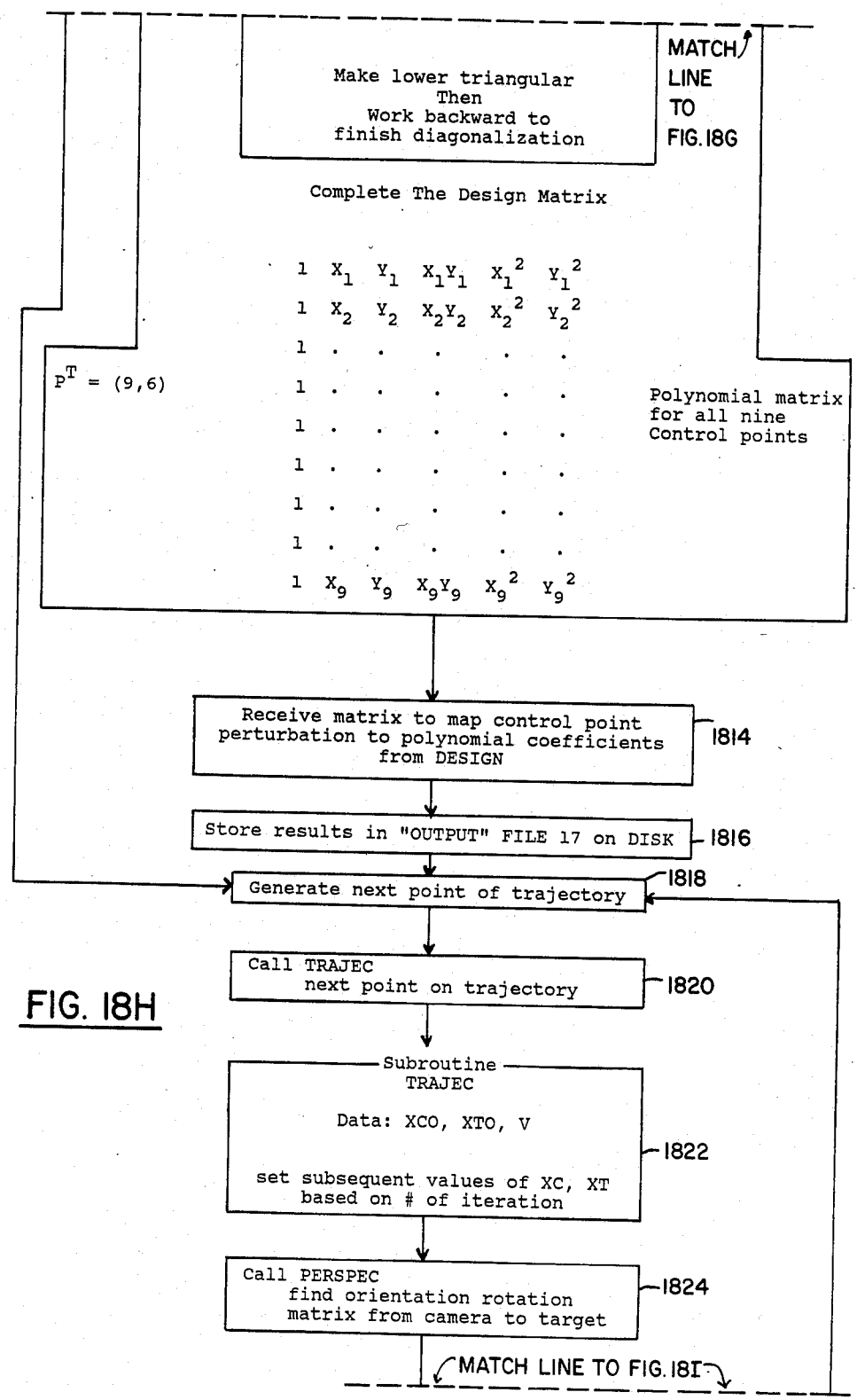
Figure 18I:
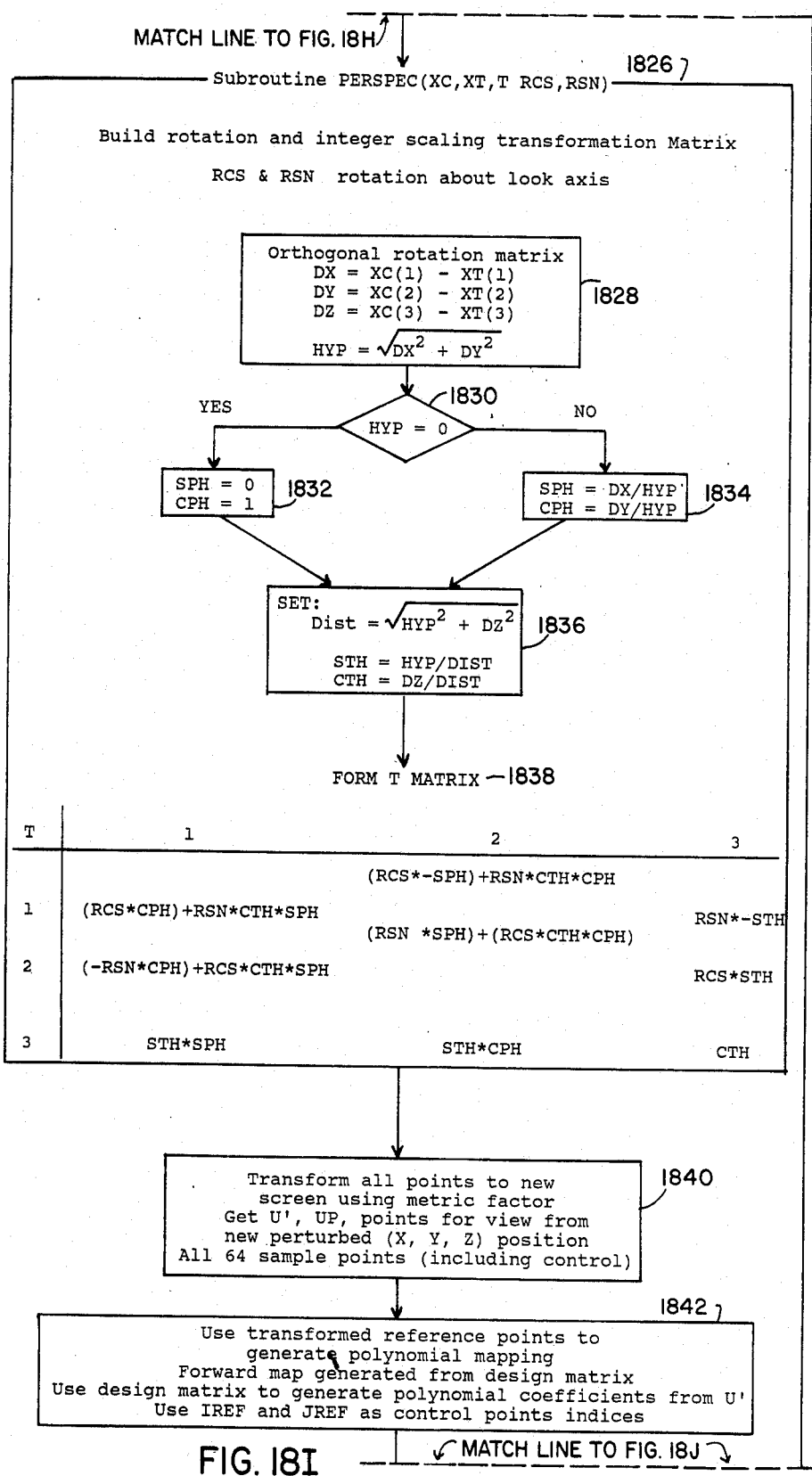
Figure 18J:
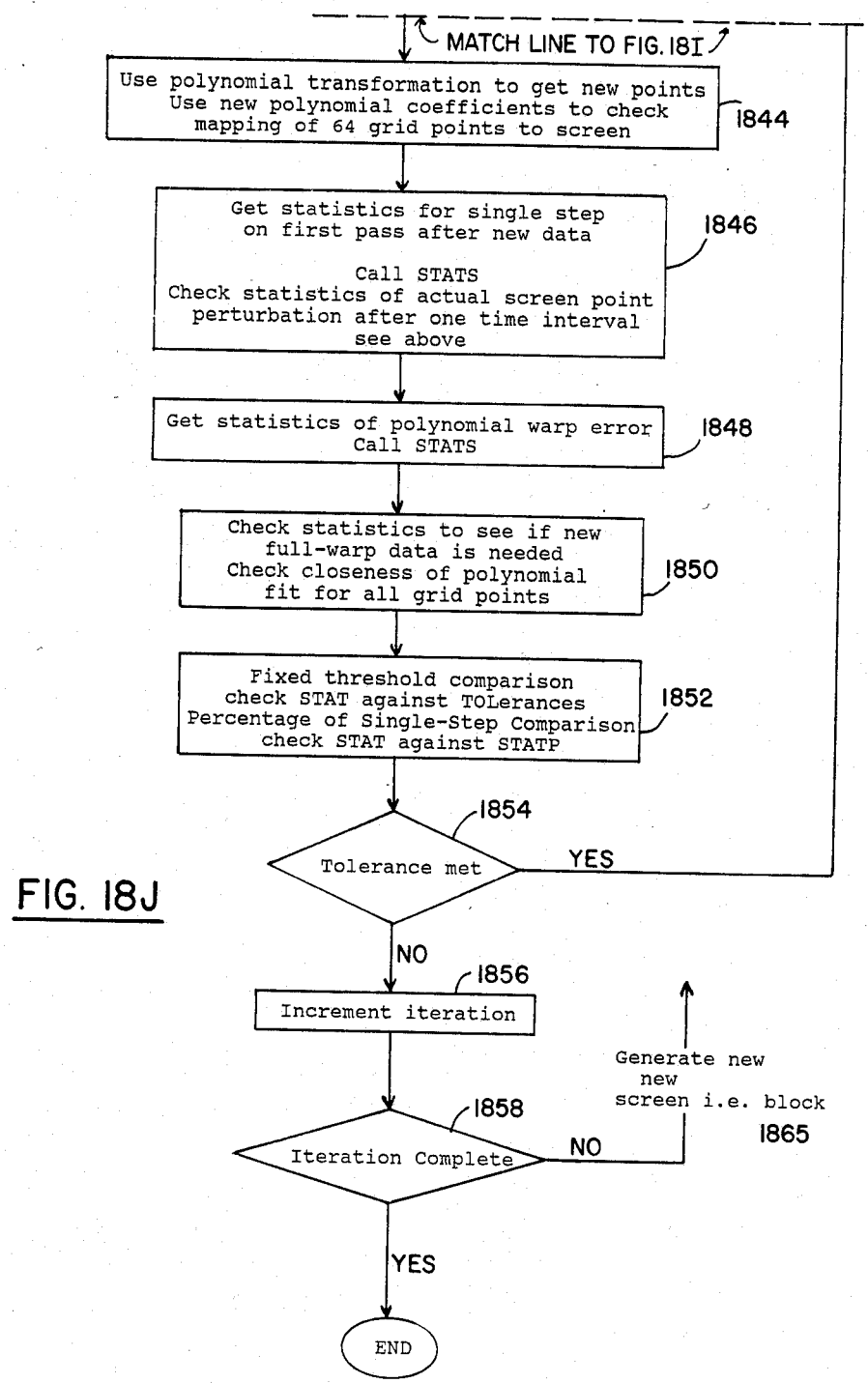
Figure 18K:
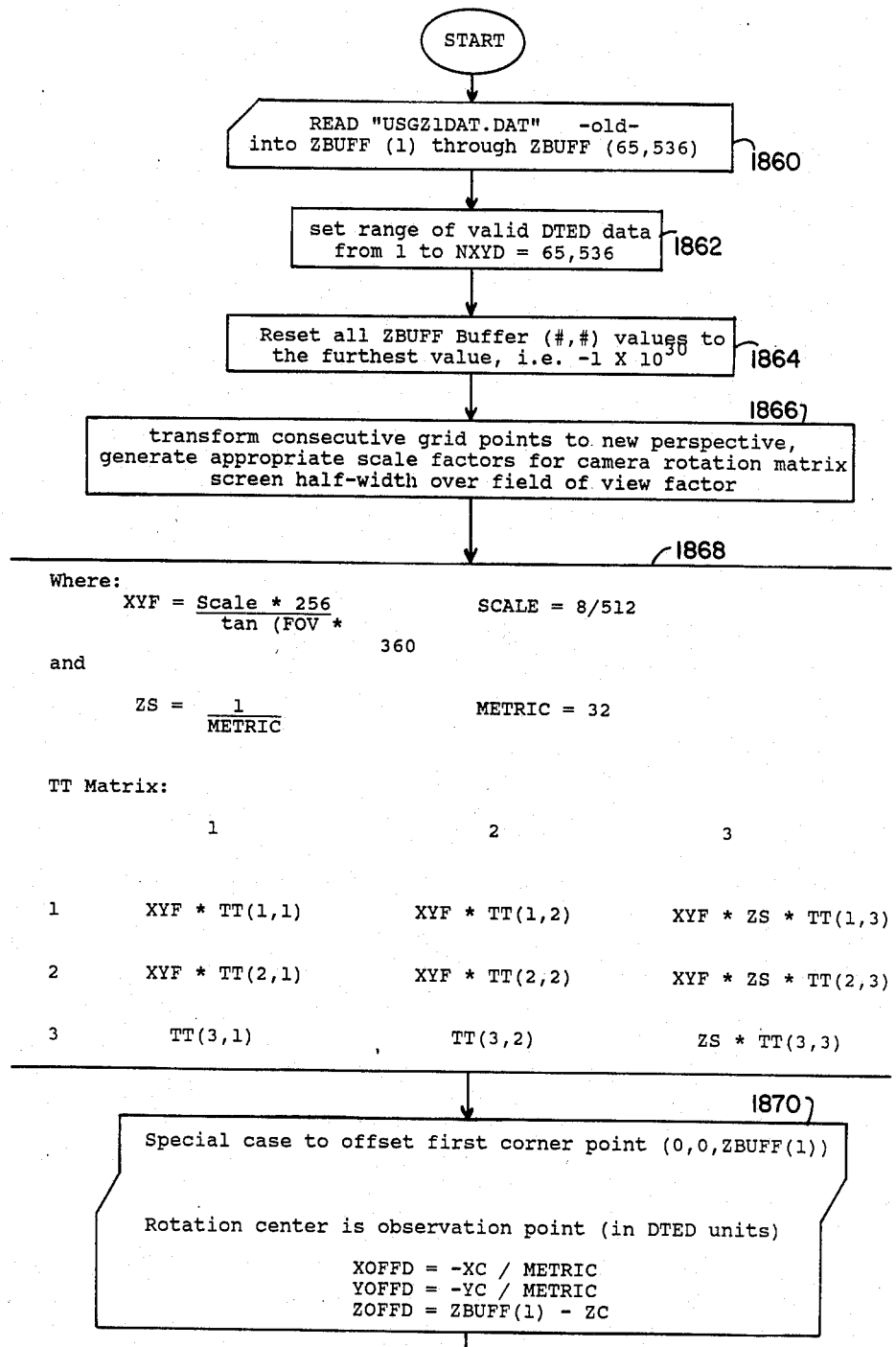
Figure 18L:
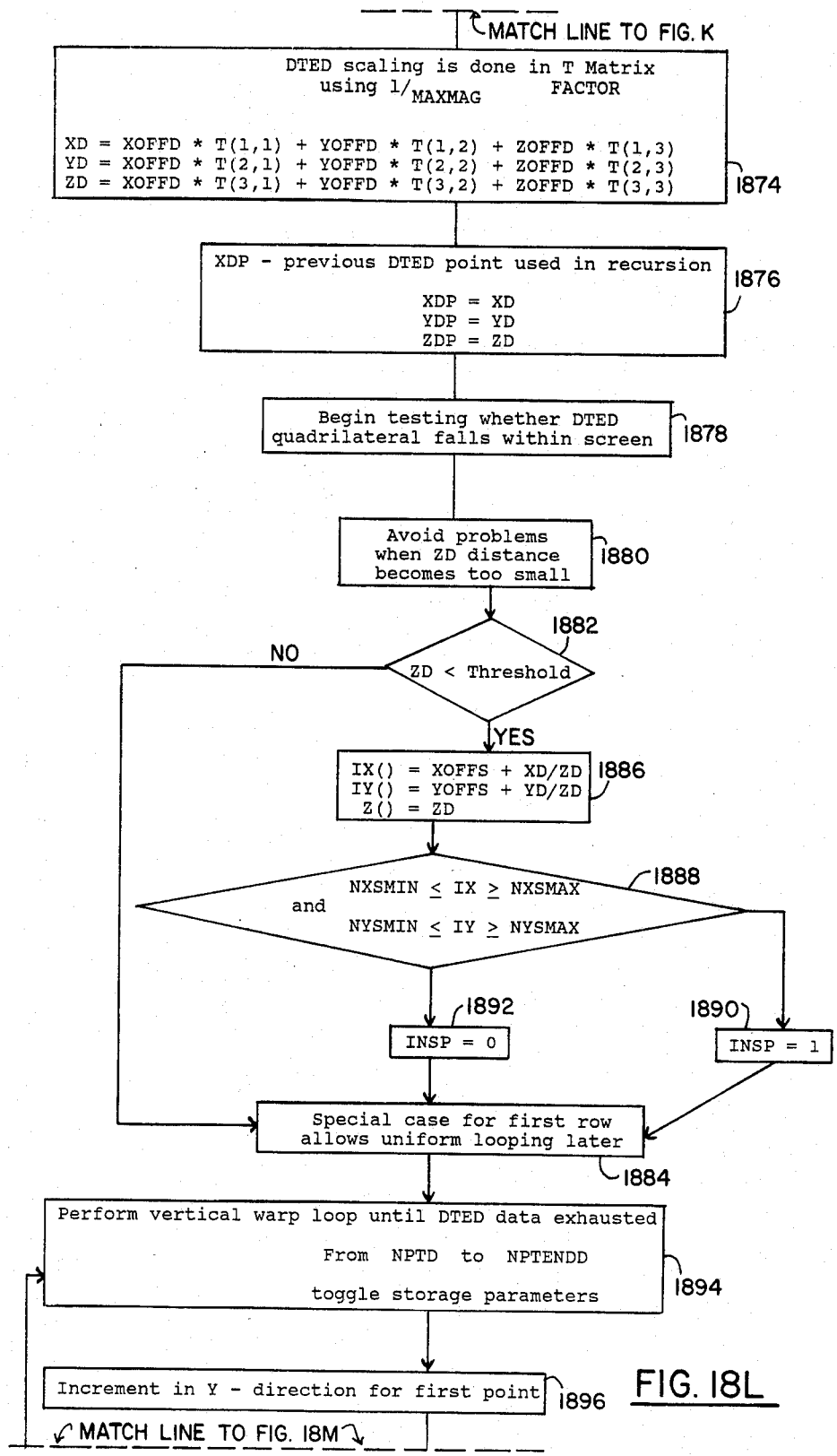
Figure 18M:
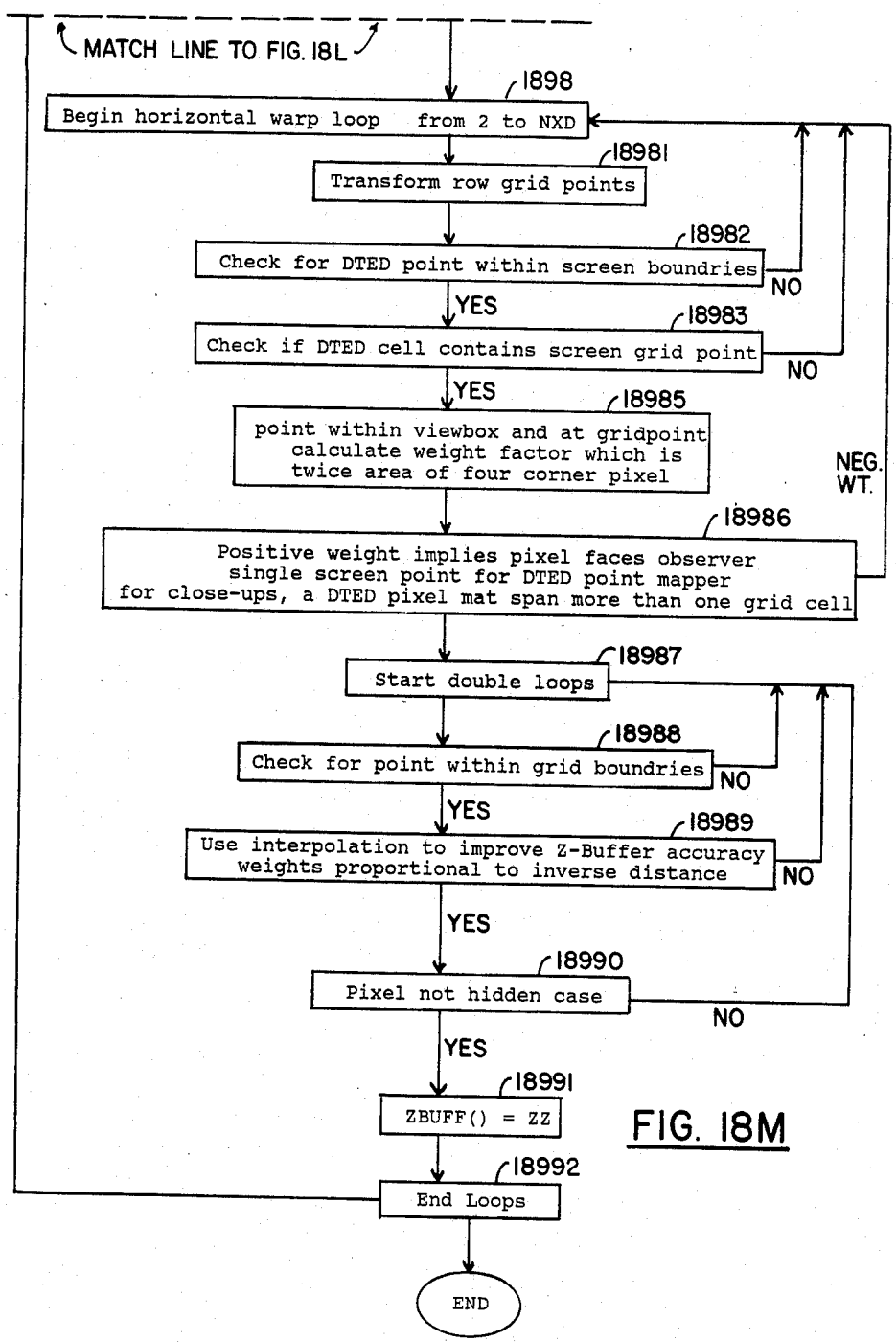

Next, FIG. 18L block 1874, DTED scaling is performed using the new T matrix and starting point offsets to get initial DTED points using the following equations:

$$XD = [XOFFD\ T(1,1)] + [YOFFD\ T(1,2)] + [ZOFFD\ T(1,3)]$$

$$YD = [XOFFD\ T(2,1)] + [YOFFD\ T(2,2)] + [ZOFFD\ T(2,3)]$$

$$ZD = [XOFFD\ T(3,1)] + [YOFFD\ T(3,2)] + [ZOFFD\ T(3,3)]$$

These initial DTED points are stored in variables XDP, YDP and ZDP for use later in recursion as the prior DTED point values for comparison, block 1876.

POLYDTED is now ready to begin testing, block 1878, to determine whether the DTED quadrilateral falls within the screen, therefore variable "INSP" is set to 0. "INSP" will be set equal to 1 later if ZD is detected to be less than the threshold −1 and resultant value changes are within output scene minimum and maximum boundaries.

In order to avoid problems when ZD distance is too small, block 1880, the value of ZD is compared to a minimum threshold, −1 in the example, block 1882. If ZD is less than the threshold value then the values of X(1), Y(1) and Z(1) are established according to the following equations, block 1886:

$$X(1) = 4.5 + XD/ZD$$

$$Y(1) = 4.5 + YD/ZD$$

$$Z(1) = ZD$$

The values for X(1) and Y(1) are then checked to determine if they fall within output scene minimum and maximum boundaries, block 1888. If they fall within the boundaries "INSP" is set equal to 1, block 1890, if not, "INSP" remains equal to 0, block 1892. Flow then proceeds on to block 1884.

Block 1884, comprising a small do loop, is also reached from block 1882 if ZD is not less than −1. In block 1884, the first or bottom row of the screen, which is the first 256 elements of data stored in "USGZ-1DAT.DAT" which have been read into the first 256 subscripted locations of ZBUFF, are utilized in to prepare the first row to allow uniform looping later. The counter "NPTD" which counts the new point of DTED data is set to the beginning, i.e. 1. A DO loop is then entered and run from 2 to 256. Before the DO loop begins the toggle counter ITOG is also set at 1.

Each time through the loop, "ITOG" is incremented by 2 and "NPTD" is incremented by 1 at the start of the loop. Therefore, "NPTD" is equal to 2 and "ITOG" is equal to 3 the first time through the loop. Each time through the loop the values for XD, YD and ZD are set by the following equations:

$$XD = XD + T(1,1) + T(1,3) \ ZBUFF \ (NPTD)$$

$$YD = YD + T(2,1) + T(2,3) \ ZBUFF \ (NPTD)$$

$$ZD = ZD + T(3,1) + T(3,3) \ ZBUFF \ (NPTD)$$

Initial values for XD, YD and ZD being supplied from above, block 1874, FIG. 18L.

"INS" is then set to 0 and then the new ZD is checked against the threshold −1. If ZD is less than −1, values for X(ITOG), Y(ITOG) and Z(ITOG) are set by the following equations:

$$X(ITOG) = 4.5 + XD/ZD$$

$$Y(ITOG) = 4.5 + YD/ZD$$

$$Z(ITOG) = ZD$$

The values for X(ITOG) and Y(ITOG) are checked to determine if they lie within screen boundaries, if they do "INS" is set equal to 1, if not "INS" is equal to 0. Then subscripted variable INSIDE (NPTD) is set equal to the sum of INS and "INSP" from above, either block 1890 or 1892. For the next run through the loop "INSP" is set equal to "INS" from the present loop to indicate whether the last data fell within screen boundaries. This small DO loop, block 1884, runs through setting X(ITOG), Y(ITOG) and Z(ITOG) values for ITOG=3 to 512 in increments of two for data from ZBUFF(2) through ZBUF(256) and thereby the first row is processed to allow uniform looping later, block 1884.

Next, block 1894, a vertical warp loop is performed from the 257th bit of data in ZBUFF to the 65,536th bit of data in ZBUFF or, in other words, the data starting after the first row and running until ZBUFF is exhausted (pixel rows 2–256), this is done by a DO loop entered in block 1894 and running to the end of subroutin POLYDTED. At the beginning of each run through the loop NPTD is indexed by adding 1 and the storage parameters are toggled in the following manner:

if ITOG=512, then ITOG=1 and JTOG=2 if ITOG≠512, then ITOG=2 and JTOG=1

The first time into the loop ITOG will equal 512 being set in the preceeding loop, block 1884.

Next the loop increments in the Y direction for the first point of each row, block 1896, by the following equations:

$$XD = XDP + T(1,2) + T(1,3) \ ZBUFF \ (NPTD)$$

$$YD = YDP + T(2,2) + T(2,3) \ ZBUFF \ (NPTD)$$

$$ZD = ZDP + T(3,2) + T(3,3) \ ZBUFF \ (NPTD)$$

remembering that values for XDP, YDP and ZDP were stored previously, block 1876, based on the values of the first element of the row below. These new values for XD, YD and ZD are also stored as XDP, YDP and ZDP for use the next time through the loop beginning in block 1894.

INSP is then set equal to 0 and the value of ZD is checked against the lower threshold of −1 and if ZD is less than −1, values are set according to the following formulas:

$$X(ITOG) = XOFFS + XD/ZD$$

$$Z(ITOG) = YOFFS + YD/ZD$$

$$Z(ITOG) = ZD$$

And, if the values for X(ITOG) and Y(ITOG) are within screen boundaries, "INSP" is set equal to 1.

Next, block 1898, an inner loop is entered which runs through all of the data points (256) for the row being warped before returning to the beginning of the outer loop begun in block 1894. This time through this inner loop will run for data ZBUFF(258) through ZBUFF(512); next time through the outer loop this inner loop will run data ZBUFF(513) through ZBUFF(768) and so on, row by row up to ZBUFF(65,536).

The inner loop first indexes NPTD by adding 1 and resets toggles by the following equations:

ITOGP=ITOG

ITOGP=JTOG

ITOG=ITOG+2

JTOG=JTOG+2 and transforms row grid points, block 18981, by the following equations:

$$XD = XD + T(1,1) + T(1,3) \, ZBUFF \, (NPTD)$$

$$YD = YD + T(2,1) + T(2,3) \, ZBUFF \, (NPTD)$$

$$ZD = ZD + T(3,1) + T(3,3) \, ZBUFF \, (NPTD)$$

"INS" is then set equal to 0 and the value of ZD is tested against the threshold −1 and if ZD is less than −1, the following equations are performed:

$$X(ITOG) = XOFFS + XD/ZD$$

$$Y(ITOG) = YOFFS + YD/ZD$$

$$Z(ITOG) = ZOFFS + ZD$$

and X(ITOG) and Y(ITOG) values are checked to see if they fall within scene boundaries, and if so "INS" is set equal to 1.

The insert numbers are then updated by the following series of equations performed in the order listed:

$$INSTEST = INS + INSP$$

$$INSP = INS$$

$INS = INSTEST + INSIDE$ (column #) from row below $$INSIDE \, (column \, \#) = INSTEST$$

In this manner INSTEST is set by whether the previous element of the row and the present element fall within scene boundaries. The previous value for INS, (i.e. INSP), is updated to the current INS value and then the current value is modified to reflect the value of the element in the same column of the previous row. "INSIDE" is then updated to the INS value of the current row for use as the previous value during the next row processing of the element in that column.

Next, block 18982, POLYDTED checks to determine if the DTED cell being processed lies within the screen boundaries by checking to see if "INS" is greater than 0 and if ZD is less than −1. If both of these conditions are satisfied, the DTED cell falls within the screen boundaries. If either one of the above conditions is not met then the DTED cell does not fall within the screen and flow is directed back to the start of the inner loop, block 1898, to process the next cell along the row.

Next in block 18983, the following equations are run to establish values for a check:

$$MINXS = AMIN1[X(ITOG), X(ITOGP), X(JTOG), X(JTOGP)] - 0.001$$

$$MZXXS = AMAX1[X(ITOG), X(ITOGP), X(JTOG), X(JTOGP)] + 0.001$$

$$MINYS = AMIN1[Y(ITOG), Y(ITOGP), Y(JTOG), Y(JTOGP)] - 0.001$$

$$MAXYS = AMAX1[Y(ITOG), Y(ITOGP), Y(JTOG), Y(JTOGP)] + 0.001$$

The check is performed, as follows, to determine if the DTED cell contains a screen grid point. If not, flow is back to the start of the inner loop, block 1898. The checks compare MINXS to MAXXS and MINYS to MAXYS. If MINXS is not equal to MAXXS and MINYS is not equal to MAXYS, then the cell checks out and the weight factor, twice area of four corner pixel, must be calculated, block 18985.

The following equations are used to calculate the weight factor, i.e. shades of grey, block 18985, the point being manipulated ZBUFF(NPTD), the point to its immediate left ZBUFF(NPTD-1), the point below it ZBUFF(NPTD-256) and the point diagonally to its left and below ZBUFF(NPTD-257) are utilized to shade the DTED cell, where WW is the shade weight value.

$$WX1 = X(ITOG) - X(JTOGP)$$

$$XY1 = Y(ITOG) - Y(JTOGP)$$

$$WX2 = X(ITOGP) - X(JTOG)$$

$$WX2 = Y(ITOGP) - Y(JTOG)$$

$$WW = [(WX1)(WY2)] - [(WY1)(WX2)]$$

If WW is greater than 0, then this positive weight implies that the pixel faces the observer, block 18986. If WW is equal to or less than 0, flow returns to block 1898. A single screen point is then used as a DTED point mapper. For close-ups, a DTED pixel may span more than one grid cell.

Two loops are set up to fill the ZIN(8,8) matrix from the weighted DTED cells, block 18987 through 18992. The outer DO loop runs from MINYS +1 to MAXYS and its counter is "JJ". The inner DO loop runs from MINXS +1 to MAXXS and its counter is "II".

The outer loop is entered and then the inner loop is immediately entered. Once in the inner loop the values of "II" and "JJ" are checked to see if the point to be mapped is within the grid boundaries, block 18988. "II" must lie between NXSMIN and NXSMAX (i.e. 1 to 8) and "JJ" must lie between NYSMIN and NYSMAX (i.e. 1 to 8) or else flow returns to the inner loop beginning and the next cell is sought.

If II and JJ satisfy the tests, then interpolation is used to improve accuracy where weights are inversely proportional to distance, block 18989. The following equations are used to achieve this:

$$D00 = 1/\sqrt{[X(JTOGP) - "II"]^2 + [Y(JTOGP) - "JJ"]^2}$$

$$D10 = 1/\sqrt{[X(JTOG) - "II"]^2 + [Y(JTOG) - "JJ"]^2}$$

$$D01 = 1/\sqrt{[X(ITOG) - "II"]^2 + [Y(ITOG) - "JJ"]^2}$$

$$D11 = 1/\sqrt{[X(ITOG) - "II"]^2 + [Y(ITOG) - "JJ"]^2}$$

$$ZZ = \frac{(D00)Z(JTOGP) + (D10)Z(JTOG) + (D01)2(ITOGP) + (D11)Z(ITOG)}{D00 + D10 + D01 + D11}$$

$$TEST = ZZ - ZIN(II,JJ)$$

Next, block 18990, TEST is checked against a threshold value −3, if TEST is greater than −3 the pixel is not a hidden case, see FIG. 3, and the value of ZZ is written to subscripted variable location ZIN(II,JJ). If TEST is not greater than −3, flow returns to the beginning of the inner loop for the DTED cell to be tested.

Once the locations of the ZIN(8,8) matrix have been filled, block 18991 and the loop completed 18992, flow is directed to block 1894 for processing of the next row.

Once all rows have been processed, control is returned to subroutine GETDTED FIG. 18F GETDTED in block 1892 stores the 64 input scene reference position ZIN(8,8) and regenerates original (X, Y, Z) coordinates in orthosystem with camera position origin. First screen addresses of the 8×8 grid are generated as if on a 512×512 pixel scene (the "1BASE32-.DAT" pixel data base) by filling the U(2,8,8) matrix in the following loops. JJ is set to −224, then the first or outer loop is entered and run for J=1-8. The first step of the outer loop sets II to −284, then the inner loop is started where I runs from 1-8.

The inner loop sets the values for the U(2,8,8) matrix by the following equations setting 2 values each time through:

$$U(1, I, J) = II$$

$$U(2, I, J) = JJ$$

II is incremented by 64 at the end of the inner loop and JJ is incremented by 64 at the end of the outer loop so that the values for U(2,8,8) become:

$$U(1,8,8) = \begin{pmatrix} -224 & -160 & -96 & -32 & +32 & +96 & +160 & +224 \\ -224 & -160 & -96 & -32 & +32 & +96 & +160 & +224 \\ -224 & -160 & -96 & -32 & +32 & +96 & +160 & +224 \\ -224 & -160 & -96 & -32 & +32 & +96 & +160 & +224 \\ -224 & -160 & -96 & -32 & +32 & +96 & +160 & +224 \\ -224 & -160 & -96 & -32 & +32 & +96 & +160 & +224 \\ -224 & -160 & -96 & -32 & +32 & +96 & +160 & +224 \\ -224 & -160 & -96 & -32 & +32 & +96 & +160 & +224 \end{pmatrix}$$

$$U(2,8,8) = \begin{pmatrix} -224 & -224 & -224 & -224 & -224 & -224 & -224 & -224 \\ -160 & -160 & -160 & -160 & -160 & -160 & -160 & -160 \\ -96 & -96 & -96 & -96 & -96 & -96 & -96 & -96 \\ -32 & -32 & -32 & -32 & -32 & -32 & -32 & -32 \\ +32 & +32 & +32 & +32 & +32 & +32 & +32 & +32 \\ +96 & +96 & +96 & +96 & +96 & +96 & +96 & +96 \\ +160 & +160 & +160 & +160 & +160 & +160 & +160 & +160 \\ +224 & +224 & +224 & +224 & +224 & +224 & +224 & +224 \end{pmatrix}$$

The inner loop described above also contains the following equations which determine X, Y, Z from screen U, V and Z:

$$ZZ = ZIN(I,J)$$

$$XX = (II)(XYF)(ZZ)$$

$$YY = (JJ)(XYF)(ZZ)$$

where $$XYF = TAN(FOV \times /360)/256$$

The value of subscripted variable ZIN(I,J) is checked each time through the inner loop to determine if it is greater than −8000 and if so it is rotated back to orthogonal coordinates by the following equation performed in a DO loop where K runs from 1 to 3:

$$X(K,I,J) = (XX) T(1,K) + (YY) T(2,K) + (ZZ) T(3,K)$$

This generates the X(3,8,8) matrix. The value −8000 is taken as the infinity value in this exemplary embodiment.

GETDTED then returns to COEFGEN bringing with it ZIN(8,), X(3,8,8), U(2,8,8) and "XYF". Then control points are selected for warp polynomial generation, block 1893, as follows:

IREF (1-9) = 1, 4, 8, 1, 5, 8, 1, 4, 8.

Next, block 1895, four corner ground (non-sky) reference points for rubbersheeting are found as follows:

JREF(1)=8, JREF(3)=8, JREF(7)=1, JREF(9)=1.

Then, a loop is entered for J=1-8, where the JREF( ) values are modified under the following conditions:

If JREF(1)=8 and ZIN(1,J)>−8000, then JREF(1)=J
If XIN(1,J)=8 and ZIN(N,J)>−8000, then JREF(3)=J
If ZIN(1,J)>−8000, then JREF(7)=J
If ZIN(N,J)>−8000, then JREF(9)=J Next, block 1897, JREF(2,4,5,6,8) values for center JREF(5) and middle of edges control points are found by the following:

JREF(2)=JREF(1)

if ZIN (IREF(2), JREF(2))<−8000, then JREF(2)=-JREF(2)+1

JREF(8)=JREF(7)
if ZIN (IREF(8)), JREF(8))<−8000, then JREF(8))=JREF(8))−1

JREF(4)=[JREF(1)+JREF(7)+1]/2 if ZIN (IREF(4), JREF(4))<−8000, then IREF(4)=IREF(4)+1

JREF(5)=[JREF(4)+JREF(6)+1]/2 if ZIN (IREF(6), JREF(6))<−8000, then Write "Center Control Point in Sky"

JREF(6)=[JREF(3)+JREF(9)+1]/2 if ZIN(IREF(6), JREF(6))<−8000, then IREF(6)=IREF(6)−1

Next, each control point is checked to determine if any sky point has been accidently included as a control point by running through a loop where I=1-9. The following equation is the whole loop:

If ZIN (IREF(I), JREF(I)<−8000, then Write to screen "-Control Point in Sky-"

Now, the control point matrix IREF(9) has been filled with JREF(1,3,7,9) as the four corners, JREF(5) in the middle and JREF(2,4,6,8) as the midpoints of the sides 1-3, 1-7, 3-9 and 7-9, respectively.

Next, by calling subroutine DESIGN, block 1899, the design matrix, DM(6,9), for the polynomial coefficient fit is generated. DESIGN, block 1802, utilizes the U matrix from GETDTED, the IREF( ) and JREF( ) variables just filled and returns to the DM(6,9) matrix which will be used on transformed control points to fit 12 coefficient warp polynomials.

First, block 1804, a system model matrix A(9,6) for polynomial fit P-transpose, is filled for J=1-9 by the following equations:

$$A(J,1) = 1$$

$$A(J,2) = X(1, IREF(J), JREF(J))$$

$$A(J,3) = X(2, IREF(J), JREF(J))$$

$$A(J,4) = X(1, IREF(J), JREF(J)) \, X(2, IREF(J), JREF(J))$$

$$A(J,5) = X(1, IREF(J), JREF(J))^2$$

$$A(J,6) = X(2, IREF(J), JREF(J))^2$$

What is generated is the P-transpose $P^T(9,6)$ matrix:

$$\begin{pmatrix} 1 & X_1 & Y_1 & X_1Y_1 & X_1^2 & Y_1^2 \\ 1 & X_2 & Y_2 & X_2Y_2 & X_2^2 & Y_2^2 \\ 1 & X_3 & Y_3 & X_3Y_3 & X_3^2 & Y_3^2 \\ 1 & X_4 & Y_4 & X_4Y_4 & X_4^2 & Y_4^2 \\ 1 & X_5 & Y_5 & X_5Y_5 & X_5^2 & Y_5^2 \\ 1 & X_6 & Y_6 & X_6Y_6 & X_6^2 & Y_6^2 \\ 1 & X_7 & Y_7 & X_7Y_7 & X_7^2 & Y_7^2 \\ 1 & X_8 & Y_8 & X_8Y_8 & X_8^2 & Y_8^2 \\ 1 & X_9 & Y_9 & X_9Y_9 & X_9^2 & Y_9^2 \end{pmatrix}$$

Then C(6) is found, block 1806, utilizing the following equations:

$$U(9) = P^T(9,6) \, C(6)$$

where U(9) is from GETDTED, therefore we solve to find C(6). The $P^T$ matrix is first multiplied by P, and then inverted by MATINV, block 1810, to form P(6,9) matrix and then the following equations are solved to find the design matrix DM(6,9):

first multiplying;

$$U(9) = P^T(9,6) \, C(6)$$

by P, block 1808, to get:

$$P(6,9) \, U(9) = P(6,9) \, P^T(9,6) C(6).$$

Dividing both sides by P(6,9) $P^T(9,6)$:

$$[P(6,9)P^T(9,6)]^{-1} \, P(6,9)U(9) = C(6).$$

Substiting DM:

$$DM(6,9) \, U(9) = C(6)$$

is obtained, thus providing the parameters necessary to solve for DM(6,9).

Using similar equations and substituting V for U and B for C, the following equation is solved:

$$DM(6,9) \, V(9) = B(6)$$

in order to get U(9).

These equations are solved and the design DM(6,9) matrix finalized by a series of DO loops both in DESIGN and subroutine MATINV.

Next, block 1814, the DM matrix is received by COEFGEN. If the value of "MODEP" set in PFILE, block 1819, is not equal to 0, then the following information is written to VAX file SYS$OUTPUT, block 1816.

The first time through the inner loop, begun at block 1865 when the value of ITER=1, the values for NUMITER, NF, METRIC and XYF are written to the first positions of SYS$OUTPUT. Each time thereafter regardless of the value of ITER and during the first time through, the values for XC, XT, DM, X(1, IREF(1), JREF(1)), X(1, IREF(1), JREF(1), X(2, IREF(1), JREF(1), X(3, IREF(1), JREF(1)), X(1, IREF(2), JREF(2)), X(2, IREF(2), JREF(2)), X(3, IREF(2), JREF(2)), X(1, IREF(3), JREF(3)), X(2, IREF(3), JREF(3)), X(3, IREF(3), JREF(3)) are stored in the order shown.

Then subroutine COEFGEN moves on to block 1818 to generate the next point of the trajectory. First "NUM" is incremented by adding 1 and "ITER" is incremented by adding 1 then, block 1820, subroutine TRAJEC is called.

Subroutine TRAJEC, block 1822, works the same as described earlier, block 1859, to set the present values of XC, XT based on the number of the iteration "ITER".

Next subroutine PERSPEC, block 1826, is called, block 1824, to find the orientation rotation matrix T(3,3). First, block 1828, values are determined for DX, DY and DZ from the camera and target positions by the following equations:

$$DX = XC(1) - XT(1)$$

$$DY = XC(2) - XT(2)$$

$$DZ = XC(3) - XT(3)$$

$$HYP = \sqrt{DX^2 + DY^2}$$

Then the value of "HYP" is checked to see if it is equal to 0, block 1830. If "HYP" equals 0, then SPH and CPH equal 0, block 1832, if not, then SPH=DX/HYP, CPH=DYH, block 1834.

Next, block 1836, "DIST" is set equal to $\sqrt{HYP^2 + DZ^2}$, STH is set equal to HYP/DIST and CTH is set equal to DZ/DIST. Then the T(3,3) matrix is filled in the manner shown in block 1838.

The T(3,3) matrix is then returned to COEFGEN so that all points may be transformed to the new screen display using a metric factor, block 1840, by the following equations:

$$DXX = [XC(1) - XOC(1)]/32$$

$$DYY = [XC(2) - XOC(2)]/32$$

$$DZZ = [XC(3) - XOC(3)]/32$$

where "XC" is from TRAJEC block 1820 and "XOC" is the previous XC from TRAJEC, block 1859, stored as the origin "XOC" in block 1881.

Also, the UP(2,8,8) matrix (i.e. U view from new perturbed X, Y, Z position) is found using the following equations solved while processing an inner loop where I = 1-8. The inner loop is contained in an outer loop where J = 1-8 and values are stored only for inner loops where the value of ZIN(I,J) > −8000:

$$XX = X(1, I, J)$$

$$YY = X(2, I, J)$$

$$ZZ = X(3, I, J)$$

$$SCALE = 1/[XYF\ (T(3,1)\ XX + T(3,2)\ YY + T(3,3)\ ZZ)]$$

$$UP(1,I,J) = SCALE\ (T(1,1)\ XX + T(1,2)\ YY + T(1,3)\ ZZ)$$

$$UP(2,I,J) = SCALE\ (T(2,1)\ XX + T(2,2)\ YY + T(2,3)\ ZZ)$$

After the UP(2,8,8) matrix is filled then the transformed reference points are used to generate a forward mapping from the design matrix DM, block 1842. The following equations solved for I = 1-6 are utilized:

$$IP6 = I + 6$$

$$P(I) = 0$$

$$P(IP6) = 0$$

then for J = 1-9

$$P(I) = P(I) + DM(I,J)UP(1,IREF(J),JREF(J))$$

$$P(IP6) = P(IP6) + DM(I,J)UP(2,IREF(J),IREF(J))$$

Next, in block 1844, we use a polynomial transformation to get new UPP points, these points are used later to check mapping of the 64 grid points to the TEK screen. An outer loop where J = 1-8 and an inner loop where I = 1-8 are set up. The following equations are solved in the inner loop when the initial condition for the inner loop is satisfied for the present values of I and J, the test for intial conditions is:

If ZIN(I,J) > −8000, then the following equations are solved:

$$X1 = U(1,I,J)$$

$$Y1 = U(2,I,J)$$

$$XY1 = (X1)(Y1)$$

$$X2 = (X1)(X1)$$

$$Y2 = (Y1)(Y1)$$

$$UPP\ (1,I,J) = P(1) + P(2)X1 + P(3)\ Y1 + P(4)\ XY1 + P(5)\ X2 + P(6)\ Y2$$

$$UPP\ (2,I,J) = P(7) + P(8)\ X1 + P(9)\ Y1 + P(10)\ XY1 + P(11)\ X2 + P(12)\ Y2$$

Next, in block 1846, the statistics for a single step are obtained by calling subroutine STATS only if NEWGETP = 1 so that this block 1846 is only performed for the first pass after new data.

Subroutine STATS uses a series of DO loops to obtain values for the average "AVG" of the differences between corresponding U and UP points, the standard deviation "STDEV" from the "AVG", the absolute average "ABSAVG" and the maximum difference "DMAX" by the following:

For all values of J and K between 1 and 8 where: ZIN(J,K) > −8000 and −255 < UP(1,J,K) ≦ 255 and −255 ≦ UP(2,J,K) ≦ 256; 1 is added to the total of KOUNT and the value of UP(1,J,K) − U(1,J,K) is added to "SUM", and the value of [UP(1,J,K) − U(1,J,K)]$^2$ is added to SUMSQ, and the absolute value of [UP(1,J,K) − U(1,J,K)] is added to ABSSUM. "KOUNT" will total the number of points used. DMAX is set to the largest of the absolute values of [UP(1,J,K) − U(1,J,K)].

The following equations are used to find AVG, STDEV and ABSAVG:

$$AVG = SUM/KOUNT$$

$$STDEV = [SUMSQ − AVG(SUM)]/(KOUNT − 1)$$

$$ABSAVG = ABSSUM/KOUNT$$

These values are stored in the subscripted variable STAT(4,2) in the following manner:
for U(1,8,8) UP(1,8,8)

$$STAT(1,1) = AVG$$

$$STAT(2,1) = STDEV$$

$$STAT(3,1) = ABSAVG$$

$$STAT(4,1) = DMAX$$

The same process is used for U(2,8,)UP(2,8,8) and the values are stored as follows:

$$STAT(1,2) = AVG$$

$$STAT(2,2) = STDEV$$

$$STAT(3,2) = ABSAVG$$

$$STAT(4,2) = DMAX$$

The flow is then returned to COEFGEN, block 1848, to get the statistics of the polynomial warp error.

For block 1848 subroutine STATS is called again and operates in the same manner as above. The initial value check is still made with the UP matrix values between −255 and +255. However, the calculations to determine AVG, STDEV, ABSAVG and DMAX use UP(2,8,8) instead of U(2,8,8) and UPP(2,8,8) instead of UP(2,8,8) and the matrix formed is STATP(4,2) not STAT(4,2).

Next, the statistics are checked against the TOL(3,2) values stored to see if new full warp data is needed, block 1850. The polynomial fit of the grid points is checked for closeness of fit.

The values for fixed threshold comparison are checked, block 1852, by the following equation for values of I = 1-3, J = 1-2:

If STAT(I+1, 1) > TOL(I,J)
or
If STAT(I+1, 2) > TOL(I,J)
then NEWGET = 1

If STAT(I+1, 1) > (0.01) TOL(I,J) STATP(I+1, 1)
or
If STAT(I+1, 2) > (0.01) TOL(I,J) STATP(I+1, 2)
then NEWGET = 1

In this manner, if any of the previously set tolerances are not met, NEWGET will be set equal to 1.

At this point COEFGEN checks to see if all tolerances are met, block 1854, and, if so, flow is directed to block 1818 in order to generate the next point of the trajectory. If any one of the tolerances is not met, and therefore NEWGET now equals 1, the main loop counter is incremented by 1, block 1856 and this iteration number is checked against the final iteration value, block 1858, and if further iterations are called for, and flow is directed to block 1865 FIG. 18E to output warp failure statistics and generate a new scene.

The program has been at decision block 1865 before but at that time iteration was equal to 1 and so flow jumped to block 1879 FIG. 18F because there were no statistics to display. This time the iteration number is greater than 1 and therefore statistics will be displayed, block 1867.

First, subroutine STATS is called, block 1869, and as before calculates the values for AVG, STDEV, ABSAVG, DMAX for current matrix U versus mttrix UP and is stored in STATF(2,8,8).

Then, block 1871, subroutine OUT is called to display these statistics generated in STATS. First the camera position and target position are written, blocks and 1875, to the TEK screen as:

Current Camera Position: XC(1) XC(2) XC(3)
Current Target Position: XT(1) XT(2) XT(3)

Then, block 1877, the number of loops and the number of points on the current loop are output:

loops; # points

Also in block 1877, the statistics generated in STATS are displayed in the following format:

Standard Deviation x:STAT(2,1) y:STAT(2,2)
 x:STATF(2,1) y:STATF(2,2)
Worst case Offset x:STAT(4,1) y:STAT(4,2)
 x:STATF(4,1) y:STATF(4,2)

Flow then proceeds to block 1879 and continues from there as described earlier until the number of iterations entered in block 1855 have been completed. At this time the VAX SYS$OUTPUT file is full of all data to be generated.

The non-real time part of the control parameter program has now been completed. The VAX memory has stored therein the full warp scenes (12 in all in the system described thus far), SCENGEN a non-real time program which generates full-warp pixel scenes, the camera model, the DTED data base, the pixel data base and the polynomial coefficients.

SCENGEN

Figure 19A:
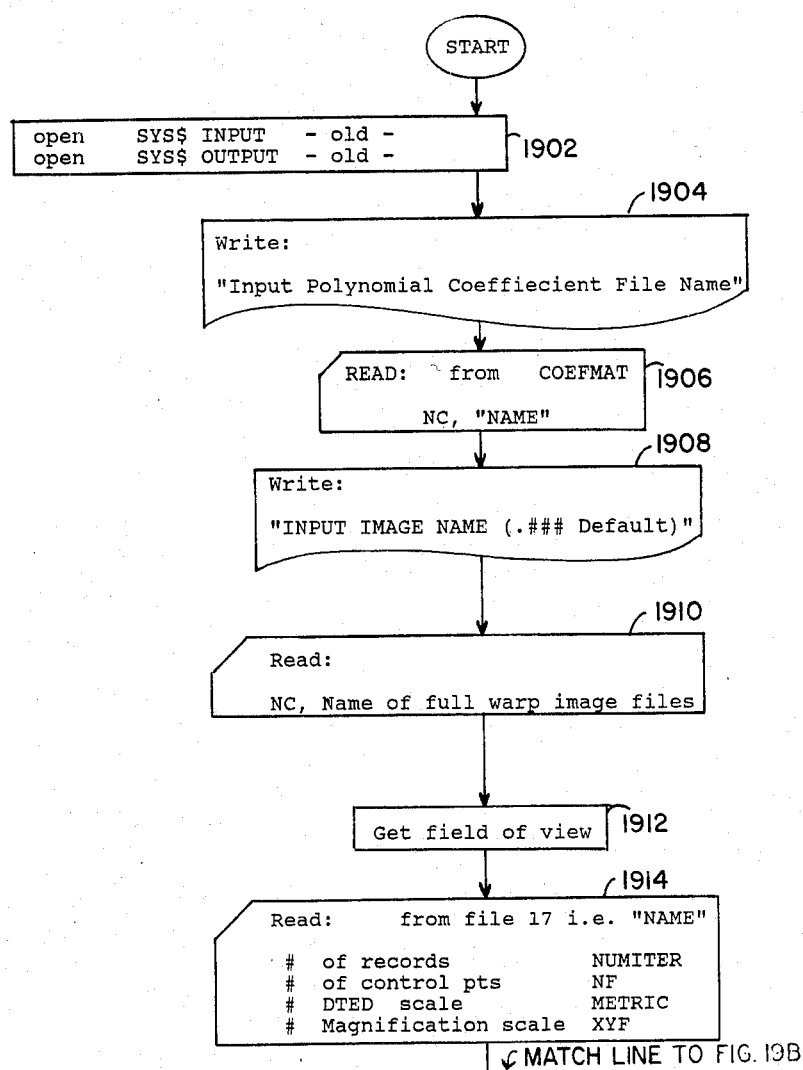
Figure 19C:
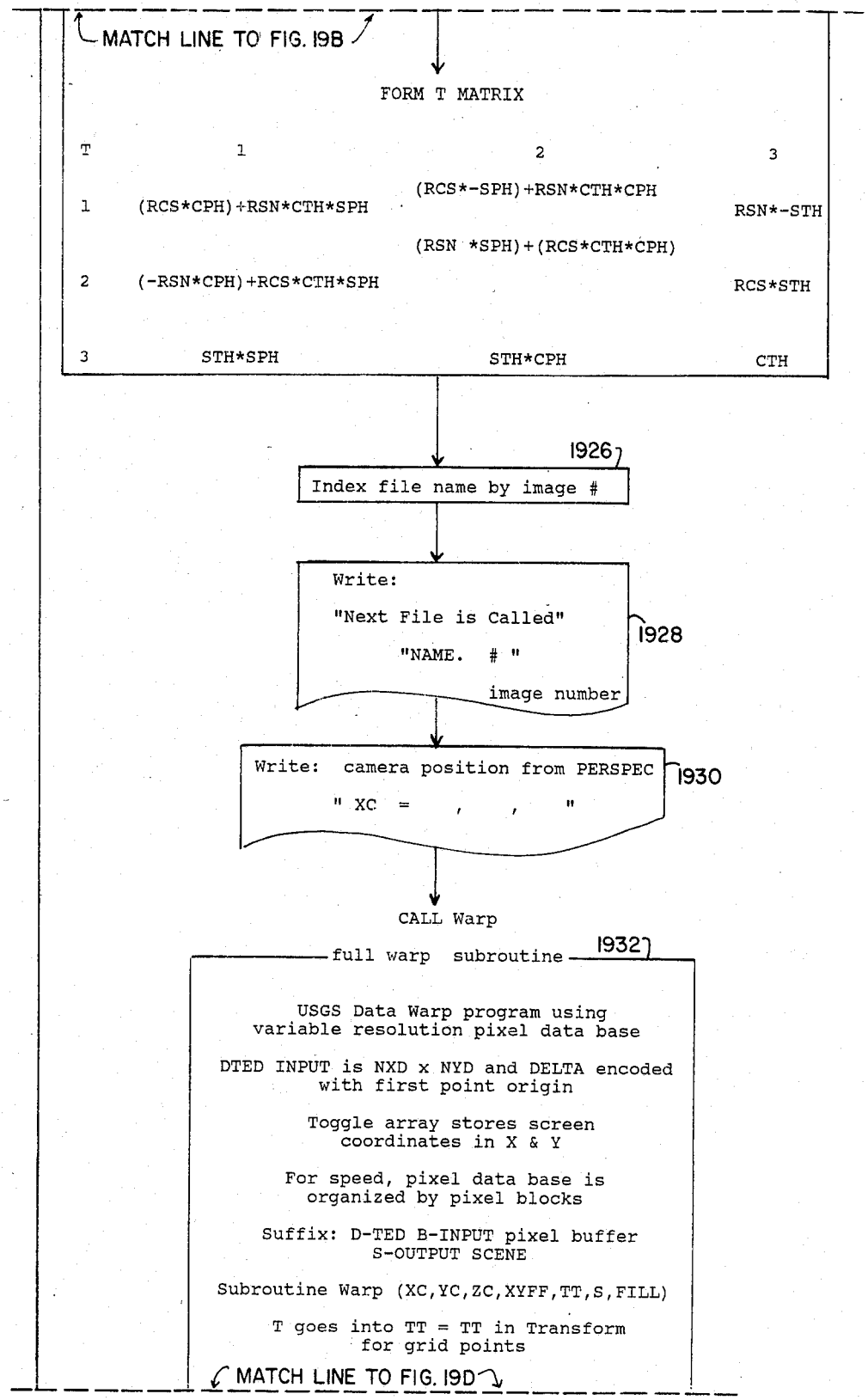
Figure 19D:
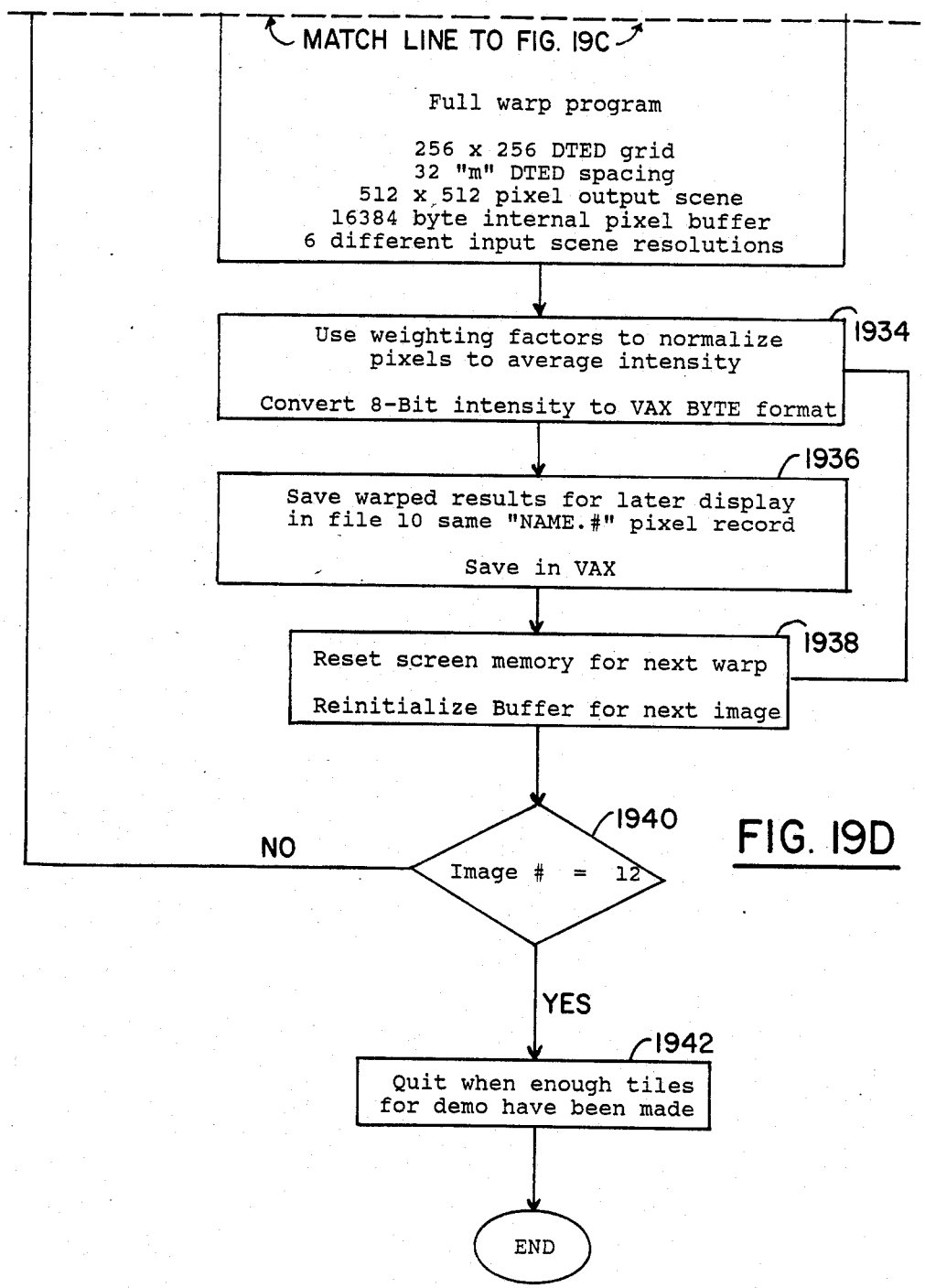

SCENGEN, FIG. 19, operates to create full warp images from the pixel data base and the DTED data base, FIG. 1A, utilizing the polynomial warp coefficient matrix generated in COEFMAT. SCENGEN begins by opening files SYS$INPUT and SYS$OUTPUT for transfer of information with the system including the operator's TEK screen for entering of file names and other necessary data, block 1902.

A message is displayed on the TEK screen to prompt the operator to supply the name of a coefficient file generated in COEFGEN, the message could be similar to that shown in block 1904. The coefficient file name is read and the coefficient file is opened, block 1906.

A message is then displayed on the TEK screen to prompt the operator to supply a name for the image file to be created, block 1908. The message shown indicated that the portion of the name after the ".." will be defaulted to the number of the tile on which the image will later be stored. The name of the full warp images less the tile designation ".#" is used, block 191.

The iteration or the number "ITER" is reset to 0 and the field of view for image generation is sought, block 1912. The following parameters are read, block 1914, from the coefficient matrix file to be used in generating each of the 12 scenes:

| "NUMITER" | number of records |
|---|---|
| "NF" | number of control points |
| "METRIC" | DTED scale factor |
| "XYF" | magnification scale |

Once these parameters are read, SCENGEN is ready to begin generating scenes to fill the IP-8500 tiles. A message is displayed to the TEK screen to prompt the operator to supply the starting image number, block 1916. This number will designate the first tile to be filled utilizing the data from the appropriate position in the coefficient file. This number is read in as variable ISTART, block 1918.

A loop is then entered which extends from block 1920 through block 1940. This loop runs through 12 times, reading the next successive 87 bits from the coefficient file each time. A file, designated with a ".#" suffix indicating the tile to which the file will later be stored, is opened and filled if the number is within the range selected by the operator.

Eighty-seven bytes of data are read from the coefficient file to fill the following variables, block 1920:

| XC(1-3) | camera position |
|---|---|
| XT(1-3) | target position |
| DM(6,9) | design matrix |
| X(3,9) | control points |

The iteration number is incremented by adding 1 to the value of ITER. The first time through the loop, the value of ITER will now be 1. This new value of ITER is checked, block 1922.

If the iteration number is less than ISTART, as set by the operator, the program loops back to block 1920 to begin the fill loop again and therefore does not generate a scene file corresponding to this iteration number. If the iteration number is greater than 12, the exemplary program will terminate block 1923, having generated enough scenes to fill the 12 available tiles. If a file for this iteration number is to be generated, then subroutine PERSPEC is called.

Subroutine PERSPEC, block 1924, operates as described in previous programs to generate the transformation matrix T(3,3) from the camera "XC" and target "XT" positions supplied.

The iteration number is then added to the end of the file name supplied earlier, block 1926, and displayed as "name.#" as illustrated in block 1928. The camera position is also displayed on the TEK screen in a format such as block 1930:

XC="XC(1)", "XC(2)", "XC(3)"

Subroutine WARP block 1932 is then called to generate the S(3,512,512) and FILL(3,512) matrices from XC(1-3), XYF, and T(3,3).

Subroutine WARP creates from the pixel data base and elevation data base a scene to be displayed on the IP8500 monitor for pilot viewing. The scene is comprised of 255 DTED cells along each of the X and Y axies. To establish these cells, 256 rows and 256 columns of pixel points are established, a DTED cell comprising the area between adjacent rows and columns. For instance, between the 3rd and 4th row of pixels would be the 3rd row of DTED cells and between the 3rd and 4th column of pixels would be the 3rd column of DTED cells and so on to the 255th row or column of DTED cells bordered by the 255th and 256th rows or columns of pixels.

Counting is begun in the lower left-hand corner with the first row and first column. The first row of DTED cells is filled cell by cell from left to right, i.e. column 1 to column 255. Each DTED cell is assigned a single elevation in MAPZ based on an average weighting of elevations in the cell. In WARP each DTED cell is assigned a single number or visual intensity based on a weighted average of the appearance of the pixels defining that cell in the original aerial photograph.

In the highest resolution scene each cell is defined by a single pixel. In the lowest resolution scene each cell is defined by 1,024 pixels or 32 pixels on each side of the cell. In the lower resolution file the intensities of all 1,024 pixels is averaged to a DTED cell of the same screen dimensions as the single pixel cell and therefore the resolution is less.

As these scenes are generated they are stored in the S(3,512,512) matrix by WARP. The data of the S(3,512,512) matrix is transferred to the scene file "name.#" by SCENGEN for later use.

Once WARP has completed, flow returns to SCENGEN, block 1934, where weighting factors are used to average the pixel intensities. The following process is utilized for values of J from −255 to +256 and values of I from −255 to +256 to fill the temporary storage variable "OUT(512)".

First the pixel weights for a single value of I and J are averaged;

$$IPX = S(3,I,J)/S(2,I,J)$$

then to convert the 8-bit intensity to byte form, the single value is analyzed;
if IPIX > 127, then IPIX = IPIX − 256
this value is then temporarily stored;

$$OUT(I) = IPIX$$

I is incremented by 1, J remains the same, the above process is repeated and the next value of OUT is filled. This process is repeated until the value for OUT(−255) through OUT(256) are generated, block 1934.

The data stored in the OUT variable is then transferred to the scene file "name.$" in the first 512 locations block 1936. The screen memory is reset and the buffer is reinitialized for the next 512 bytes of data, block 1938;

CALL          LIB$MOV3(NFBUF,FILL(1,NXSMIN),S(1,NXSMIN,J)).

J is then incremented by 1 and I is reset to −255 and the generating process, blocks 1934, 1936 and 1938, is begun again and repeated for 512 values of J and 512 values of I for each value of J;

Once this process is completed for all values of I and J, and 262,144 bits a scene have been stored, flow is directed back to block 1920 to generate the next scene. If this was the last scene, i.e. the 12th, then program SCENGEN is finished, block 1940 and 1942. If flow was directed back to block 1920, then the next set of camera and target parameters are read from the next 87 bits of the coefficient file and the next scene generated.

MAN

Program MAN, FIG. 20, utilizes the scenes produced in SCENGEN and stores them on the Gould tiles. to produce a visual display for the pilot being briefed. MAN also utilizes the polynomial coefficient files developed by COEFMAT. In the exemplary embodiment, 12 scenes were developed in SCENGEN. These scenes are switched as flight progresses from the start to the end of the terrain. The "joystick" is utilized to maneuver off the "nominal" flight path by altering the polynomial coefficient in real time. The actual flight or line of camera motion is altered and the field of view is shifted left or right so that the target XT is centered in the field of view in the middle of the TEK screen. Real time interpolation between full warp scenes is obtained by using hhe analog warp box, FIGS. 4B and 4C.

MAN first establishes interaction between the VAX, the TEK 4115B, the IP-8500 and the analog warp box using the VAX operating commands shown in blocks 2001-2006.

Next, block 2007, files SYS$INPUT and SYS$OUTPUT are opened for use by MAN. These files contain the warp images and polynomial coefficient matrix, respectively.

Then, the main menu, block 2008, is written to the screen of the TEK. This menu prompts the operator to make a selection from 1 to 4. This selection is received by MAN in block 2009.

If either selection 1 or 2 is made, block 2010 or 2027, respectively, then subroutine BWSET is called, block 2011 or 2028. BWSET receives only one variable value from MAN, and that is the value of the variable "IREV" used in BWSET. IREV is the reverse/don't reverse indicator. If IREV is equal to 0 then the file color is not reversed, if it is equal to any other value then the file color is reversed. Reversing of the file color created the equivalent of a photographic negative of the file image. Therefore, if the selection is 1, "Color File", then IREV equals 0; if the selection is 2, "Reverse Color", then IREV equals 1.

Subroutine BWSET is entered from either block 2011 or block 2028 and operates in the same manner, except that the decision in block 2021 will be different. First, in block 2012, the message "Intensity File" is written to the TEK screen to prompt the operator to supply the name of the file. The name supplied should be that of the file created in SCENGEN, this name along with the name "NC" is read in, block 2013.

In block 2014 the number of characters in the file name is checked. If there are 1 or no characters, the file name is defaulted to the Black and White default file "DBA1:[IMAGES]BW.FOR", block 2015. If the file name entered has more than 1 character and is therefore a valid name, the file name is modified to conform to the requirements of the subroutine and the file becomes "DBA1:[IMAGES]"name".FOR" where "name" is the name supplied by the operator.

The file with the name assigned in either block 2015 or 2016 is opened and read, block 2017, into subscripted variable KOLOR(3,16). If the name was assigned in block 2016 then the file was created in SCENGEN. If the file name was assigned in block 2015, i.e. "DBA1:-[IMAGES]BW.FOR", then it is the default look-uptable which must exist in VAX software. The (3,16) matrix which comprises the "BW.FOR" default file in the exemplary embodiment is as follows:

$$\begin{pmatrix} 155 & 0 & 0 & 156 & 20 & 0 & 151 & 30 & 0 & 158 & 35 & 0 & 159 & 40 & 0 & 160 \\ 45 & 0 & 162 & 50 & 0 & 164 & 55 & 0 & 166 & 60 & 0 & 168 & 65 & 0 & 120 & 70 \\ 0 & 170 & 75 & 0 & 170 & 80 & 0 & 10 & 85 & 0 & 170 & 90 & 0 & 120 & 100 & 0 \end{pmatrix}$$

In block 2018, the HLS 16 color input is converted into 16 intensities by the following equation for J=0115:

KOLOR(1,J)=(255)KOLOR(2,J)/100

These 16 intensities are interpolated to 256 intensities, block 2019, in blocks 2020-2024.

The color pattern counters are reversed depending on the value of "IREV" checked in block 2021 and set either as shown in block 2022 or 2023. The colors are then filled in (regular or reversed) and converted to byte format by the following equations where the outer loop counter J runs from 0 to 15 and the inner loop counter I runs from 1 to 17 (15×17=255) for each cycle of the outer loop:

C1=KOLOR(1,J)

DC1=[KOLOR(1,J+1)−C1]/17
Inner loop:
If C1>128, then BWBUF(II)=C1
If C1≧128, then BWBUF(II)=C1−256

C1=C1+DC1

II=II+INC
Inner loop end.

These loops run until II is less than 0 or greater than 256 in which case the BWBUF(256) subscripted variable has been filled, block 2025.

This data stored in BWBUF is then outputted to the IP-8500 by the IP-8500 driver command IP8QW(BPA,0,,,,BWBUF,256,0,0), block 2026.

If the selection from the main menu is equal to 3, block 2029, the message "Input Coefficient File Name" is written to the screen of the TEK, block 2030. A name is supplied by the operator, block 2031, based on the files created in COEFMAT. The name supplied is modified similar to above to become "DBA1:[IMAGES]name.DAT". This file contains the polynomial coefficient matrix generated in COEFMAT, and is opened in block 2033.

Next, the operator is prompted to select whether to fill or not fill the tiles of the IP-8500, block 2034. The operator's selection is read, block 2035, and stored in variable IFILL as a 0 or 1.

Next, the field of view is read from the file "DBA1:[IMAGES]name.DAT", namely; variables Numiter, NF, METRIC and XYF are filled from the first 4 bits of data in the file, block 2036.

If the selection by the operator to fill the tiles, block 20361, is YES, the parameters from the coefficient matrix file "DBA1:[IMAGES]name.DAT" are loaded into the tiles 1-12, block 2037. An outer DO loop is performed for L=1-12 where 87 bits of data are extracted from the file each time through the loop for storage in the tile corresponding to the particular run through the loop, i.e. the $L^{th}$ tile. The data read from "DBA1:[IMAGES]name.DAT" fills the following subscripted variables in order XC(3), XT1(3), DM1(6,9), and X1(3,9), in the first portion of this outer DO loop.

Next, an inner DO loop is performed for I=1-3 where XOC(3,12) and XT(3,12) are filled for one value of L by the following equations:

XOC(I,L)=XC(I)

XT(I,L)=XT1(I)

Once these matrices are filled for one value of L, a second inner DO loop is begun to fill DM(6,9,12) and X(3,9,12) for the value of L, using the following equations for J=1-9:

DM(I,J,L)=DM1(I,J) for I=1-6 and

X(I,J,L)=X1(I,J) for I=1-3

Then a message is written to the TEK screen such as "LOADING TILE L" to indicate which tile is currently being filled, block 2038. Next, block 2039, MAN calls the IP-8500 driver command IP8QW(LR,0,,,,ICHAN,2,0,32) to designate the tile to which to write the upcoming information. Then "ICHAN" is doubled so that when the IP-8500 driver command is called the next time through the loop, the next tile will be designated.

Then in block 2040 the channel is displayed as it is written by setting IDISP=L+15 and then setting IVOC(9) equal to IDISP+256(IDISP) and setting IVOC(13) equal to IDISP. MAN then calls the IP-8500 driver command IP8QW(LVR,0,,,,IVOC(9),10,0,9) block 2041, to display the channel being written. Briefly, all IP8, etc. commands are part of the standard Gould-driven command set, this particular command loads video outputs into control register 9, 10 bytes at a time.

In order to dump the picture or set of images to the IP-8500 (channel 0), block 2042, the images file "DBA1:[IMAGES]__.DAT" formed in SCENGEN is first read into the BUF(256,256) matrix and then onto the IP-8500 tiles, block 2043.

The data is read from the image file into BUF(1,1) through BUF(256,256), block 2043, and then from BUF onto the tiles by calling command IP8Q(WI,O,,,,%REF (BUF(I,JJ)),IBLK,1,1) for JJ=(1, 65, 129, 193, 321, 385, 449), block 2044.

Once this loop is run through 12 times to fill all the tiles, the command IP8W(0) and IP8QW(LR,0,,, 'FFF'X,2,0,32) are called to close down the channels and restore the channel mask, block 2045.

If the selection from the main menu is 4 "Maneuver", block 2046, then first a message is written to the TEK screen, block 2047, to prompt the operator to input the delay in seconds and speed in m/sec.

The delay is stored in variable "DELAY" and the speed is stored in variable "V", block 2049. A message is displayed on the TEK, block 2050, to prompt the operator to supply a control factor "CF", block 2051.

The tile pointer "L" is set to 0 and the initial camera position is set as follows, block 2052:

XC(1)=XOC(1,1)

XC(2)=XOC(2,1)

XC(3)=XOC(3,1)

The initial position perturbation from the nominal flight path is set to 0, block 2053:

DXC(1)=0

DXC(2)=0

DXC(3)=0

Rotation is set to the upright position and the toggles are set to starting values, block 2054:

RCS=1

RSN=0

ICHG=1

CH=' '

A conditional DO, block 2056, is entered in block 5 and runs to the end of program MAN. The loop only runs while the character variable "CH" is not equal to "Q".

The first portion of the loop, blocks 2058–2065, which operates only while ICHG is equal to 1 and "L" is less than 12. The tile counter "L" is indexed by 1, block 2058. The distance from the start of the full warp image stored in this $L^{th}$ tile is initialized to 0, block 2059:

DI(1)=0

DI(2)=0

DI(3)=0

The airframe axis is pointed along the nominal flight path, block 2060:

OY(1)=XOC(1,L+1)−XOC(1,L)

OY(2)=XOC(2,L+1)−XOC(2,L)

OY(3)=XOC(3,L+1)−XOC(3,L)

The Y orientation vector is then normalized to the velocity "V" entered above, block 2061:

$$FAC = V/\sqrt{OY(1)^2 + OY(2)^2 + OY(3)^2}$$

OY(1)=OY(1) (FAC)

OY(2)=OY(2) (FAC)

OY(3)=OY(3) (FAC)

The X orientation vectors are then normalize to the Y, block 2062:

OX(1)=OY(2)

OX(2)=−OY(1)

OX(3)=0

The X and Y orientation vectors are then normalized to a function of the velocity "V" and the control factor CF, block 2063 and 2064:

FAC=(CF)(V)/OX(1)$^2$+OX(2)$^2$

OX(1)=OX(1) FAC

OX(2)=OX(2) FAC

OZ(1)=OX(2) OY(3)/V

OZ(2)=−OX(1) OY(3)/V

OZ(3)=[OX(1) OY(2)−OX(2) OY(1)]/V

The initialization portion of the DO loop is completed by the set up for image tile switch by the following command calls, block 2065:

IDISP=INDX(L)+16

IVOC(9)=IDISP+256 IDISP
IVOC(13)=IDISP

CALL IP8QW=(BEG,0,,,,0,,,) CALL
IP8QW=(LVR,0,,,,IVOC(8),16,0,8)

CALL IP8QW=(END,0,,,,0,,,)

After initialization is oompleted for the tile "L" being processed, subroutine PERSPEC is called, block 2066. Subroutine PERSPEC, block 2057, utilizes XC(1–3), XT(1,L), RCS and RSN to generate the T(3,3) matrix. PERSPEC operates in the same manner as in program COEFMAT and generates the T(3,3) matrix by the equations shown in block 2067. All points are transformed to the new screen using metric factors, block 2068. The perturbation of observation points is scaled to DTED units by the following equations, block 2069:

DXX=[XC(1)−XOC(1,L)]/32

DYY=[XC(2)−XOC(2,L)]/32

DZZ=[XC(3)−XOC(3,L)]/32

The perturbation of the control points is then derived from the scaled observation point perturbation for I=1–9 by the following equations, block 2070:

XX=X(1,I,L)−DXX

YY=X(2,I,L)−DYY

ZZ=X(3,I,L)−DZZ

Once the control point perturbation is known, the new screen locations of the control points can be determined by the following equations (also for I=1–9), block 2071:

SCALE=1/[XYF[T(3,1)XX+T(3,-2)YY+T(3,3)ZZ]]

UP(1,I)=SCALE[T(1,1)XX+T(1,-2)YY+T(1,3)ZZ]

UP(2,I)=SCALE[T(2,1)XX+T(2,-2)YY+T(2,3)ZZ]

The perturbation screen control points, UP(2,9), and the design matrix from COEFMAT, DM(6,9,12), are utilized to generate polynomial warp parameters P(1-12), block 2072, by the following equations for I=1-6 where J=1-9, block 2073:

P(I)=DM(I,J,L)UP(1,J)

P(I+6)=DM(I,J,L)UP(2,J)

The value of ICHG is checked and equal to 1, the value of ICHG is reset equal to 0, and the IP-8500 is flipped to the next image by the command IP8QW(XCTV,0,,,,0,,,), block 2074.

The polynomial coefficients for the image of the first tile are sent to the warp box by calling subroutine SEND, block 2075. Subroutine SEND, block 2076, first displays a message to inquire of the operator the width of the real time viewing screen, block 2077. The operator supplies the width "S", the amount of the pixel magnification on the screen of the warp box on which the real time briefing is viewed, block 2078. In the example the screen width is 890.

A set of 12 scaling factors is established to compensate for the peculiarities of the particular analog warp box used in the exemplary embodiment as follows, block 2079:

FAC(1)=S/512

FAC(2)=S

FAC(3)=S

FAC(4)=(S)4761.6

FAC(5)=(S)4761.6

FAC(6)=(S)4761.6

FAC(7)=S/512

FAC(8)=S

FAC(9)=S

FAC(10)=(S)4761.6

FAC(11)=(S)4761.6

FAC(12)=(S)4761.6

The coefficients KOEF(I) are set based on the polynomial warp parameter P(I) modified by their respective scaling factors FAC(I);

KOEF(I)=FAC(I)

and are sent to the warp box, block 2080.

KOEF(I)=IOR[MASK(I),IAND('OFF'X,KOEF(I))] CALL SYS$QIOW(,%VAL(ICHAN),IO$_WRITELBLK,,,,KOEF,%VAL(24),,,,)

The coefficients are limited to values between −2048 and +2047, inclusive.

Subroutine TIMER is then called to delay or slow down the screen display process to a desired frame rate "DELAY", block 2081. INTERV(2) is set equal to −1 and INTERV(1) is set equal to $-\text{DELAY} \times 10^7$ and the status is set up, block 2082, by:

ISTAT=SYS$SCHDWK[,,%VAL(%LOC(INTERV(1))),]

ISTAT=SYS$HIBER

Subroutine JOYSTICK, block 2984, used to interface with the Gould DeAnza Joystick, is called, block 2083, by calling IP8QW(RDR,0,,,,JYSTAT,2,0,1). The status is checked to see if the joystick enter button has been depressed. If the value of IAND(4000,JYSTAT) does not equal 0 the value of ITOG, i.e. switched, i.e. set equal to 2 if it is 1 and equal to 1 if presently 2.

The joystick position is retrieved, block 2086, by Call IP8QW(LPR,0,,,,1,2,0,1). The X, Y displacement register is read, block 2087, by Call IP8QW(RPR,0,,,, IX-Y,2,0,3). The displacement is then unpacked, block 2088:

JX=IAND(IXY, "377)

JY=IAND(ISWAB(IXY),"377)

JOYSTICK checks to see if the keyboard of the VAX terminal has been activated by calling subroutine KEYIN, block 2089. Subroutine KEYIN, block 2090, detects keyboard interrupt signals and produces an appropriate character for variable INPUT in JOYSTICK which is transferred to MAN as variable "CH", the value assigned will be a "Q", if appropriate.

Flow returns to the main program where the new orientation can be viewed by updating the trajectory given the displacement obtained from JOYSTICK.

The rotation is relaxed by multiplying by 0.95, i.e. RSN=0.95 RSN, block 2091. The camera distance from the start of the full warp image is updated, block 2092, in the following manner:

DI(1)=DI(1)+OY(1)

DI(2)=DI(2)+OY(2)

DI(3)=DI(3)+OY(3)

The value of "ITOG" set in JOYSTICK is then checked, block 2093. If ITOG is equal to 1, which would indicate that the joystick was activated, X and Y axis shift control mode is processed, block 2094, to redefine camera positions. First, the X directions perturbation with damping is factored in:

FAC=0.03(128−JX)

DXC=0.98 DXC(1)+(FAC)OX(1)

DXC=0.98 DXC(2)+(FAC)OX(2)

DXC=0.98 DXC(3)+(FAC)OX(3)

then the Z direction perturbation with damping is factored in:

FAC=0.03(128−JY)

DXC(1)=0.98 DXC(1)+(FAC)OZ(1)

DXC(2)=0.98 DXC(2)+(FAC)OZ(2)

DXC(3)=0.98 DXC(3)+(FAC)OZ(3)

If the JOYSTICK was not 1, however, which would indicate that the JOYSTICK had been activated, the bank and lift control mode is processed, block 2095, to redefine camera positions. First, bank perturbation with damping is factored in:

$$RSN2 = RSN + 0.0003 (128 - JX)$$

if $RSN2 > 1$, then $RSN2 = 1$
if $RSN2 < -1$, then $RSN2 = -1$
then the Z perturbation with damping is calculated:

$$FAC = 0.03 (128 - JY)$$

$$DXC(1) = 0.98 \ DXC(1) + FAC[(RCS)OZ(1) + (RSN)OX(1)]$$

$$DXC(2) = 0.98 \ DXC(1) + FAC[(RCS)OZ(2) + (RSN)OX(2)]$$

$$DXC(3) = 0.98 \ DXC(1) + FAC[(RCS)OZ(3) + (RSN)OX(3)]$$

RSC is then reset by:

$$RCS = 1 - (RSN)$$

and the new camera position is reset to the tile position plus the camera perturbation plus the flight distance, block 2096:

$$XC(1) = XOC(1,L) + DXC(1) + DI(1)$$

$$XC(2) = XOC(2,L) + DXC(2) + DI(2)$$

$$XC(3) = XOC(3,L) + DXC(3) + DI(3)$$

The distance to the end of the tile "DIST" is recalculated as follows:

$$DIST = OY(1)[OXC(1,L+1) - XC(1)] + OY(2)$$

$$[XOC(2,L+1) - XC(2)] + OY(3)$$

$$[XOC(3,L+1) - XC(3)]$$

and if DIST is less than or equal to 0 ICHG" is set equal to 1, block 2097. The program then checks the value of CH, block 2098, and loops back to block 2055 if CH is not equal to Q, to continue the conditional DO loop.

The value for ICHG, established in block 2097 based on the calculated value of DIST, is then checked, block 2057, to see if a new tile is necessary. A new tile will be necessary when DIST is equal to or less than 0. If no new tile is necessary then flow will proceed to block 2066 in order to calculate the next perturbed camera position as above.

PAN

Program PAN, FIGS. 21A through 21E is similar to program MAN in many respects, except that it manuevers across a static large field of view rather than along a dynamic sequence of time snapshots. The PAN main menu is:
1—Color File
2—Reverse Color
3—Load Images
4—Pan Test The first two options on this menu FIG. 21A block 2101 through FIG. 21C block 2128 are function substantially identical to MAN FIG. 21A block 2001 through FIG. 20C block 2128 and operate to perform the same function.

Selection 3, block 2129, differs in that PAN selection 3 only loads contiguous image files created in an earlier full warp sequence. That full warp sequence should have generated multiple views of the same target point from the same camera position, but offsetting the selected output frame each time, to produce several contiguous frames, ICHAN begins equal to 1, block 2130. Unlike MAN, selection 3—of PAN does not utilize the coefficient files created in COEFMAT. The loading sequence, selection 3, starts the same by asking the operator to supply a scene file name, block 2132, reading the name, block 2134 and loading that file name, block 2136.

Figure 20B:
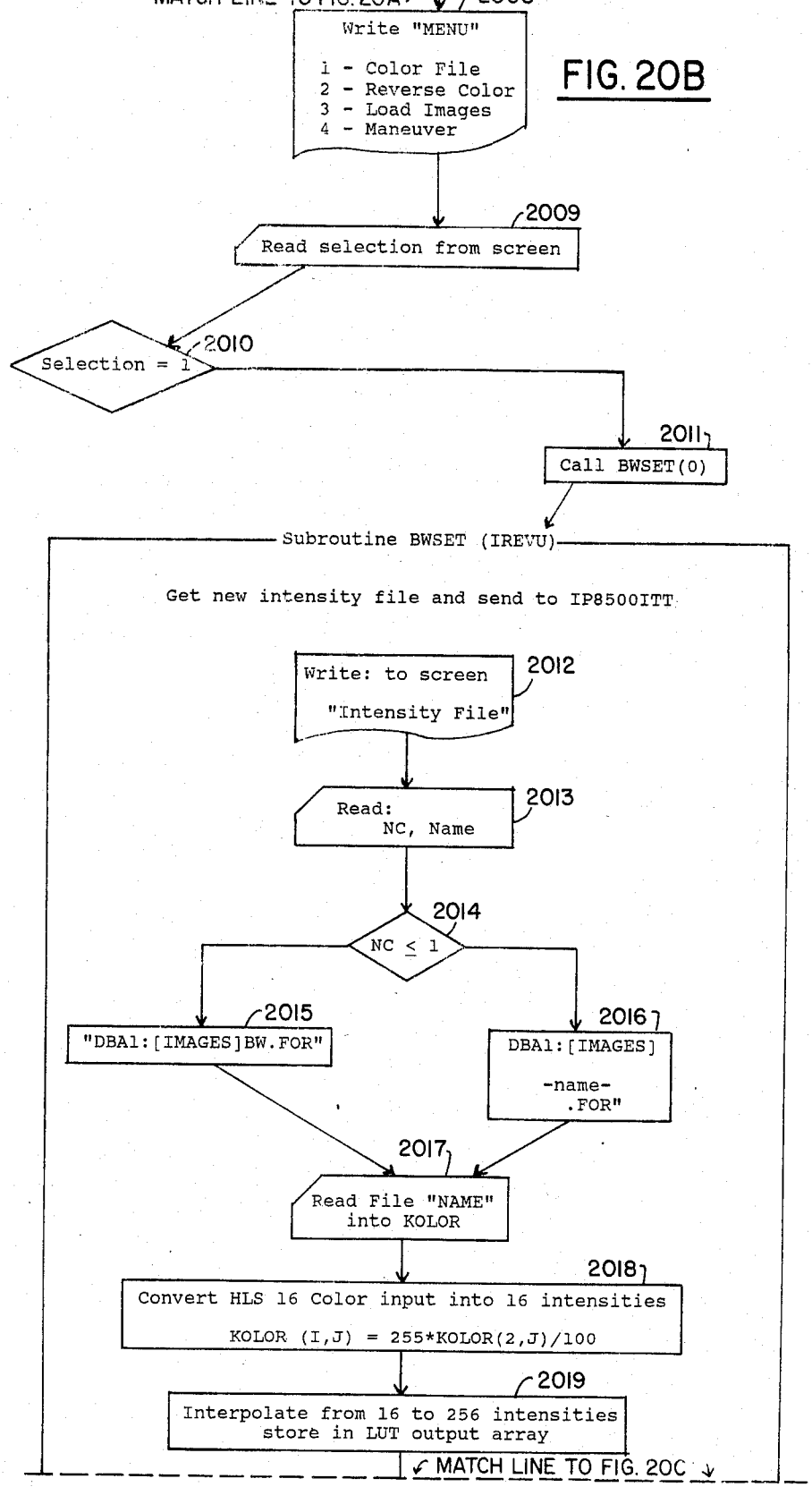
Figure 20D:
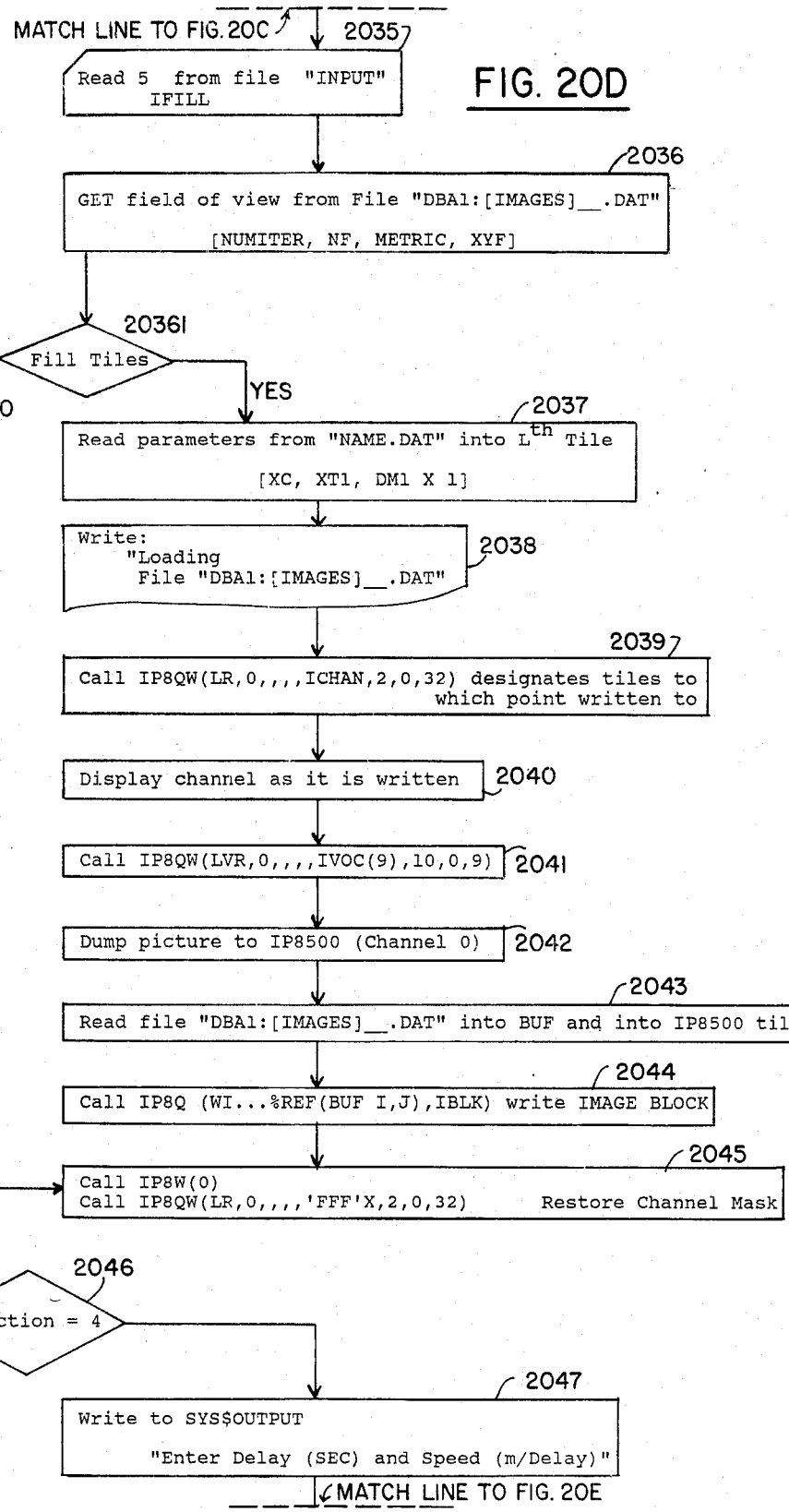
Figure 20E:
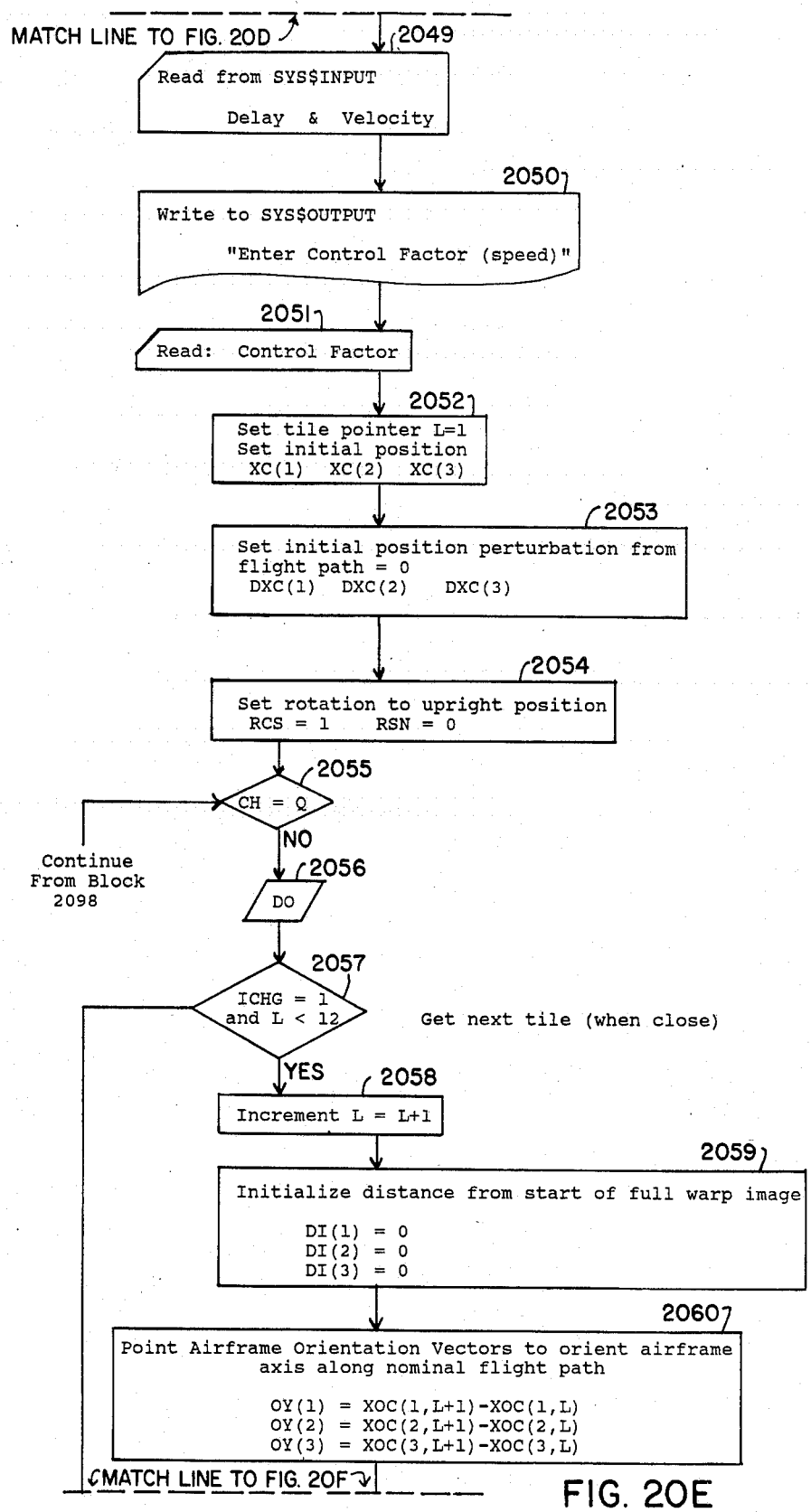
Figure 20F:
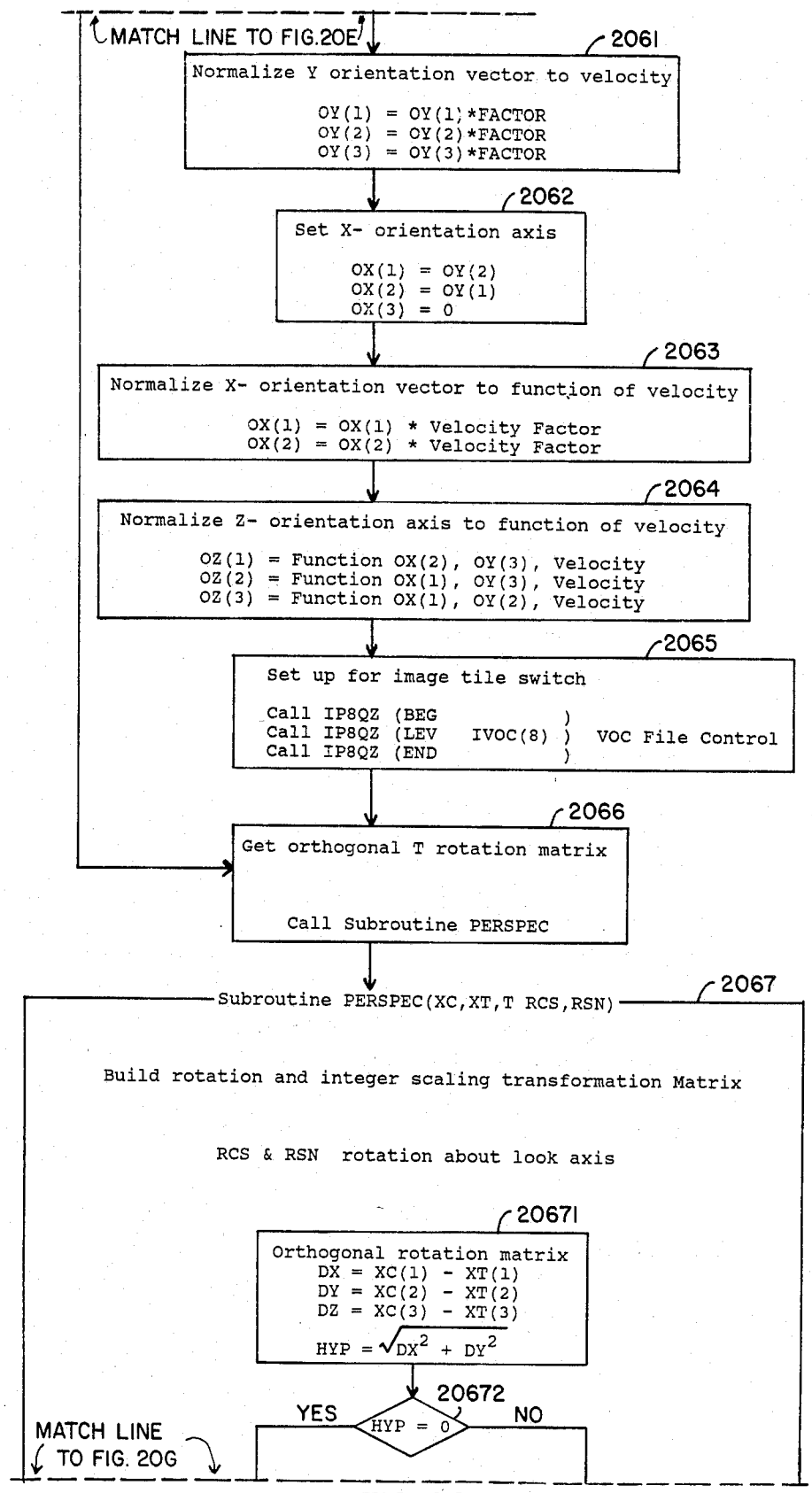
Figure 20G:
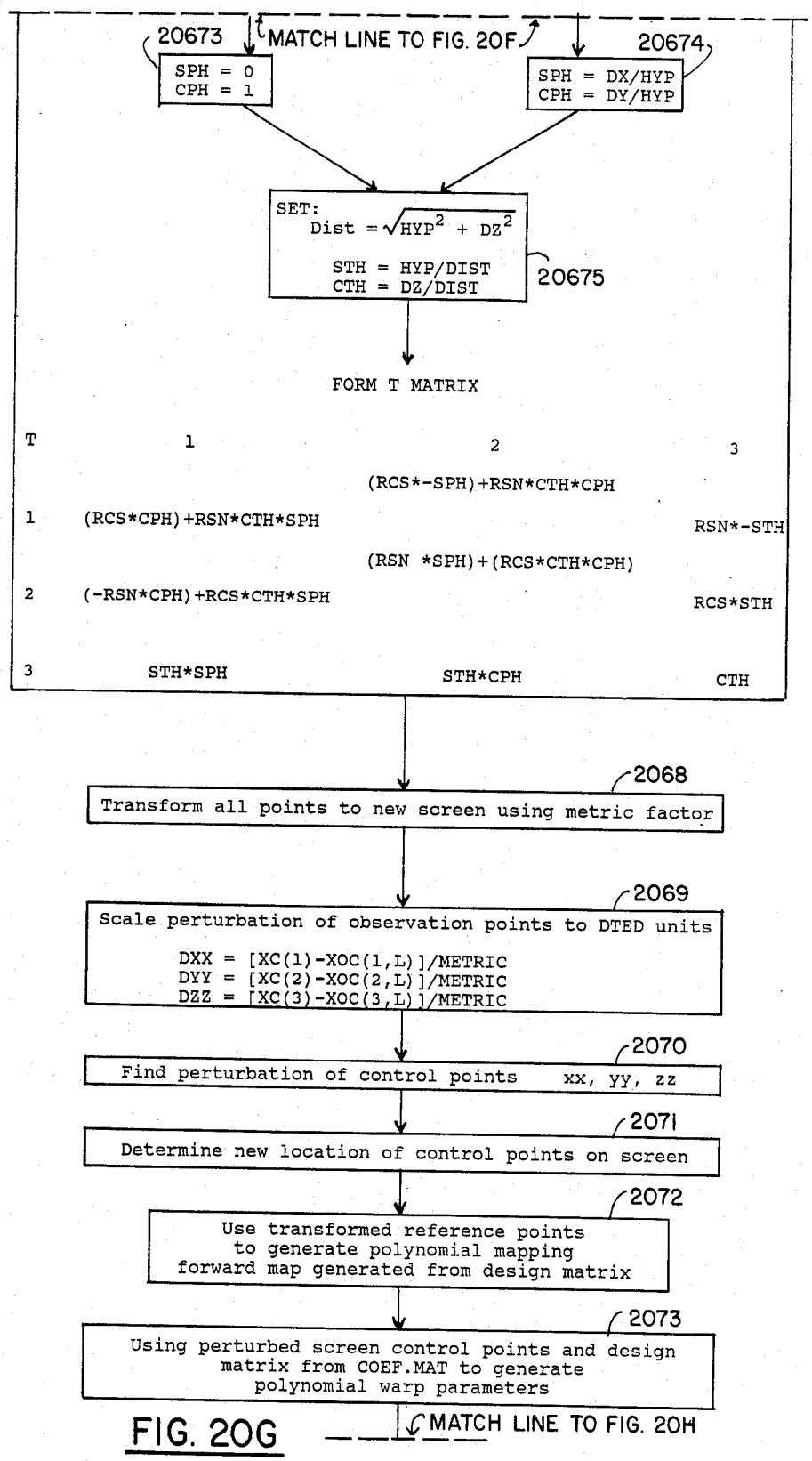
Figure 20H:
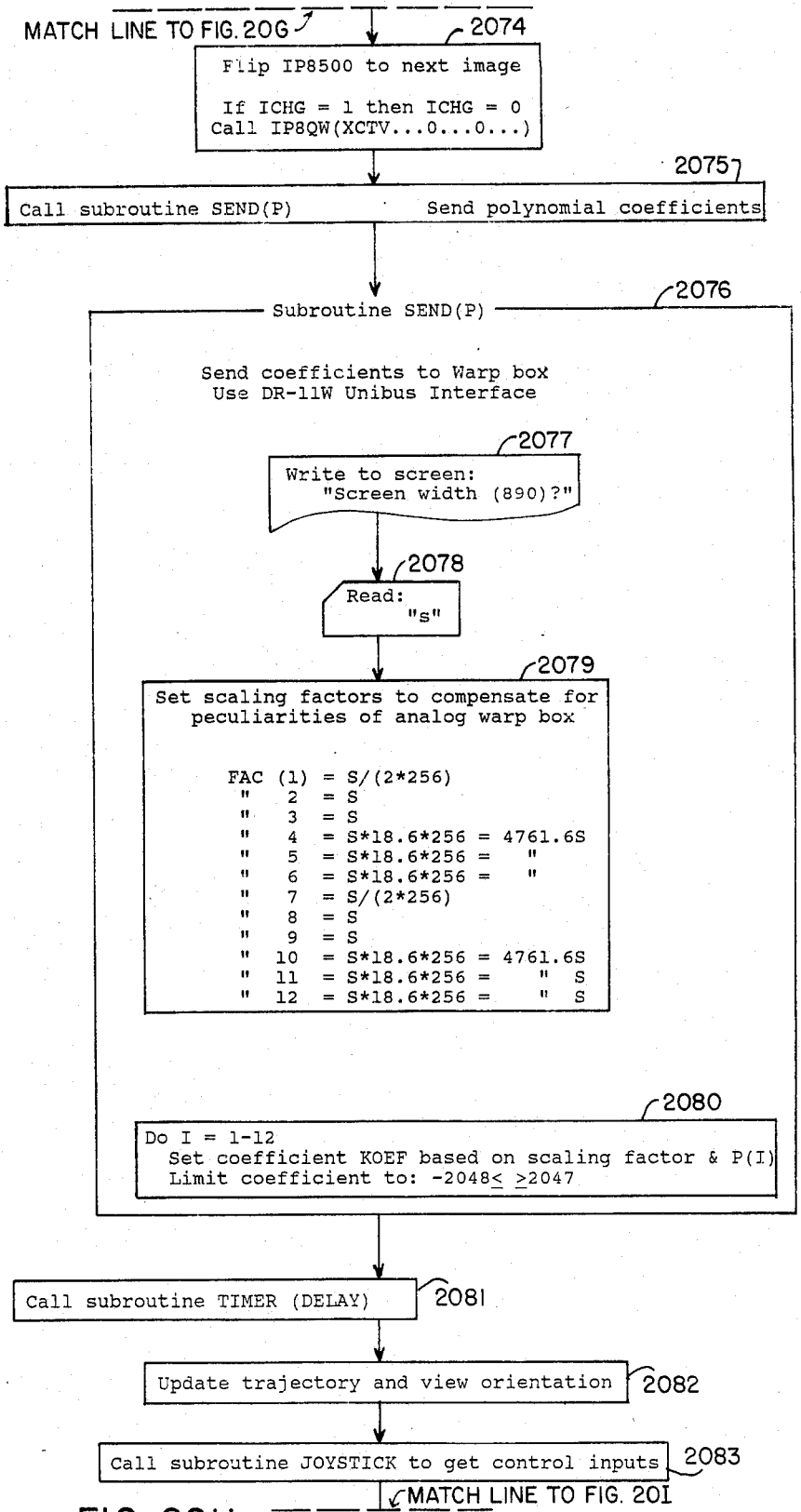

The loop of PAN, blocks 2138 through 2156, operates the same as the loading loop described in MAN, FIG. 20D blocks 2037 through 2044, where the data in the scene file is loaded onto the 12 tiles of the IP-8500. The channel mask is then restored, block 2158.

Selection 4 of PAN, block 2160 "Pan Test", operates vastly differently from selection 4 of MAN, "Maneuver". In PAN the operator has no forward motion and only scans across the large FOV of scenes stored on the tiles. The view presented to the operator on the display does not always face the target point. As the operator "pans" by moving the joystick left and right, the camera position is constant, but the camera angle is changed. Selection 4 begins by setting the value of character variable CH equal to " ", and by setting the values of variables IXS, IYS, ITX, ITY, to 256, 256, 3, 1, respectively. The command IP8QW(LVR,0,,,,3,2,0,2) is then called, block 2162, to initialize channels for data transfer.

A conditional DO loop is entered at block 2164, which runs to the end, block 2182, until the value of "CH" is substituted with a "Q" to indicate appropriate keyboard input to terminate scene processing.

Figure 20I:
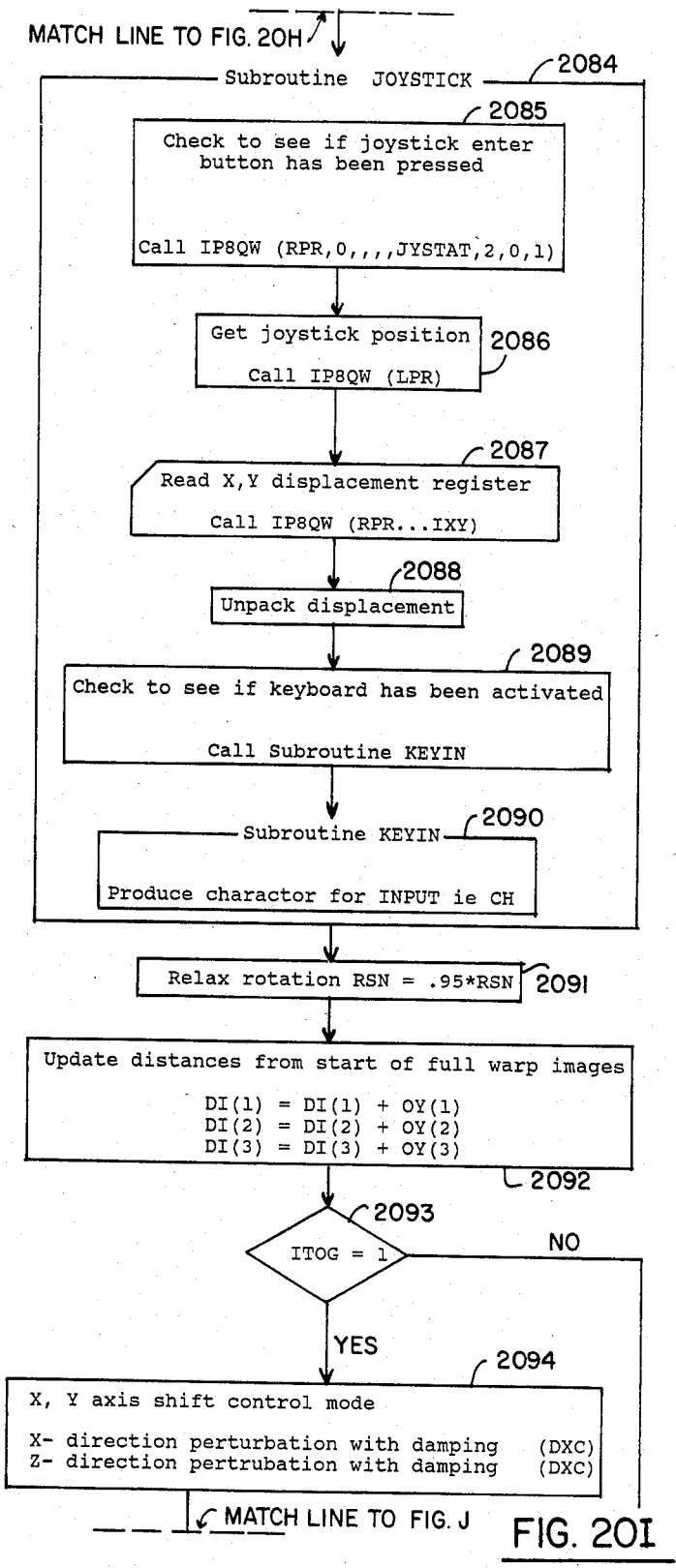
Figure 20J:
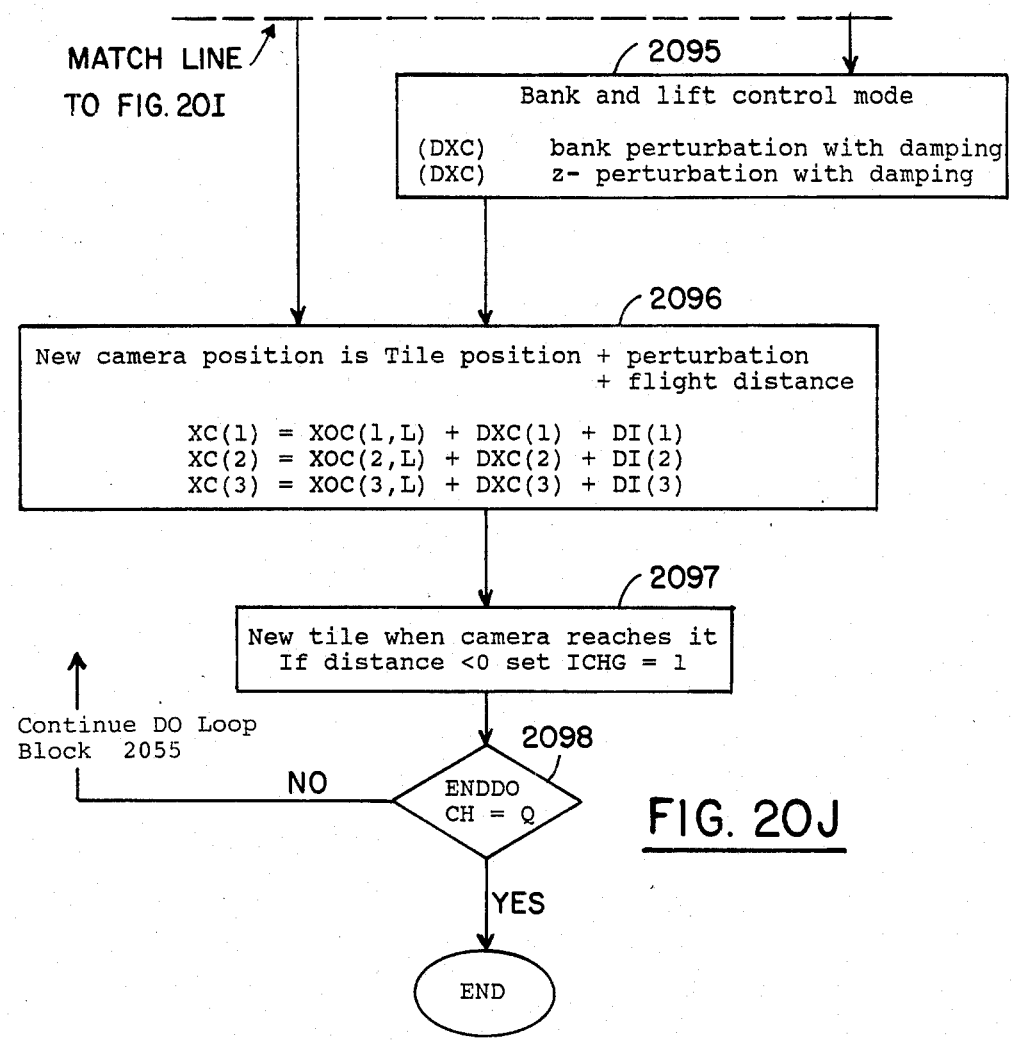
Figure 21A:
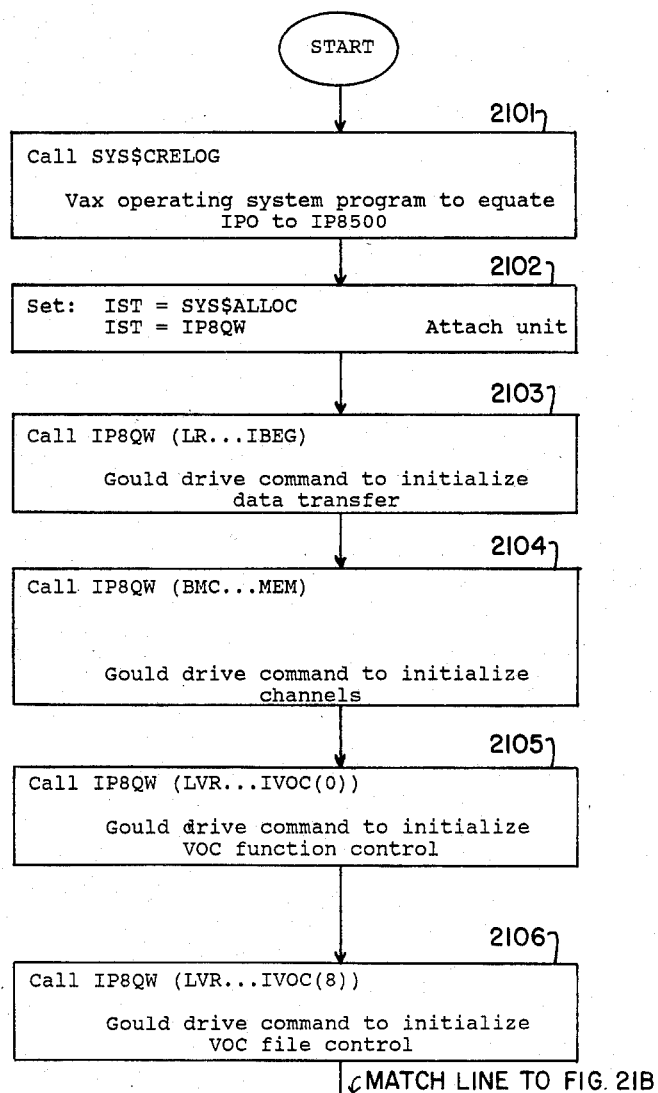
Figure 21D:
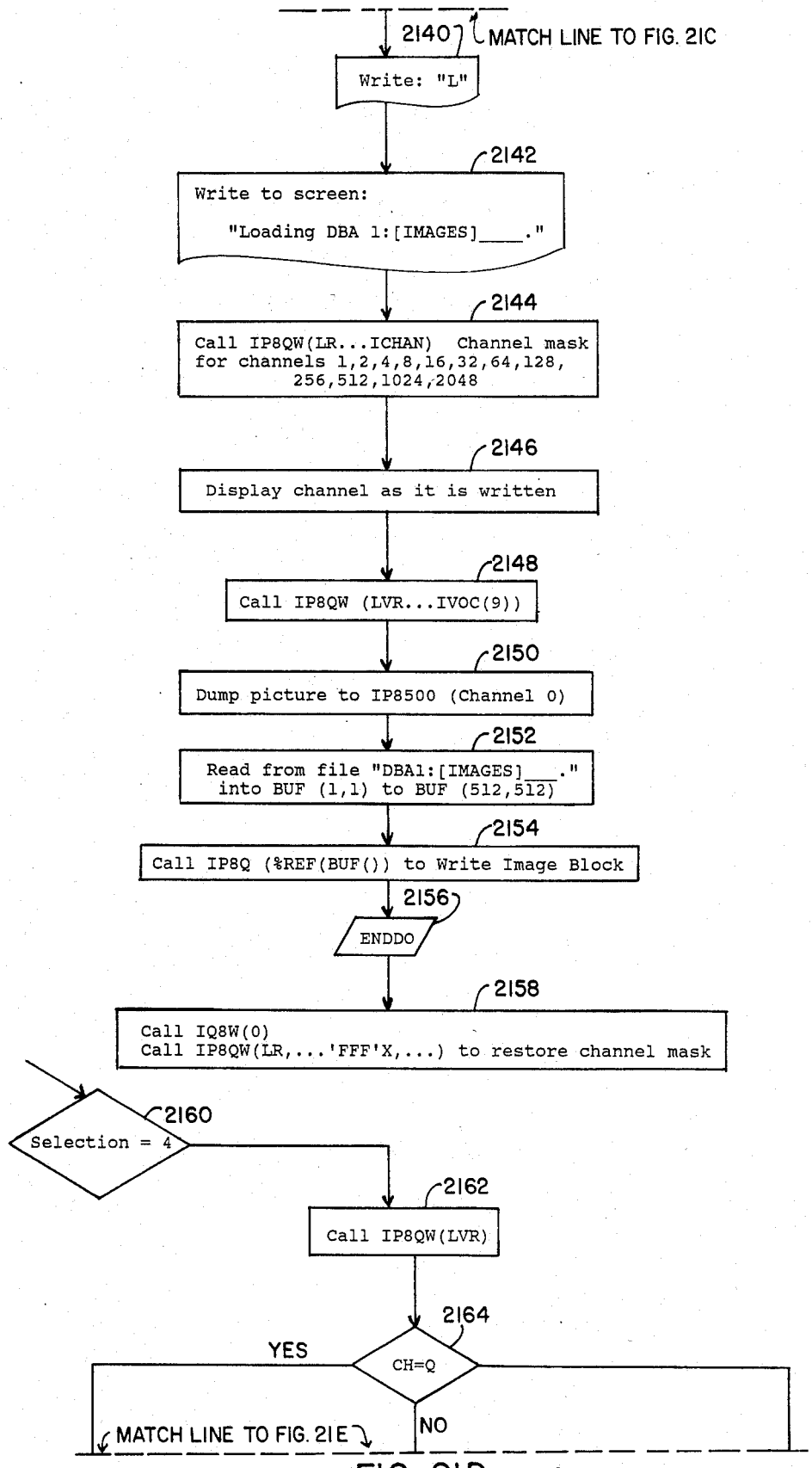
Figure 21E:
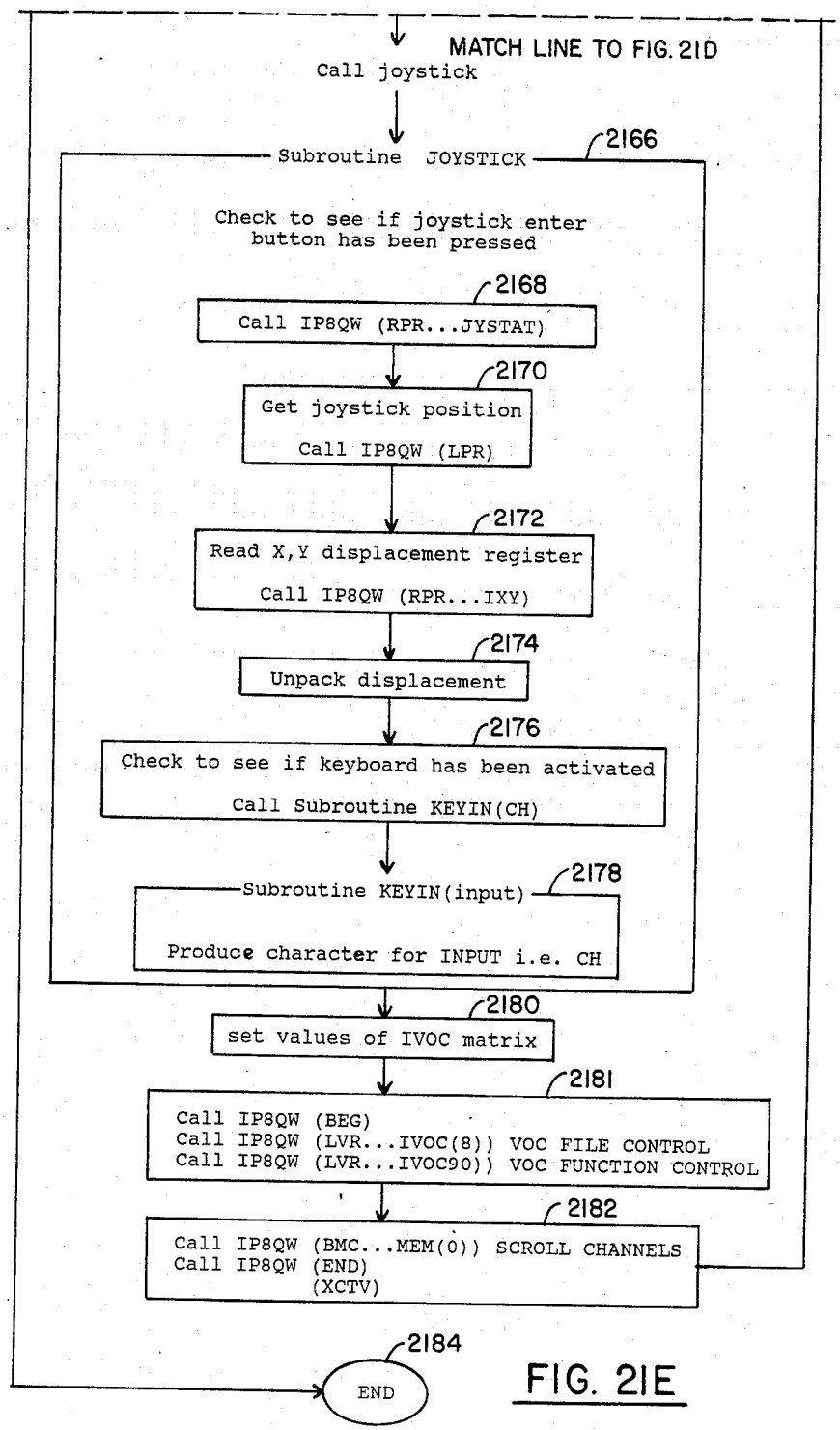

The beginning of the loop calls subroutine JOYSTICK, blocks 2166 through 2178, which operates identically to its operation in MAN, FIG. 20I blocks through 2090, to determine if the joystick and keyboard have been activated and to return appropriate values for CH, ITOG, JX and JY.

In order to fill the IVOC(0-16) matrix, block 2180, PAN first resets the values of IXS and IYS as follows:

$$IXS = IXS + (128 - JX)/8$$

$$IYS = IYS + (128 - JY)/8$$

These values are checked and reset as follows:
if $IXS < 0$, then;

$$IXS = IXS + 511$$

$$ITX = ITX + 1$$

if $ITX = NTX$, then;

$$ITX = NTX - 1$$

$$ITX = 0$$

if $IYS < 1$, then;

$$IYS = IYS + 511$$

IYS=ITY−1 if ITY=0, then;

ITY=1

ITS=1
if IXS>510, then;

IXS=IXS−511

ITX=ITX−1 if ITX=0, then;

ITX=1

IXS=510 if IYS>511, then;

IYS=IYS−511

ITY=ITY+1 if ITY=NTY−1, then;

ITY=NTY−1

IYS=511

The IVOC matrix is then filled as follows:

IVOC(10)=[INDX(ITX,ITY)+16]+[256(INDX-(ITX,ITY+16))]

IVOC(14)=INDX(ITX,ITY)+16

IVOC(11)=[INDX(ITX+1,ITY)+16]+[256(INDX(ITX+1,ITY)+16)]

IVOC(15)=INDX(ITX+1,ITY)+16

IVOC(9)=[INDX(ITX,ITY+1)+16]+[256(INDX(ITX,ITY+1)+16)]

IVOC(13)=INDX(ITX,ITY+1)16

VOC(8)=[INDX(ITX+1,ITY+1)+16]+[256(INDX(ITX+1,ITY+1)+16)]

IVOC(12)=INDX(ITX+1,ITY+1)+16

IVOC(0)=IXS+1

IVOC(1)=IYS−1

The following commands are called to fill the display from the stored IVOC values into the tiles, block 2181:
IP8QW(BEG,0,,,,0,,,)
IP8QW(LVR,0,,,,IVOC(8),16,0,8)
IP8Q(LVR,0,,,,IVOC(0),4,0,0)
The values of MEM(0) and MEM(1) are then set for the next loop as

MEM(0)=511−IXS

MEM(1)=511−IYS

The channels are then scrolled by the following commands, block 2182:
IP8QW(BMC,0,,,,MEM(0),4,0,0)
IP8QW(END,0,,,,0,,,)

IP8Q((XCTV,0,,,,0,,,)
The flow returns to block 2164 for the next loop to display the next tile to the screen, if appropriate. If all tiles have been displayed then the program ends, block 2184.

FILMPAR

FILMPAR, 39 FIG. 1C, is almost identical to COEFMAT 18 in operation and so will be described in general review flow terms with regard to COEFMAT 18 and highlighted where differences occur. Subroutine TRAJEC of FILMPAR 39, is functionally identical to subroutine TRAJEC 23 of COEFMAT 18.

The initial output menu is identical and selection to set the field of view 3909, is performed in precisely the same way as in block 1809 of COEFMAT 18. Selection 2 begins in the same manner with a choice for "No Output" or "Name Coefficient Output File" however subroutine GETNEW is called twice by subroutine PFILE. The first time, ".DAT File" is written to the TEK screen because the first file opened by GETNEW is the poly parameter and flat parameter data file.

The second time GETNEW is called, the message ".MAT File" is written to the TEK screen because this time the full-warp scene generator parameter matrix file is named and opened. The ".DAT" and ".MAT" are to prompt the operator to name the files to be opened with appropriate names ending in .DAT or .MAT as is required for later identification.

Selection 3 operates in exactly the same manner as in COEFMAT. The tolerences 3939 are established in the same way and stored in the TOL (3,2) matrix.

Section 4 still calls subroutine COEFGEN 3951, however, subroutine COEFGEN in real-time is slightly but significantly different. One change is at block 1881 of COEFMAT where COEFMAT saves the origin of both the camera and target in XOC and XOT respectively, FILMPAR only saves the camera origin in XOC.

A slight change which actually makes no difference is that in FILMPAR subroutine PERSPEC is call immediately prior to calling GETDTED 3987 at the equivalent of block 1883 instead of calling PERSPEC as the first step inside GETDTED 1887 as is done in COEFMAT. This necessitates the transfer of the T(3,3) matrix into GETDTED 3987 from FILMPAR 39 but in all other respects GETDTED and PERSPEC operate exactly the same. GETDTED 3987 utilizes subroutine POLYDTED 3991 in a substantially identical manner as POLYDTED 1891 is utilized in COEFMAT 18.

Instead of storing the results of subroutine DESIGN in SYS$OUTPUT file as in done in COEFMAT block 1816, FILMPAR saves the geometry results for image generation in the ".MAT" file identified earlier by the operator. The data stored in ".MAT" is ITER, XL, T, XYF, XT, DM 32[X(T-3,IREF(1-3), JREF(1-3)], C, D, E. These factors are used to pass coefficients to full-warp generator and also control points to MANDIS 41 for real time disk 45 interactive program MANDIS 41.

The only other change is at the end of each iteration, block 1858, if NEWGET=0, FILMPAR 39 saves variables "ITER", "P", AND "F" in file ".DAT" for later use by test warp programs. This latter program, MANDIS 41, utilizes a real-time disk 45 for image storage, thereby greatly expanding the quantity of stored full-warp images beyond the storage capacity of the twelve IP-8500 tiles, thereby greatly lengthening the flight time duration.

MANDIS

MANDIS, 41 FIG. 1C, operates somewhat in the same manner as program MAN, however, new warp images are loaded from the real time disk 45 FIG. 1C, onto the IP-8500 tiles as the IP-8500 tile images are loaded onto the display monitor for visual image generation. MANDIS also operates on the images of SCEN-GEN.

All images are stored and retrieved to and from the real time disks 45 by subroutine DISKIO, a DBA routine for information transfer to/from the real-time disk from/to the IP-8500 tiles.

When selection 4 "maneuver" is implemented, the display image generation is accomplished the same way as in MAN because the images are pulled from the tiles as in MAN. The images must first be read from the real time disk onto the tiles by subroutine DISKIO, at appropriate times when a new image is needed to travel out of the present scene and into the next.

In the above manner, as detailed, a series of scenes are generated and displayed in proper sequence, and are warped for smooth transition to create a visual image which simulates flight above a preselected terrain along a predetermined path.

Variations and modifications of the invention should now be apparent to those of ordinary skill in the art without the need for undue experimentation. Accordingly, it is the inventors' intention that such modifications and variations fall within the spirit and scope of the invention as defined by the following claims.

We claim:

1. A method of producing a series of electronically simulated images which, upon viewing in the composite, produce the impression of proceeding along a predetermined path of movement, over specific terrain at determined heights above the terrain comprising the steps of;
    taking at least one photograph substantially perpendicular to a region over which movement is to be simulated,
    digitizing the information in said photograph,
    retrievably storing such digitized photograph information,
    retrievably storing digitized terrain elevation and coordinate data corresponding to the photographed region, and
    processing the digitized photograph information, terrain elevation and coordinate data as a function of a predetermined path of movement relative to the photographed terrain to produce and store from said at least one photograph a series of digitized data corresponding to electronic images which depict in all three dimensions, view of the terrain of the photograph at different positions along the predetermined path of movement.

2. A method of producing a series of electronically simulated images according to claim 1, further including the step of;
    visually displaying the images in sequence to simulate the passage of an observer over the selected terrain.

3. A method of producing a series of electronically simulated images according to claim 2, further including the steps of;
    displaying a new stored image at each of a succession of independently determinable intervals,
    distorting each displayed image in the interval between display of successive stored images to interpolate between the stored images, whereby a smooth transition occurs between the displayed images.

4. A method of producing a series of electronically simulated images according to claim 1, wherein said processing further comprises the steps of;
    identifying preselected control points included in said terrain data,
    identifying objects in the photograph associated with said preselected control points,
    determining the photograph location data of said objects, and
    correlating said photographic locations with said terrain location coordinate data.

5. A method of producing a series of electronically simulated images which, upon viewing in the composite, produce the impression of proceeding along a predetermined path, over specific terrain at determined heights above the terrain comprising the steps of;
    taking at least one photograph substantially perpendicular to a region over which movement is to be simulated,
    digitizing the information in said photograph,
    retrievably storing said digitized photograph information,
    creating and retrievably storing varying resolutions of said digitized photograph information,
    retrievably storing digitized terrain elevation data corresponding to said region,
    retrievably storing coordinate data of identifiable landmarks within said region,
    retrieving and visually displaying the highest resolution of said digitized photographic information,
    identifying said landmarks in the displayed photographic information,
    determining the photograph locations of said landmarks,
    determining observer coordinates by coorelating said photograph locations with said coordinate data,
    correlating said observer coordinates with said elevation data to form a digitized three dimensional electronic representation of said region,
    supplying an observer field of view and distortion error tolerances,
    utilizing said field of view and said distortion tolerances in combination with said three dimensional electronic representation to develop a polynomial coefficient matrix of significant values,
    utilizing said matrix to distort said three dimensional representation to create a series of progressively fully distorted electronic images, and
    visually displaying said distorted images.

6. A method of producing images according to claim 5, wherein said visual display comprises;
    visually displaying a first fully distorted image,
    utilizing said polynomial coefficient matrix to progressively distort said first image to represent movement above said region,
    utilizing said error crteria to determine when said first image is overly distorted, and
    displaying the next sequential fully distorted image when said first image is overly distorted.

7. A method of producing images according to claim 5, wherein said visual displaying comprises;

visually displaying single fully distorted warp image, and manipulating said display so as to rotate the observer's field of view in the horizontal about the observer's observation point.

8. A method of producing images according to claim 6, wherein;

said sequential fully distorted images are retrievably stored on a real time disk.

9. Apparatus for generating a series of visual displays simulating movement along the path over a predetermined scene from a single representation of such scene comprising;

computer means including a central processing unit, means for receiving three dimensional coordinate location information of points witin said scene, means for receiving digitized optical intensity information of points within said scene, means for retrievably storing said digitized coordinate and optical information, processor means including means for creating three dimensional electronic representations of the scene along a predetermined path of movement over the scene from said optical and coordinate information, means for retrievably storing said three dimensional representations, and image generation means connected to receive said representations from said processor means to create and display said series of visual images to simulate movement over said scene.

10. Apparatus according to claim 9, wherein, said visual images are utilized to familiarize an aviator with a preselected terrain as part of a premission briefing.

11. A training apparatus through the use of which an operator can gain experience in the performance of a predetermined task, the apparatus including a computer generated visual display of a predetermined scene, the image generator comprising;

general purpose computer means including a central processing unit, means for receiving three dimensional coordinate location information of points within a region, means for receiving digitized optical intensity information of points within said region, means for retrievably storing said coordinate and optical information, general processor means including means for creating three dimensional electronic representations from said optical and coordinate information, means for retrievably storing said three dimensional representations, and image generation means connected to receive said representations and signals from said general processor means to create and display a series of visual images.

12. A training apparatus according to claim 11 or claim 9 wherein, said coordinate information is comprised of topographical elevation data and longitudinal and latitudinal location data.

13. A training apparatus according to claim 11 or claim 9, wherein said image generation means is further comprised of means for distorting said images, and means for determining when said images are distorted beyond given tolerances.

14. A training device according to claim 13, further comprising means for creating and displaying the subsequent visual image from the subsequent representation when said tolerances are exceeded.

15. A method of producing a series of electronically simulated images according to claim 1 or claim 2 further comprising taking a plurality of photographs each substantially perpendicular to a region contiguous to at least one other of the photographed regions, producing a series of digitized electronic images depicting in all three dimensions views of the terrain of each photograph at different positions along the predetermined path of movement.

* * * * *